(12) United States Patent
Suenaga et al.

(10) Patent No.: US 8,099,537 B2
(45) Date of Patent: Jan. 17, 2012

(54) METHOD, DEVICE, AND SYSTEM FOR TRANSMITTING DATA FRAGMENTS OVER MULTIPLE TRANSMISSION LINES AND TECHNIQUES FOR STOPPING DATA TRANSMISSION

(75) Inventors: Hiroshi Suenaga, Osaka (JP); Osamu Shibata, Hyogo (JP); Yoshiyuki Saito, Osaka (JP); Toru Iwata, Osaka (JP); Noriaki Takeda, Hyogo (JP); Takaharu Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 364 days.

(21) Appl. No.: 12/295,407

(22) PCT Filed: Feb. 20, 2007

(86) PCT No.: PCT/JP2007/053010
§ 371 (c)(1),
(2), (4) Date: Sep. 30, 2008

(87) PCT Pub. No.: WO2007/125670
PCT Pub. Date: Nov. 8, 2007

(65) Prior Publication Data
US 2009/0290582 A1 Nov. 26, 2009

(30) Foreign Application Priority Data
Apr. 26, 2006 (JP) .................................. 2006-121459

(51) Int. Cl.
G06F 13/42 (2006.01)
G06F 13/00 (2006.01)
G06F 13/24 (2006.01)
G06F 1/00 (2006.01)
G06F 1/04 (2006.01)
G06F 1/12 (2006.01)
G06F 5/06 (2006.01)

(52) U.S. Cl. ........ 710/106; 710/110; 710/260; 713/500; 713/600

(58) Field of Classification Search .................. 710/106, 710/260–269, 110; 713/500, 600
See application file for complete search history.

(56) References Cited

U.S. PATENT DOCUMENTS
4,395,756 A * 7/1983 Daniels ........................... 710/59
(Continued)

FOREIGN PATENT DOCUMENTS
GB 2097563 A * 11/1982
(Continued)

OTHER PUBLICATIONS

Ghoneima, M.; Ismail, Y.; Khellah, M.; De, V.; , "SSMCB: Low-Power Variation-Tolerant Source-Synchronous Multicycle Bus," Circuits and Systems I: Regular Papers, IEEE Transactions on , vol. 56, No. 2, pp. 384-394, Feb. 2009.*

(Continued)

Primary Examiner — Faisal M Zaman
(74) Attorney, Agent, or Firm — Wenderoth, Lind & Ponack, L.L.P.

(57) ABSTRACT

It is an object of the invention to inhibit a drop in the data transmission efficiency due to the transmission of an interrupt signal. The invention provides a signal transmission method that is characterized in that a reception side and a transmission side partition data into a plurality of data fragments and send and receive the plurality of data fragments over at least two transmission lines, in that the transmission side transmits first data fragments of the plurality of data fragments over a first transmission line of the transmission lines, transmits data packets that include header information, a second data fragment that has the same bit length as the first data fragments, and footer information over a second transmission line other than the first transmission line, and transmits the first data fragments and the second data fragments in synchronization, and in that an interrupt signal for controlling the transmission side is transmitted from the reception side to the transmission side in a time slot that is an interval between first data fragments that are adjacent on the first transmission line.

11 Claims, 28 Drawing Sheets

U.S. PATENT DOCUMENTS

| | | | | |
|---|---|---|---|---|
| 4,467,412 A * | 8/1984 | Hoff | | 710/110 |
| 5,319,752 A * | 6/1994 | Petersen et al. | | 709/234 |
| 5,530,875 A * | 6/1996 | Wach | | 710/264 |
| 5,604,918 A * | 2/1997 | Huijsing et al. | | 710/72 |
| 5,655,131 A * | 8/1997 | Davies | | 712/34 |
| 5,671,421 A * | 9/1997 | Kardach et al. | | 710/260 |
| 5,740,373 A * | 4/1998 | Isaka | | 709/237 |
| 5,835,779 A * | 11/1998 | Chang et al. | | 710/268 |
| 5,971,284 A * | 10/1999 | Hammer | | 236/11 |
| 6,081,523 A * | 6/2000 | Merchant et al. | | 370/389 |
| 6,088,741 A | 7/2000 | Murata | | |
| 6,317,841 B1 * | 11/2001 | Nagae et al. | | 713/322 |
| 6,321,288 B1 * | 11/2001 | Ho | | 710/260 |
| 6,460,102 B1 * | 10/2002 | Choi | | 710/110 |
| 6,549,162 B1 * | 4/2003 | Gage et al. | | 342/353 |
| 6,557,063 B1 * | 4/2003 | Wang et al. | | 710/110 |
| 6,665,757 B1 * | 12/2003 | Tsujita et al. | | 710/110 |
| 6,675,300 B1 * | 1/2004 | Jung et al. | | 726/17 |
| 6,782,486 B1 * | 8/2004 | Miranda et al. | | 713/601 |
| 6,832,325 B2 * | 12/2004 | Liu | | 713/400 |
| 6,901,465 B2 * | 5/2005 | Kamihara et al. | | 710/100 |
| 7,003,580 B1 * | 2/2006 | Cook | | 709/235 |
| 7,061,938 B2 * | 6/2006 | Hogeboom | | 370/503 |
| 7,073,146 B2 * | 7/2006 | Sarwary et al. | | 716/108 |
| 7,243,255 B2 * | 7/2007 | Cox et al. | | 713/600 |
| 7,313,715 B2 * | 12/2007 | Yoo et al. | | 713/500 |
| 7,615,947 B2 * | 11/2009 | Tamaoka | | 318/362 |
| 2001/0033329 A1 * | 10/2001 | Zhang et al. | | 348/143 |
| 2002/0087911 A1 * | 7/2002 | Liu | | 713/600 |
| 2003/0033551 A1 * | 2/2003 | Kuhn et al. | | 713/401 |
| 2003/0076850 A1 * | 4/2003 | Jason, Jr. | | 370/414 |
| 2004/0001503 A1 * | 1/2004 | Manter | | 370/462 |
| 2004/0027870 A1 | 2/2004 | Bando | | |
| 2005/0041635 A1 * | 2/2005 | Chung et al. | | 370/351 |
| 2005/0281203 A1 * | 12/2005 | Cherukuri et al. | | 370/242 |
| 2006/0020733 A1 * | 1/2006 | Sarda | | 710/305 |
| 2006/0143348 A1 * | 6/2006 | Wilson et al. | | 710/110 |
| 2008/0008183 A1 * | 1/2008 | Takagaki et al. | | 370/392 |
| 2009/0245244 A1 * | 10/2009 | Coene | | 370/389 |

FOREIGN PATENT DOCUMENTS

| | | | | |
|---|---|---|---|---|
| JP | 60225269 A | * | 11/1985 | |
| JP | 2733242 | | 12/1997 | |
| JP | 2812537 | | 8/1998 | |
| JP | 2002-183692 | | 6/2002 | |
| JP | 3341326 | | 8/2002 | |
| JP | 2005135109 A | * | 5/2005 | |
| JP | 3690873 | | 6/2005 | |
| JP | 3710308 | | 8/2005 | |
| JP | 2010134672 A | * | 6/2010 | |
| WO | WO 9857479 A1 | * | 12/1998 | |

OTHER PUBLICATIONS

Nedovic, Nikola, "Clock and Data Recovery in High-Speed Wireline Communications", May 15, 2008, IEEE, Fujitsu Laboratories of America, pp. 1-39.*

Zerbe, J.; Daly, B.; Lei Luo; Stonecypher, W.; Dettloff, W.; Eble, J.C.; Stone, T.; Jihong Ren; Leibowitz, B.; Bucher, M.; Satarzadeh, P.; Qi Lin; Yue Lu; Kollipara, R.; , "A 5 Gb/s Link With Matched Source Synchronous and Common-Mode Clocking Techniques," Solid-State Circuits, IEEE Journal of , vol. 46, No. 4, pp. 974-985, Apr. 2011.*

Yeung, E.; Horowitz, M.A.; , "A 2.4 Gb/s/pin simultaneous bidirectional parallel link with per-pin skew compensation," Solid-State Circuits, IEEE Journal of , vol. 35, No. 11, pp. 1619-1628, Nov 2000.*

International Search Report issued May 29, 2007 in the International (PCT) Application No. PCT/JP2007/053010.

* cited by examiner

METHOD, DEVICE, AND SYSTEM FOR TRANSMITTING DATA FRAGMENTS OVER MULTIPLE TRANSMISSION LINES AND TECHNIQUES FOR STOPPING DATA TRANSMISSION

TECHNICAL FIELD

The present invention relates to signal transmission methods, transmission/reception devices, and communications systems for data transmission.

BACKGROUND ART

Examples of communications systems that perform data transmission between transmission/reception devices include communications systems that have a single or a plurality of transmission lines for data signals (hereinafter, referred to as data signal transmission lines) between transmission/reception devices, and communications systems that have both a data signal transmission line and a transmission line for control signals (hereinafter, referred to as control signal transmission lines), as represented by USB (Universal Serial Bus) and IEEE (Institute of Electrical and Electronics Engineers) 1394. In the former communications system, the transmission of data between transmission/reception devices occurs over the data signal transmission line, and the transmission of various control signals for starting and ending data transmission, for example, occurs over the control signal transmission line. There also are cases in which data transmission occurs using both control signal transmission lines and data signal transmission lines in order to increase the efficiency of data transmission.

An example of one such communications system is disclosed in Patent Citation 1. In this communications system, data transmission is performed continuously using a data signal transmission line or using both a data signal transmission line and a control signal transmission line. Patent Citation 1 discloses a technology for transmitting an interrupt request signal, which is a control signal, from the data reception side to the data transmission side over the transmission line on which data are continuously transmitted in this fashion using a time division multiplex transmission method. With a time division multiplex transmission method, a plurality of transmission/reception devices are assigned a time that a transmission line can be used, and this allows the data signal transmission line and the control signal transmission line to alternately function as a transmission side and a reception side. Here, if an interrupt request signal is to be transmitted to the transmission side during the reception by the reception side of data from the transmission side, then the period between each data unit from the transmission side, that is, the period that has been assigned to the reception side, is used to transmit an interrupt request signal to the transmission side. Thus, the reception side can freely and immediately send an interrupt request signal to the transmission side.
Patent Citation 1: Japanese Published Patent No. 2733242 Specification

SUMMARY OF THE INVENTION

Technical Problem

However, with the time division multiplex transmission method of Patent Citation 1, in order to freely and immediately send an interrupt request signal to the transmission side, it is necessary to secure a period for the transmission of the interrupt signal between data from the transmission side. In other words, it is necessary to secure a period that corresponds to the bit length of the interrupt signal, or to a longer bit length, between the data from the transmission side. This results in a drop in the efficiency of data transmission from the transmission side, and is poised to become a large issue in the future as data transmission becomes even faster.

Accordingly, it is an object of the invention to provide a signal transmission method, a transmission/reception device, and a communications system, that can suppress a drop in data transmission efficiency due to the sending of an interrupt signal.

Technical Solution

In order to solve the foregoing issues, a first aspect of the invention provides a signal transmission method that includes a reception side and a transmission side partitioning data into a plurality of data fragments and sending/receiving the plurality of data fragments over at least two transmission lines, the transmission side transmitting a first data fragment of the plurality of data fragments, over a first transmission line of the transmission lines, transmitting a data packet that includes header information, a second data fragment that has the same bit length as the first data fragment, and footer information, over a second transmission line other than the first transmission line, and transmitting the first data fragment and the second data fragment in synchronization, and transmitting an interrupt signal for controlling the transmission side from the reception side to the transmission side in a time slot that is an interval between first data fragments that are adjacent on the first transmission line.

In this embodiment, header information and footer information are not added to the first data fragments. The transmission side uses the header information and the footer information of the data packets of the second transmission line to synchronize the first data fragments and the second data fragments of the data packets and send them to the reception side. At this time, the time slot between first data fragments that are adjacent on the first transmission line is formed longer than the interval between the data packets of the second transmission line by the length of the bit length of the footer information and the header information. In this invention, this time slot is used to transmit an interrupt signal, and therefore a separate period that must be secured in order to transmit the interrupt signal is either not necessary or that separate period can be shortened. The time slot thus can be used to inhibit a drop in the data transmission efficiency due to the transmission of an interrupt signal. Further, because the time slot is a period during which data fragments are not transmitted, it is also possible to prevent data fragment loss.

It should be noted that the invention can be adopted in a case where the reception side and the transmission side are a host terminal and a removable memory device. For example, the invention can be adopted for a case in which the time slot of the first transmission line is used to transmit an interrupt signal to the removable memory device at a time when the host terminal is reading read data from the removable memory device over the first and the second transmission lines. It can also be adopted for a case in which the time slot of the first transmission line is used to transmit an interrupt signal to the host terminal at a time when the removable memory device is receiving and storing write data from the host terminal over the first and the second transmission lines.

A second aspect of the invention provides the signal transmission method according to the first aspect of the invention, in which either one of header information or footer information is added to the first data fragments.

In a case where footer information is added to first data fragments that are adjacent on the first transmission line, then the time slot is formed longer than the interval between data packets by the bit length of the header information. Further, in a case where header information is added to first data fragments that are adjacent on the first transmission line, then the time slot is formed longer than the interval between data packets by the bit length of the footer information. Since this time slot is used to transmit an interrupt signal, a separate period that must be secured in order to transmit an interrupt signal is either not necessary or that separate period can be shortened. The time slot thus can be used to inhibit a drop in the data transmission efficiency due to the transmission of an interrupt signal.

A third aspect of the invention provides the signal transmission method according to the first aspect of the invention, in which the interrupt signal is a signal for stopping transmission of the first data fragments and the data packets.

Thus, it is possible to inhibit a drop in the data transmission efficiency while stopping transmission of first data fragments and data packets from the transmission side.

A fourth aspect of the invention provides a transmission/reception device that includes a data creation portion that partitions data into a plurality of data fragments, creating a first data fragment from the plurality of data fragments, and a data packet that includes header information, a second data fragment that has the same bit length as the first data fragment, and footer information, a data transmission portion that synchronizes the first data fragment and the second data fragment and sends the first data fragment to a reception side over a first transmission line of at least two or more transmission lines, and sends the data packet to the reception side over a second transmission line other than the first transmission line, and an interrupt signal reception portion that receives an interrupt signal from the reception side during a time slot that is an interval between adjacent first data fragments on the first transmission line.

This aspect of the invention achieves the same action and effect as the first aspect of the invention.

A fifth aspect of the invention provides a transmission/reception device according to the fourth aspect of the invention, further including a response transmission portion that transmits a response to the reception side in accordance with reception of the interruption signal, and in which the interrupt signal is a signal for stopping transmission of the first data fragments and the data packets, the data transmission portion completes transmission of the first data fragment and the data packets that are being transmitted over the first and the second transmission lines when the interrupt signal reception portion receives the interrupt signal, and the response transmission portion transmits a response to the reception side after transmission of the first data fragment and the data packet is complete.

By completing the transmission of the first data fragment and the data packet that are being transmitted at the time the interrupt signal is received, it is possible to keep the first data fragment and the data packet that are being transmitted from being incompletely transmitted and becoming broken data.

A sixth aspect of the invention provides a transmission/reception device for receiving data that are transmitted partitioned into a plurality of data fragments from a transmission side. This transmission/reception device includes a data reception portion that receives, from the transmission side, a first data fragment, of the plurality of data fragments, over a first transmission line of at least two or more transmission lines, and receives a data packet that includes header information, a second fragment that has the same bit length as the first data fragment, and footer information, over a second transmission line that is separate from the first transmission line, a time slot obtaining portion that obtains a starting position and a time slot length of a time slot that is an interval between first data fragments that are adjacent on the first transmission line, an interrupt signal creation portion that creates an interrupt signal for controlling the transmission side based on the time slot length, and an interrupt signal transmission portion that transmits the interrupt signal to the transmission side during the time slot, based on the starting position of the time slot. The first data fragment and the second data fragment are transmitted synchronized.

This aspect of the invention achieves the same action and effect as the first aspect of the invention.

A seventh aspect of the invention provides a communications system that includes the transmission/reception device according to the fourth aspect of the invention and the transmission/reception device according to the sixth aspect of the invention.

This aspect of the invention achieves the same action and effect as the first aspect of the invention.

An eighth aspect of the invention provides a signal transmission method that includes a reception side and a transmission side partitioning data into a plurality of data fragments and sending/receiving the plurality of data fragments over a transmission line, the reception side sending a first clock to the transmission side over a clock signal transmission line, the transmission side sending the data fragments to the reception side in accordance with the first clock over the transmission line, and the reception side stopping transmission of the first clock to the transmission side in order to stop transmission of the data fragments from the transmission side.

The transmission side transmits data fragments to the reception side based on the first clock that is transmitted from the reception side. Here, by the reception side stopping supply of the first clock, the transmission side can no longer transmit data fragments to the reception side. In this way, the reception side can control the stopping of data fragment transmission from the transmission side.

A ninth aspect of the invention provides a signal transmission method according to the eighth aspect of the invention, in which the transmission line is at least two or more lines, and wherein after stopping transmission of the first clock to the transmission side, the reception side transmits to the transmission side an interrupt signal for controlling the transmission side over a first transmission line of the transmission lines, and sends a second clock to the transmission side over a second transmission line that is separate from the first transmission line, and the transmission side receives the interrupt signal based on the second clock.

According to this aspect of the invention, when the reception side stops supplying the first clock to the transmission side, the transmission of data fragments from the transmission side is stopped. Thus, the reception side controls the stopping of data fragment transmission, and transmits an interrupt signal and a second clock to the transmission side. In other words, the reception side can transmit an interrupt signal and a second clock at any time, and it is not necessary to prepare in advance a period for transmission of an interrupt signal and a second clock between data fragments. Thus, it is possible to shorten the interval between data fragments and inhibit a drop in the data transmission efficiency. Further, after the transmission of data fragments from the transmission side is stopped, an interrupt signal and the second clock are transmitted over the transmission line that was used for transmitting data fragments. Thus, data fragment loss can be prevented.

It should be noted that it is also possible to transmit data packets to which footer information and header information have been added to the data fragment over the transmission line. In this case as well, it is possible to shorten the interval between data fragments and inhibit a drop in the data transmission efficiency, for the same reasons as above.

The invention can be adopted for example in a case where the reception side and the transmission side are a host terminal and a removable memory device. For example, the invention can also be adopted in a case where the host terminal stops supplying the first clock to the removable memory device at a time when the host terminal is reading read data from the removable memory device over the transmission lines. Then, the host terminal transmits an interrupt signal to the removable memory device over the first transmission line and transmits the second clock to the removable memory device over the second transmission line.

A tenth aspect of the invention provides a signal transmission method according to the ninth aspect of the invention, in which the interrupt signal is a signal for stopping the transmission of the data fragments.

It is possible to inhibit a drop in the data transmission efficiency while stopping transmission of data fragments from the transmission side.

An eleventh aspect of the invention provides a signal transmission method according to the eighth aspect of the invention, in which the reception side, after stopping transmission of the first clock to the transmission side, outputs an interrupt request for controlling the transmission side, and the transmission side has an internal clock whose count value is reset by reception of the first clock, and recognizes the interrupt request as a result of the count value of the internal clock exceeding a predetermined value due to stopping transmission of the first clock.

According to this aspect of the invention, the transmission of data fragments from the transmission side is stopped when the reception side stops supplying the first clock to the transmission side. Thus, the reception side controls stopping the transmission of data fragments, and as a result the transmission side recognizes an interrupt request. In other words, the reception side can make the transmission side recognize an interrupt request at any time, and it is not necessary to provide in advance a period for recognizing an interrupt request between the data fragments. Thus, the interval between data fragments can be shortened and a drop in the data transmission efficiency can be inhibited.

It should be noted that it is also possible to transmit data packets to which footer information and header information have been added to the data fragment over the transmission line. In this case as well, it is possible to shorten the interval between data fragments and inhibit a drop in the data transmission efficiency, for the same reasons as above.

Further, the frequency of the internal clock of the transmission side is set lower than the frequency of the first clock.

The invention can be adopted for example in a case where the reception side and the transmission side are a host terminal and a removable memory device. For example, the invention can be adopted for a case in which the removable memory device is made to recognize an interrupt request due to the stopping of supply of the first clock at a time when the host terminal is reading read data from the removable memory device over the transmission lines.

A twelfth aspect of the invention provides a signal transmission method according to the eleventh aspect of the invention, in which the interrupt request is a request for stopping transmission of the data fragments.

It is possible to inhibit a drop in the data transmission efficiency while stopping the transmission of data fragments from the transmission side.

A 13th aspect of the invention provides a transmission/reception device that includes a data creation portion that partitions data into a plurality of data fragments, creating data fragments, a first clock reception portion that receives a first clock for transmitting the data fragments to a reception side, from the reception side over a clock signal transmission line, and a data transmission portion that transmits the data fragments to the reception side, based on the first clock, over a transmission line. When transmission of the first clock is stopped from the reception side, the data transmission portion stops transmission of the data fragments to the reception side.

This aspect of the invention achieves the same action and effect as the eighth aspect of the invention.

A 14th aspect of the invention provides a transmission/reception device according to the 13th aspect of the invention, in which the transmission line is at least two or more lines, and the data transmission portion transmits the data fragments to the reception side over the at least two or more transmission lines based on the first clock. This transmission/reception device further includes a second clock reception portion that receives a second clock from the reception side over a second transmission line of the transmission lines, and an interrupt signal reception portion that receives an interrupt signal for controlling the transmission side, from the reception side, over a first transmission line of the transmission lines based on the second clock. After transmission of the first clock from the reception side is stopped, the second clock reception portion receives the second clock, and the interrupt signal reception portion receives the interrupt signal based on the second clock.

This aspect of the invention achieves the same action and effect as the ninth aspect of the invention.

A 15th aspect of the invention provides a transmission/reception device according to the 14th aspect of the invention, further including a response transmission portion that transmits a response to the reception side in accordance with reception of the interrupt signal.

A 16th aspect of the invention provides a transmission/reception device according to the 13th aspect of the invention, further including an internal clock count portion that counts a count value of an internal clock, which is reset by reception of the first clock, and an interrupt request recognition portion that recognizes an interrupt request from the reception side based on the count value of the internal clock. The interrupt request recognition portion recognizes the interrupt request based on the count value of the internal clock exceeding a predetermined value as the result of stopping transmission of the first clock.

This aspect of the invention achieves the same action and effect as the eleventh aspect of the invention.

A 17th aspect of the invention provides a transmission/reception device according to the 16th aspect of the invention, further including a response transmission portion that transmits a response to the reception side in accordance with recognition of the interrupt request.

An 18th aspect of the invention provides a transmission/reception device for receiving data from a transmission side that are transmitted partitioned into a plurality of data fragments, and includes a first clock transmission portion that transmits a first clock that the transmission side uses for transmission of the data fragments, to the transmission side over a clock signal transmission line, and a data reception portion that receives the data fragments from the transmission side based on the first clock, over a transmission line. The first clock transmission portion stops transmission of the first clock to the transmission side in order to stop transmission of the data fragments from the transmission side.

This aspect of the invention achieves the same action and effect as the eighth aspect of the invention.

A 19th aspect of the invention provides a transmission/reception device according to the 18th aspect of the invention, in which the transmission line is at least two or more lines, and the data reception portion receives the data fragments from the transmission side based on the first clock over the at least two or more transmission lines. The transmission/reception device further includes an interrupt signal creation portion that creates an interrupt signal for controlling the transmission side, an interrupt signal transmission portion that transmits the interrupt signal to the transmission side over a first transmission line of the transmission lines, and a second clock transmission portion that transmits a second clock to the transmission side over a second transmission line of the transmission lines. After the first clock transmission portion has stopped transmission of the first clock to the transmission side, the interrupt signal transmission portion transmits the interrupt signal to the transmission side over the first transmission line, and the second clock transmission portion transmits the second clock to the transmission side over the second transmission line.

This aspect of the invention achieves the same action and effect as the ninth aspect of the invention.

A 20th aspect of the invention provides a transmission/reception device according to the 18th aspect of the invention, further including an interrupt request notification portion that notifies the transmission side of an interrupt request for controlling the transmission side, by controlling of the first clock transmission portion so as stop transmission of the first clock.

This aspect of the invention achieves the same action and effect as the eleventh aspect of the invention.

A 21st aspect of the invention provides a communications system that includes the transmission/reception device according to the 13th aspect of the invention and the transmission/reception device according to the 18th aspect of the invention.

This aspect of the invention achieves the same action and effect as the eighth aspect of the invention.

A 22nd aspect of the invention provides a signal transmission method that includes a reception side and a transmission side partitioning data into a plurality of data fragments and send and receive the plurality of data fragments over a transmission line, the reception side changing a signal amplitude of the transmission line between data fragments that are adjacent on the transmission line, in order to notify the transmission side of an interrupt request for controlling the transmission side, and transmission side detecting a change in the signal frequency.

According to the above aspect of the invention, the data transmission side can recognize an interrupt request from the reception portion by monitoring changes in the signal amplitude of the transmission lines. Here, the reception side changes the signal amplitude to make an interrupt request between adjacent data fragments. Although a period that is as long as the bit length of the interrupt signal is necessary between the data fragments in order to send an interrupt signal for controlling the transmission side from the reception side to the transmission side, with the interrupt request notification method of the invention it is not necessary to provide a period that is as long as the bit length of the interrupt signal between the data fragments. Thus, it is possible to inhibit a drop in the data transmission efficiency due to making an interrupt request. Further, because the period between data fragments is not a period during which data fragments are being transmitted, it is possible to prevent data fragment loss.

It should be noted that one example of a method for changing the signal amplitude of the transmission line is the method of changing the terminal resistance of the transmission line from a first resistance to a second resistance on the reception side.

It is also possible to add header information and/or footer information to the data fragments.

The invention can be adopted for example in a case where the reception side and the transmission side are a host terminal and a removable memory device. For example, the invention can be adopted for a case in which the period between data fragments is used to make an interrupt request to the removable memory device at a time when the host terminal is reading read data from the removable memory device over the transmission lines. It can also be adopted for a case in which the period between data fragments is used to make an interrupt request to the host terminal at a time when the removable memory device is receiving and storing write data from the host terminal over the transmission lines.

A 23rd aspect of the invention provides a signal transmission method according to the 22nd aspect of the invention, in which the interrupt request is a request for stopping transmission of the data fragments.

It is possible to inhibit a drop in the data transmission efficiency while stopping transmission of data fragments from the transmission side.

A 24th aspect of the invention provides a transmission/reception device that includes a data creation portion that partitions data into a plurality of data fragments, creating data fragments, a data transmission portion that transmits the data fragments to a reception side over a transmission line, and an interrupt request recognition portion that recognizes an interrupt request from the reception side, by detecting a change in the signal amplitude of the transmission line, between data fragments that are adjacent on the transmission line.

This aspect of the invention achieves the same action and effect as the 22nd aspect of the invention.

It should be noted that the interrupt request recognition portion of the invention recognizes an interrupt request by comparing the signal amplitude value of the transmission line and a predetermined reference amplitude value. For example, if the signal amplitude value of the transmission line is greater than the predetermined reference amplitude value, then the interrupt request recognition portion does not recognize an interrupt request. On the other hand, if the signal amplitude value of the transmission line is smaller than the predetermined reference amplitude value, then the interrupt request recognition portion does recognize an interrupt request.

The data transmission portion transmits data fragments to the reception portion using a predetermined clock. Here, the interrupt request recognition portion detects a change in the signal amplitude using a clock with the same frequency as the predetermined clock.

A 25th aspect of the invention provides a transmission/reception device according to the 24th aspect of the invention, further including a response transmission portion that transmits a response to the reception side, in accordance with recognition of the interrupt request.

A 26th aspect of the invention provides a transmission/reception device that includes a data reception portion that receives from a transmission side a plurality of data fragments that are obtained by partitioning data over a transmission line, and an interrupt request notification portion that notifies the transmission side of an interrupt request for controlling the transmission side, by changing the signal amplitude of the transmission line between data fragments that are adjacent on the transmission line.

This aspect of the invention achieves the same action and effect as the 22nd aspect of the invention.

It should be noted that the interrupt request notification portion changes the signal amplitude of the transmission line by for example changing the terminal resistor of the transmission line of the reception side from a first resistance to a second resistance.

A 27th aspect of the invention provides a communications system that includes the transmission/reception device according to the 24th aspect of the invention and the transmission/reception device according to 26th aspect of the invention.

This aspect of the invention achieves the same action and effect as the 22nd aspect of the invention.

Advantageous Effects

With this invention, it is possible to provide a signal transmission method, a transmission/reception device, and a communications system that can inhibit a drop in the data transmission efficiency due to the sending of an interrupt signal.

Figure 1:
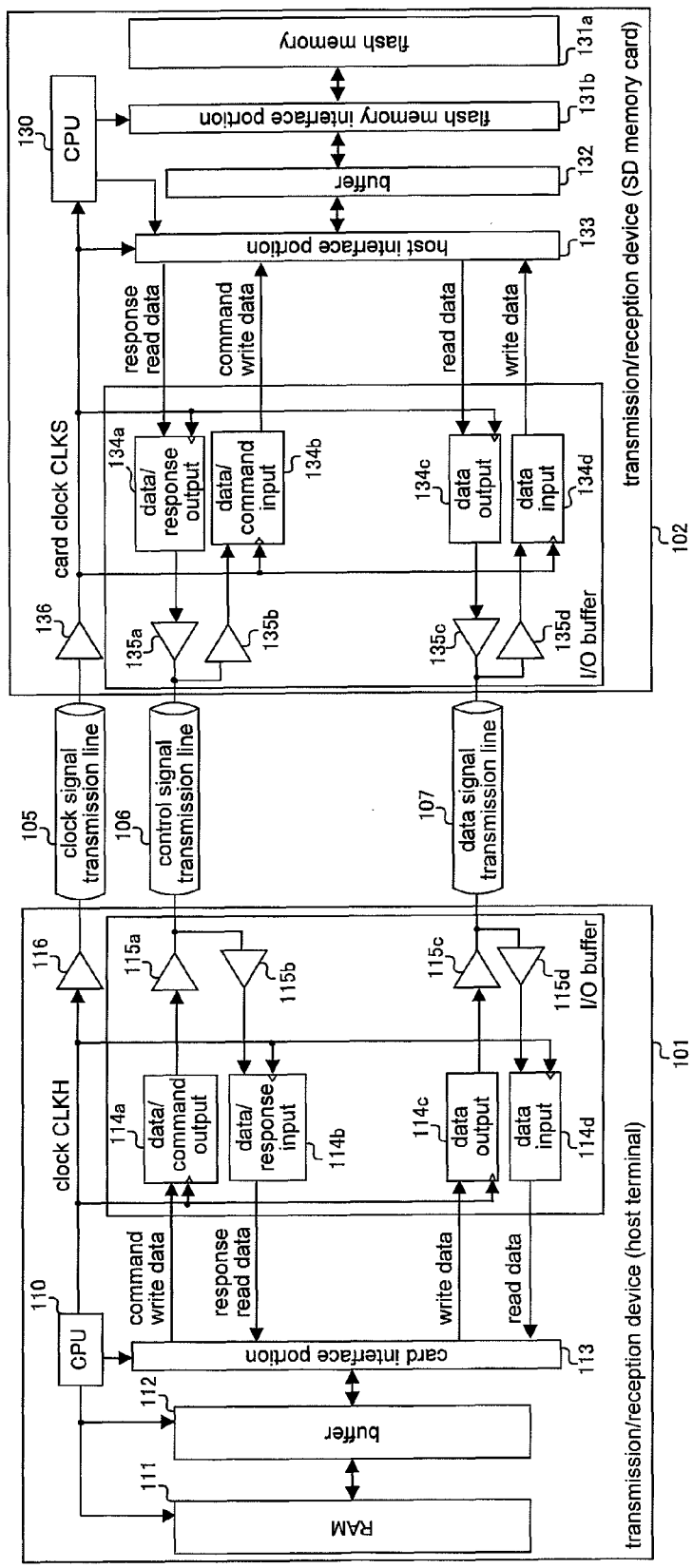
FIG. 1 is a diagram that shows the overall configuration of the communications system according to the first embodiment of the invention.

EXPLANATION OF REFERENCE 101, 201, 401: host terminal
102, 202, 402: SD memory card
105, 205, 405: clock signal transmission line
106, 206, 406: control signal transmission line
107, 207, 407: data signal transmission line
110, 130, 210, 230, 410, 430: CPU
150: clock creation portion
151: clock transmission portion
152, 172, 252, 272, 452: timing control portion
153, 173, 453, 473: time slot obtaining portion
154, 174, 254, 274, 454, 474: parameter memory portion
155, 175, 255, 275, 355, 455: command creation portion
156, 176, 256, 276, 456: command transmission portion
157, 177, 257, 277, 457, 477: command reception portion
158, 258, 458: response reception portion
178, 278, 478: response transmission portion
159, 259, 459: read data creation portion
179, 279, 379, 479: read data transmission portion
160, 260, 460: read data reception portion
161, 180, 261, 280, 461, 480: transmission data creation portion
162, 262, 462: write data transmission portion
170, 470: clock reception portion
181, 281, 481: write data reception portion

182, 282, 482: write data creation portion
237: interrupt memory circuit
250a, 350: first clock creation portion
251a, 351: first clock transmission portion
250b: second clock creation portion
251b: second clock transmission portion
270a, 370: first clock reception portion
270b: second clock reception portion
337: interrupt detection counter
384: internal clock count portion
385: interrupt request recognition portion
406a, 406b: differential transmission route
419, 439: potential difference detection circuit
463, 483: interrupt request notification portion
484: interrupt request recognition portion

DETAILED DESCRIPTION OF THE INVENTION

Embodiments of the invention are described below using the drawings.

First Embodiment

(1) Overview

FIG. 1 is a explanatory diagram that shows the overall configuration of a communications system according to the first embodiment of the invention. In this communications system, a transmission/reception device that is a host terminal 101 and a transmission/reception device that is an SD (Secure Digital) memory card 102 are connected to one another over transmission lines. The transmission lines include a clock signal transmission line 105, a control signal transmission line 106, and a data signal transmission line 107. The clock signal transmission line 105 is used for transmitting a clock CLKH, which is described later and is used for transmission between the host terminal 101 and the SD memory card 102, from the host terminal 101 to the SD memory card 102. The control signal transmission line 106 is used for sending and receiving commands relating to the reading and writing of data, for example, an interrupt command that is described later, and responses to commands, between the host terminal 101 and the SD memory card 102. The data signal transmission line 107 is used for sending and receiving data between the host terminal 101 and the SD memory card 102.

Figure 2:
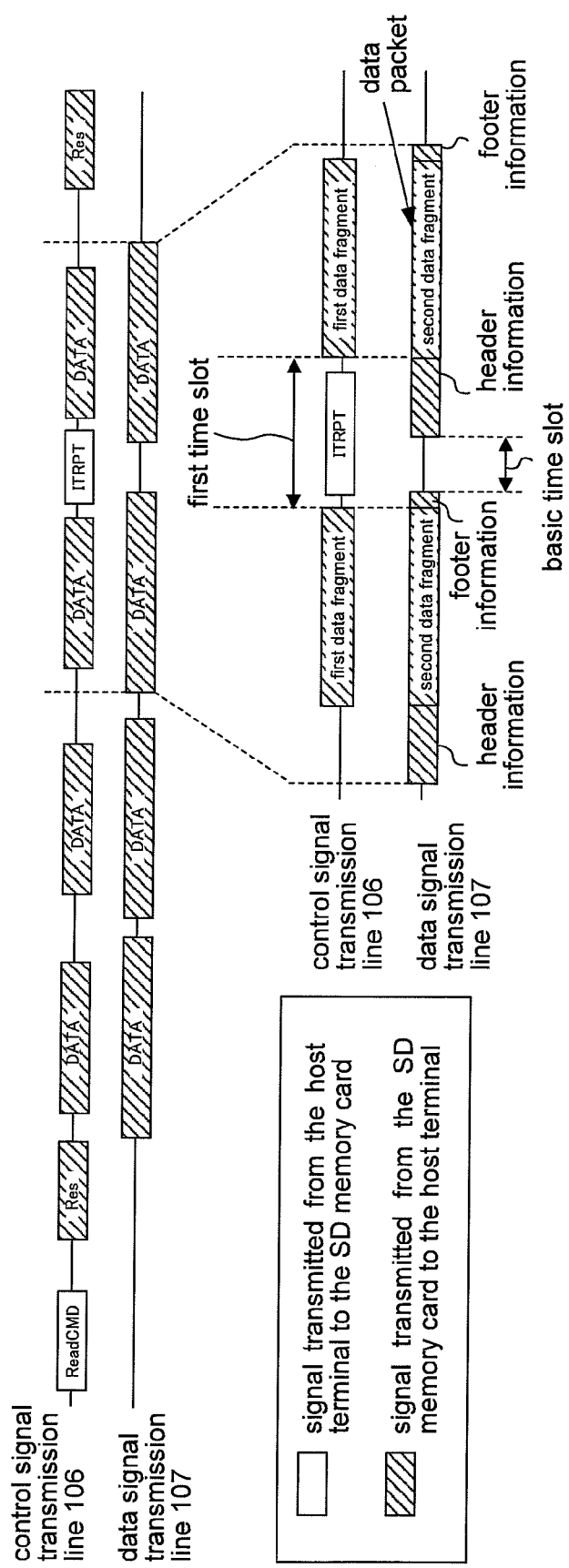
FIG. 2 is a time chart that shows how data are transmitted when reading.

FIG. 2 is a time chart that shows how data are transmitted when reading. The communications system of this embodiment is a hand-shake type communications system, in which when transmitting data, first various commands such as a read command (Read CMD in FIG. 2) and a write command, and responses to these commands (Res in FIG. 2), are sent and received between the host terminal 101 and the SD memory card 102, and then the transmission of data (DATA in FIG. 2) takes place.

The communications system of this embodiment uses the control signal transmission line 106 in addition to the data signal transmission line 107 to transmit data, as shown in FIG. 2, in order to increase the transmission efficiency of data access. The data are transmitted partitioned into a plurality of data fragments, and with regard to a first data fragment that is transmitted over the control signal transmission line 106, header information or footer information are not added before or after the first data fragment. Conversely, a second data fragment, which is transmitted over the data signal transmission line 107, does have header information and footer information added to it. In other words, a data packet that includes header information, a second data fragment, and footer information is transmitted over the data signal transmission line 107. The bit length of the first data fragment is the same as the bit length of the second data fragment, and the first data fragment and the second data fragment are transmitted in synchronization. It should be noted that any difference in length of the control signal transmission line 106 and the data signal transmission line 107 is so small that it can be ignored.

Here, the header information and the footer information are information that is different from the data fragment. The header information includes information for adjusting the timing at which the data packet is received, such as a synchronization bit sequence and a start bit, and the footer information includes information that indicates the end of the data packet, such as an end bit. It should be noted that the information that is included in the header information and the footer information is not limited to this, and they may also include other information as well. The data fragments may also include information for detecting transmission errors of the data fragments, such as a CRC (Cyclic Redundancy Check) bit.

In this embodiment, the interval (hereinafter, referred to as the first time slot) between the first data fragments from the transmission side that are transmitted in series over the control signal transmission line 106 is used to transmit an interrupt signal (ITRPT (for example, the read interrupt command that is described later) in FIG. 2) from the data fragment reception side to the transmission side. Since the first data fragment does not include header information or footer information, the first time slot is defined by the interval between the first data fragment that is transmitted first and the first data fragment that is transmitted next. The basic time slot, which is described later, is defined as the interval between adjacent data packets that include header information and footer information, and is the interval between a data packet that is transmitted first and the data packet that is transmitted next.

It should be noted that the data signal transmission line 107 is not limited to a single line, and it is also possible to provide a plurality of data signal transmission lines 107.

(2) Hardware Configuration

Figure 3:
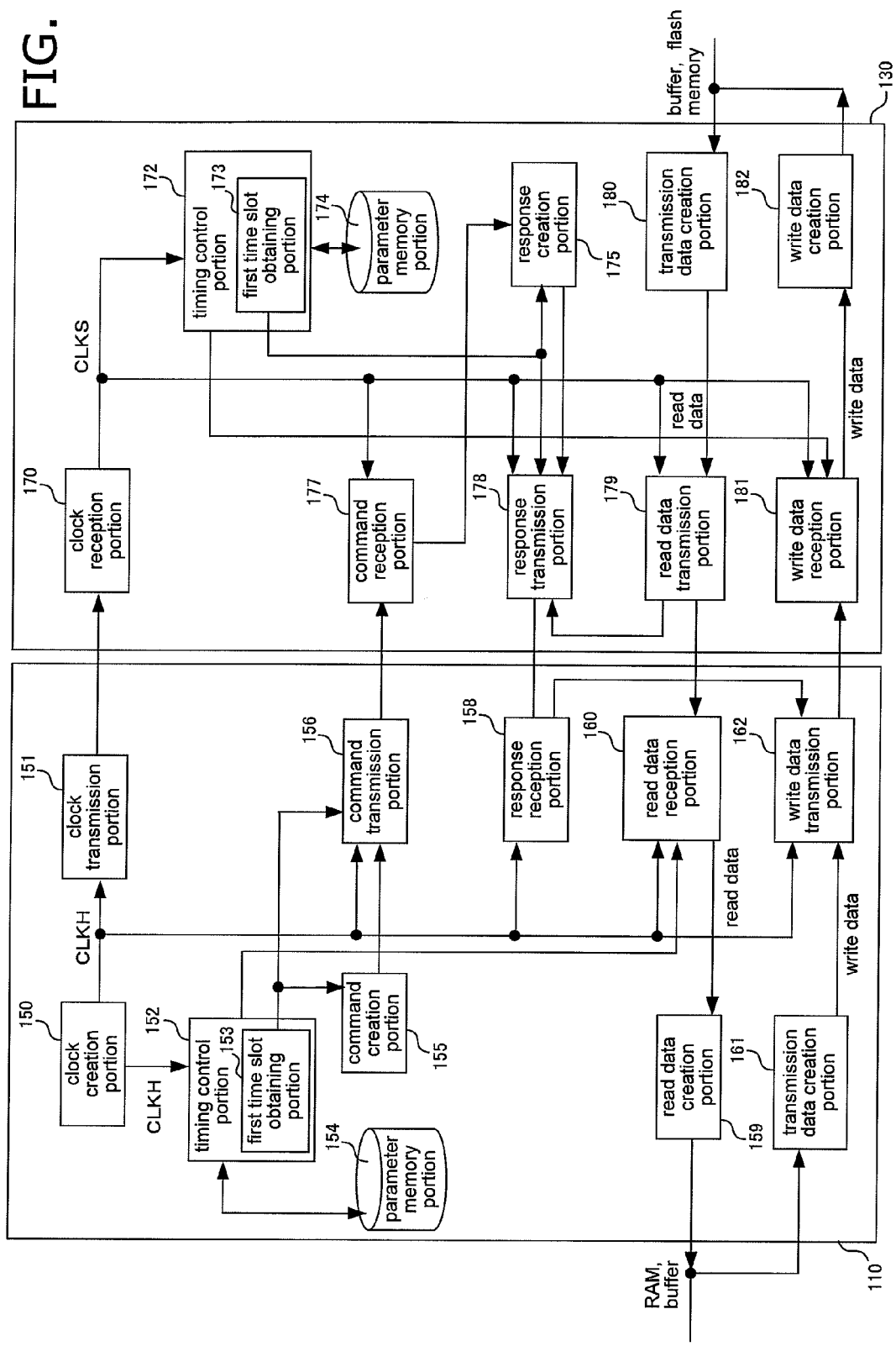
FIG. 3 is a diagram of the functional configuration of the CPU 110 of the host terminal 101 and the CPU 130 of the SD memory card 102.

The hardware configuration of the host terminal 101 and the SD memory card 102 is described below using FIG. 1 once again. The host terminal 101 and the SD memory card 102 achieve the various functions that are described later through cooperative action between the hardware configuration shown in FIG. 1 and the functional configuration of the CPU 110 that is shown in FIG. 3, which is discussed later.

(2-1) Host Terminal (a) CPU 110: The CPU 110 controls a RAM 111, a buffer 112, a card interface portion 113, and an I/O buffer, for example, of the host terminal 101. It also achieves various functions that are described later, such as reading and writing data with the host terminal 101, based on various programs.

(b) RAM 111: The RAM 111 stores the various data that are sent and received between the host terminal 101 and the SD memory card 102.

(c) Buffer 112, Card Interface Portion 113: The buffer 112 and the card interface portion 113 are for the writing of data that have been read from the SD memory card 102 to the RAM 111, and the reading of data to be written to the SD memory card 102 from the RAM 111.

(d) I/O Buffer: The I/O buffer inputs and outputs data such as commands, responses, and data. The I/O buffer includes a data/command output 114a, a data/response input 114b, a data output 114c, a data input 114d, a driver 115a, a receiver 115b, a driver 115c, and a receiver 115d, and these are connected as shown in FIG. 1.

(e) Driver 116: The driver 116 sends the clock CLKH to the SD memory card 102 over the clock signal transmission line 105.

(2-2) SD Memory Card (a) CPU 130: The CPU 130 achieves various functions that are described later, such as the reading and writing of data with the SD memory card 102, based on various programs.

(b) Flash Memory 131a: The flash memory 131a stores the various data that are communicated between the host terminal 101 and the SD memory card 102.

(c) Flash Memory Interface Portion 131b, Buffer 132, Host Interface Portion 133: The flash memory interface portion 131b, the buffer 132, and the host interface portion 133 are involved in the writing to the flash memory 131a of data that have been read from the host terminal 101, and the reading from the flash memory 131a of data to be written to the host terminal 101.

(d) I/O Buffer: The I/O buffer inputs and outputs data such as commands, responses, and data. The I/O buffer includes a data/response output 134a, a data/command input 134b, a data output 134c, a data input 134d, a driver 135a, a receiver 135b, a driver 135c, and a receiver 135d, and these are connected as shown in FIG. 1.

(e) Receiver 136: Receives the clock CLKH from the host terminal 101.

(3) Functional Configuration

FIG. 3 is a diagram of the functional configuration of the CPU 110 of the host terminal 101 and the CPU 130 of the SD memory card 102.

(3-1) Functional Configuration of the CPU of the Host Terminal (a) Clock Creation Portion, Clock Transmission Portion A clock creation portion 150 creates a basic clock CLKH for the sending and receiving of data between the host terminal 101 and the SD memory card 102. In order to control the various functions of the CPU 110 based on the clock CLKH, the clock creation portion 150 sends the clock CLKH to a clock transmission portion 151, a timing control portion 152, a command transmission portion 156, a response reception portion 158, a read data reception portion 160, and a write data transmission portion 162, for example. The clock transmission portion 151 sends the clock CLKH to the SD memory card 102 over the clock signal transmission line 105.

(b) Timing Control Portion, First Time Slot Obtaining Portion, Parameter Memory Portion A parameter memory portion 154 stores information on the header length, the footer length, and the basic time slot length that have been chosen as the communications standard. Here, the header length and the footer length are the length of the header and the footer as defined by the bit number. The basic time slot length is the length of the basic time slot, which is the interval between data packets that are defined by the bit number.

The first time slot obtaining portion 153 calculates and obtains the first time slot length, which is the interval between first data fragments, based on the header length, the footer length, and the basic time slot length that are obtained from the parameter memory portion 154. The first data fragments are continuously transmitted from the SD memory card 102 over the control signal transmission line 106. Here, the first time slot length is calculated as the sum of the footer length, the basic time slot length, and the header length. The first time slot obtaining portion 153 sends the first time slot length to a command creation portion 155.

The timing control portion 152 and the first time slot obtaining portion 153 receive data packets from the read data reception portion 160, which is described later, over the data signal transmission line 107, and obtain the second data fragment bit length that is included in the header information of the data packets. Here, the bit length of the first data fragment and the bit length of the second data fragment are the same. The first time slot obtaining portion 153 counts the header length, the bit length of the second (or first) data fragment, and the first time slot length in that order based on the clock CLKH, and by doing so obtains the starting position of the first time slot. The first time slot obtaining portion 153 then sends the first time slot starting position to the command transmission portion 156. The timing control portion 152 counts the header length, the bit length of the second (or first) data fragment, the footer length, and the basic time slot length in that order based on the clock CLKH, and sends the count value to the read data reception portion 160.

It should be noted that it is also possible to obtain the time slot starting position based on the count value from the timing control portion 152 instead of from the first time slot obtaining portion 153.

(c) Command Creation Portion, Command Transmission Portion

The command creation portion 155 creates various commands, such as a read command for reading read data such as video and audio stored on the SD memory card 102, a write command for writing data to the SD memory card 102, and a read interrupt command for stopping the reading of read data from the SD memory card 102.

Here, when reading, the host terminal 101 receives read data from the SD memory card 102, continuously receiving first data fragments over the control signal transmission line 106 and continuously receiving data packets over the data signal transmission line 107. The read interrupt command is a command (interrupt signal) that, in this case, is sent to the SD memory card 102 using the first time slot between adjacent first data fragments, and is for stopping the transmission of read data. The command creation portion 155 determines the state of the host terminal 101, such as a delay in the writing to the RAM 111 of the read data that are transmitted from the SD memory card 102, and determines whether or not to send a read interrupt command. If the command creation portion 155 is to send a read interrupt command, it creates the read interrupt command such that the bit length of the read interrupt command does not exceed the first time slot length.

The command transmission portion 156 sends various commands, such as the read command and the write command, to the SD memory card 102 over the control signal transmission line 106 based on the clock CLKH. It should be noted that the command transmission portion 156 sends the read interrupt command based on the starting position of the first time slot, so that the read interrupt command can be sent during the first time slot.

(d) Response Reception Portion

The response reception portion 158 receives, from the SD memory card 102, a response to the command that has been transmit by the host terminal 101. It should be noted that the response reception portion 158 determines whether a write interrupt response, that is, a so-called "busy signal," is being received from the SD memory card 102, and notifies the write data transmission portion 162 whether or not a write interrupt response has been received.

(e) Read Data Reception Portion, Read Data Creation Portion

The read data reception portion 160 receives the first data fragments and data packets from the SD memory card 102 based on the clock CLKH. Here, the read data reception portion 160 receives the first data fragments via the control signal transmission line 106 and receives the data packets via the data signal transmission line 107. The read data reception portion 160 receives from the timing control portion 152 a count value that is obtained by counting the header length, the bit length of the second (or first) data fragment, the footer length, and the basic time slot length, in that order. Based on this count value, the read data reception portion 160 can accurately receive the first data fragment and the second data fragment within the data packet without loss. It should be noted that the first data fragment of the control signal transmission line 106 is transmitted based on the header information and the footer information of the data packet of the data signal transmission line 107, and the first data fragment and the second data fragment of the data packet are synchronized.

A read data creation portion 159 creates read data from a plurality of first and second data fragments, and stores this on the RAM 111.

(f) Transmission Data Creation Portion, Write Data Transmission Portion

A transmission data creation portion 161 reads the write data for writing to the SD memory card 102 from the RAM 111 when a write command is created, and creates a plurality of first data fragments and data packets. The first data fragments are created without adding header information or footer information. On the other hand, the data packets are created so as to include header information, a second data fragment, and footer information. The bit lengths of the first data fragments and the second data fragments, which are transmitted in synchronization with one another, are the same.

Based on the clock CLKH, the write data transmission portion 162 sends the first data fragments to the SD memory card 102 over the control signal transmission line 106, and sends the data packets to the SD memory card 102 over the data signal transmission line 107. It should be noted that the write data transmission portion 162 sends the first data fragments of the control signal transmission line 106 based on the header information and the footer information of the data packets of the data signal transmission line 107. Thus, the first data fragments and the second data fragments of the data packets are synchronized.

The write data transmission portion 162 receives whether or not a write interrupt response has been received from the response reception portion 158. If a write interrupt response is being received, the write data transmission portion 162 stops transmission of the first data fragments and the data packets. On the other hand, if a write interrupt response is not being received, then it continues to transmit the first data fragments and the data packets, and restarts the sending of these when a write interrupt response is cancelled.

Here, if the write data transmission portion 162 is transmitting first data fragments and data packets when the response reception portion 158 receives a write interrupt response, then the write data transmission portion 162 completes transmitting the first data fragments and data packets. Completing the transmission of first data fragments and the data packets that are being transmitted when the write interrupt response is received makes it possible to prevent the transmission of the first data fragments and data packets that are being transmitted from becoming incomplete and the data from becoming broken.

(3-2) Functional Configuration of CPU of SD Memory Card (a) Clock Reception Portion A clock reception portion 170 receives the clock CLKH from the host terminal 101. It should be noted that the clock CLKH is changed to a card clock CLKS due to delay when transmitting from the host terminal 101 to the SD memory card 102. The clock reception portion 170 sends the card clock CLKS to a timing control portion 172, a command reception portion 177, a response transmission portion 178, a read data transmission portion 179, and a write data reception portion 181, for example.

(b) Timing Control Portion, First Time Slot Obtaining Portion, Parameter Memory Portion A parameter memory portion 174 stores information on the header length, the footer length, and the basic time slot length that have been chosen as the communications standard. The first time slot obtaining portion 173 calculates and obtains the first time slot length, which is the interval between adjacent first data fragments, based on the header length, the footer length, and the basic time slot length that are obtained from the parameter memory portion 174. The first time slot obtaining portion 173 sends the first time slot length to a response creation portion 175.

The timing control portion 172 and the first time slot obtaining portion 173 receive data packets from a write data reception portion 181, which is described later, and obtain the bit length of the second data fragments that are included in the header information of the data packets. The first time slot obtaining portion 173 counts the header length, the bit length of the second (or first) data fragment, and the first time slot length in that order based on the card clock CLKS, obtaining the starting position of the first time slot. The first time slot obtaining portion 173 then sends the starting position of the first time slot to the response transmission portion 178. It should be noted that the bit lengths of the first data fragments and the second data fragments, which are transmitted in synchronization with one another, are the same.

The timing control portion 172 counts the header length, the bit length of the second (or first) data fragment, the footer length, and the basic time slot length in that order based on the card clock CLKS, and sends the count value to the write data reception portion 181.

(c) Command Reception Portion

The command reception portion 177 receives various commands, including a read interrupt command, over the control signal transmission line 106 from the host terminal 101 based on the card clock CLKS.

(d) Response Creation Portion, Response Transmission Portion

The response creation portion 175 creates a response to the various commands from the host terminal 101. The response creation portion 175 also creates a write interrupt response for stopping the writing of write data.

Here, when writing, the SD memory card 102 receives write data from the host terminal 101, continuously receiving the first data fragments over the control signal transmission line 106. In this case, the write interrupt response is a response (interrupt signal) that is transmitted to the host terminal 101 using the first time slot between adjacent first data fragments, and is for stopping the transmission of write data. The response creation portion 175 determines the state of the SD memory card 102, such as a delay in the writing to the flash memory 131a of the write data that are transmitted from the host terminal 101, and determines whether or not to send a write interrupt response. If the response creation portion 175 is to send a write interrupt response, it creates the write interrupt response such that the bit length of the write interrupt response does not exceed the first time slot length.

When the command reception portion 177 receives various commands from the host terminal 101, the response transmission portion 178 transmits responses to the host terminal 101 over the control signal transmission line 106. The response transmission portion 178 also transmits the write interrupt response based on the starting position of the first time slot, such that the write interrupt response can be transmitted within the first time slot. It should be noted that the write interrupt response is created and transmitted to the host terminal 101 until it becomes possible to write the write data to the flash memory 131a.

It should be noted that, as will be discussed later, if the read data transmission portion 179 is transmitting first data fragments and data packets to the host terminal 101 at the time that a read interrupt command is being received, the response transmission portion 178 sends a response to the host terminal 101 after the transmission of these is complete.

(e) Write Data Reception Portion, Write Data Creation Portion

The write data reception portion 181 receives the first data fragments and data packets from the host terminal 101 based on the card clock CLKS. Here, the write data reception portion 181 receives first data fragments via the control signal transmission line 106 and receives data packets via the data signal transmission line 107. The write data reception portion 181 receives from the timing control portion 172 a count value that is obtained by counting the header length, the bit length of the second (or first) data fragment, the footer length, and the basic time slot length in that order. Based on this count value, the write data reception portion 181 can accurately receive the first data fragments and the second data fragments within the data packets without loss. It should be noted that the first data fragments are transmitted based on the header information and the footer information of the data packets, and the first data fragments and the second data fragments of the data packets are synchronized.

The write data creation portion 182 creates write data from a plurality of first and second data fragments, and stores them on the flash memory 131a.

(f) Transmission Data Creation Portion, Read Data Transmission Portion

The transmission data creation portion 180 reads the read data for transmission to the host terminal 101 from the flash memory 131a when the command reception portion 177 receives a read command from the host terminal 101, and creates a plurality of first data fragments and data packets. The data packets are created so as to include header information, a second data fragment, and footer information. The bit numbers of the first data fragments and the second data fragments, which are transmitted in synchronization with one another, are the same.

Based on the card clock CLKS, the read data transmission portion 179 sends the first data fragments to the host terminal 101 over the control signal transmission line 106, and sends the data packets to the host terminal 101 over the data signal transmission line 107. It should be noted that the read data transmission portion 179 sends the first data fragments based on the header information and the footer information of the data packets. Thus, the first data fragments and the second data fragments of the data packets are synchronized.

If the read data transmission portion 179 is transmitting first data fragments and data packets when a read interrupt command is received, then the read data transmission portion 179 completes transmission of the first data fragments and data packets. Completing the transmission of the first data fragments and the data packets that are being transmitted when a read interrupt command is received makes it possible to prevent the transmission of the first data fragments and data packets that are being transmitted from becoming incomplete and becoming broken data.

(4) Flow of Processing

In the processing that is described below, the clock CLKH is transmitted from the host terminal 101 to the SD memory card 102.

(4-1) When Reading

Figure 4:
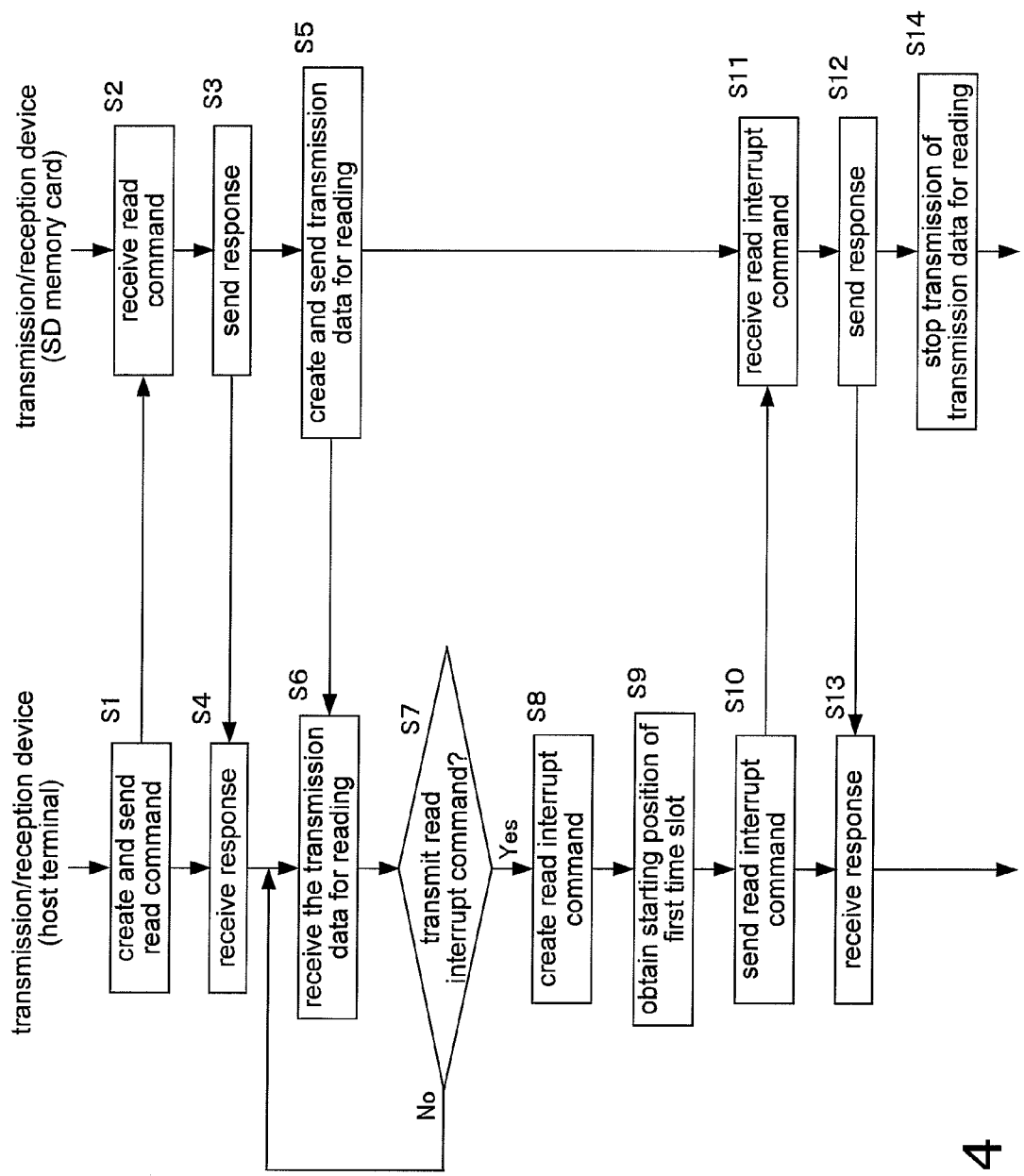
FIG. 4 is a flowchart that shows an example of the flow of processing when reading, by the communications system of this embodiment.

FIG. 4 is a flowchart that shows an example of the flow of processing when reading, by the communications system of this embodiment.

Steps S1, S2: The command creation portion 155 of the host terminal 101 creates a read command for reading read data from the SD memory card 102. The command transmission portion 156 of the host terminal 101 transmits the read command to the SD memory card 102 over the control signal transmission line 106 (step S1). The command reception portion 177 of the SD memory card 102 receives the read command (step S2).

Steps S3, S4: The response transmission portion 178 of the SD memory card 102 sends a response to the read command to the host terminal 101 over the control signal transmission line 106 (step S3). The response reception portion 158 of the host terminal 101 receives the response (step S4).

Step S5, S6: In accordance with reception of the read command, the transmission data creation portion 180 of the SD memory card 102 reads the read data from the flash memory 131a and creates first data fragments and data packets. The read data transmission portion 179 of the SD memory card 102 sends the first data fragments to the host terminal 101 over the control signal transmission line 106, and sends the data packets to the host terminal 101 over the data signal transmission line 107 (step S5). The read data reception portion 160 of the host terminal 101 receives the first data fragments and the data packets from the SD memory card 102 (step S6). At this time, the timing control portion 152 of the host terminal 101 counts the header length, the bit length of the second (or first) data fragment, the footer length, and the basic time slot length, in that order, and sends the count value to the read data reception portion 160.

Then, the read data creation portion 159 creates read data from the first and second data fragments, and stores this on the RAM 111.

Steps S7, S8: The command creation portion 155 of the host terminal 101 determines whether or not to a read interrupt command should be transmitted, and if one is to be transmitted (Yes), it creates a read interrupt command (step S7). At this time, the first time slot obtaining portion 153 of the host terminal 101 calculates a first time slot length based on the header length, the footer length, and the basic time slot length. The command creation portion 155 of the host terminal 101 creates a read interrupt command such that it does not exceed the first time slot length (step S8). If transmission of a read interrupt command is not to be performed (No), then the read data reception portion 160 of the host terminal 101 receives additional first data fragments and data packets.

Step S9: The first time slot obtaining portion 153 of the host terminal 101 counts the header length, the second (or first) data fragment bit length, and the first time slot length in that order based on the clock CLKH, and obtains the starting position of the first time slot.

Steps S10, S11: The command transmission portion 156 of the host terminal 101 transmits the read interrupt command to the SD memory card 102 over the control signal transmission line 106, based on the starting position of the first time slot (step S10). The command reception portion 177 of the SD memory card 102 receives the read interrupt command from the host terminal 101 (step S11).

Steps S12, S13: The response transmission portion 178 of the SD memory card 102 transmits a response to the read interrupt command to the host terminal 101 over the control signal transmission line 106 (step S12). It should be noted that if the read data transmission portion 179 is transmitting a first data fragment and a data packet when the read interrupt command is received, then the response transmission portion 178 transmits the response after the transmission of these is complete.

The response reception portion 158 of the host terminal 101 receives the response from the SD memory card 102 (step S13).

Step S14: The read data transmission portion 179 of the SD memory card 102 stops the transmission of first data fragments and data packets.

Then, when a read command is again transmitted from the host terminal 101 to the SD memory card 102, the SD memory card 102 resumes the transmission of first data fragments and data packets over the control signal transmission line 106 and the data signal transmission line 107.

(4-2) When Writing

Figure 5:
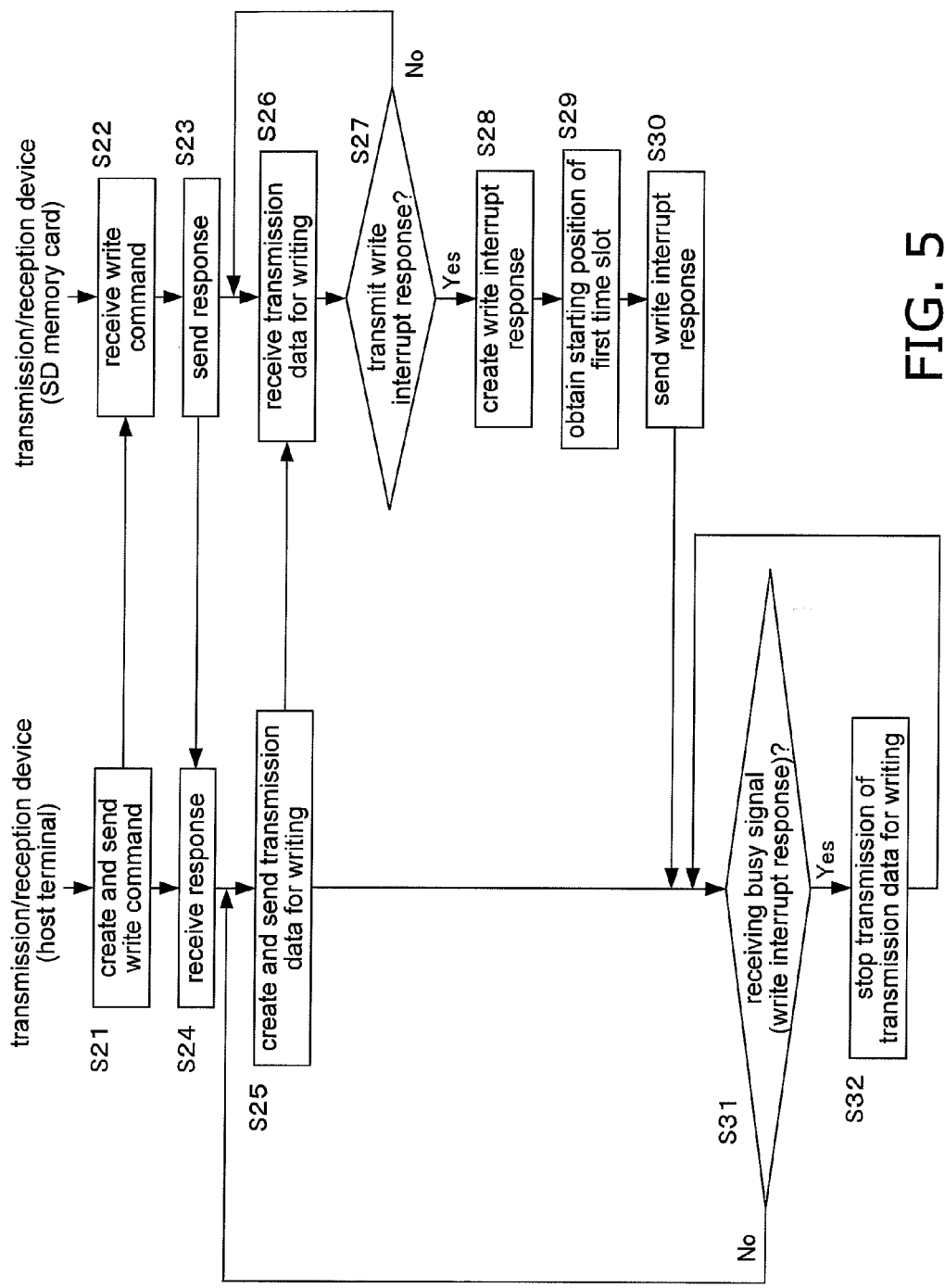
FIG. 5 is a flowchart that shows an example of the flow of processing when writing, by the communications system of this embodiment.

FIG. 5 is a flowchart that shows an example of the flow of processing when writing, by the communications system of this embodiment.

Step S21: The command creation portion 155 and the command transmission portion 156 of the host terminal 101 create and transmit a write command for writing write data to the SD memory card 102 (step S21). The command reception portion 177 of the SD memory card 102 receives the write command (step S22).

Step S23: The response transmission portion 178 of the SD memory card 102 and the response reception portion 158 of the host terminal 101 send and receive the response to the write command.

Steps S25, S26: In accordance with reception of the write command, the transmission data creation portion 161 and the write data transmission portion 162 of the host terminal 101 read the write data from the RAM 111 and create first data fragments and data packets, and send these to the SD memory card 102 (step S25). The write data reception portion 181 of the SD memory card 102 receives the first data fragments and the data packets from the host terminal 101 (step S26). At this time, the timing control portion 172 of the SD memory card 102 counts the header length, the second (or first) data fragment bit length, the footer length, and the basic time slot length, in that order, and sends the count value to the write data reception portion 181.

Then, the write data creation portion 182 creates write data from the first data fragments and the data packets, and stores them on the flash memory 131a.

Steps S27, S28: The response creation portion 175 of the SD memory card 102 determines whether or not a write interrupt response should be transmitted, and if one is to be transmitted (Yes), then it creates a write interrupt response (step S27). At this time, the first time slot obtaining portion 173 of the SD memory card 102 calculates a first time slot length based on the header length, the footer length, and the basic time slot length. The response creation portion 175 of the SD memory card 102 creates a write interrupt response such that it does not exceed the first time slot length (step S28). If transmission of a write interrupt response is not to be performed (No), then the write data reception portion 181 of the SD memory card 102 receives further first data fragments and data packets.

Step S29: The first time slot obtaining portion 173 of the SD memory card 102 counts the header length, the second (or first) data fragment bit length, and the first time slot length in that order based on the card clock CLKS, obtaining the starting position of the first time slot.

Step S30: The response transmission portion 178 of the SD memory card 102 transmits the write interrupt response to the host terminal 101 over the control signal transmission line 106, based on the starting position of the first time slot (step S30).

Steps S31, S32: The response reception portion 158 of the host terminal 101 determines whether or not a write interrupt response, otherwise known as a busy signal, is being received from the SD memory card 102 (step S31). If a write interrupt response is not being received (No), then in step S25, the write data transmission portion 162 creates and transmits first data fragments and data packets.

On the other hand, if a write interrupt response is being received (Yes), then the write data transmission portion 162 of the host terminal 101 stops transmitting the first data fragments and the data packets over the control signal transmission line 106 and the data signal transmission line 107 (step S32). Then, when the write interrupt response is no longer received, the write data transmission portion 162 resumes the creation and transmission of first data fragments and data packets in step S25.

(5) Action Effect

In this embodiment, header information and footer information are not added to the first data fragments of the control signal transmission line 106. The transmission side uses the header information and the footer information of the data packets of the data signal transmission line 107 to synchronize the first data fragments and the second data fragments of the data packets and send them to the reception side. At this time, the first time slot between adjacent first data fragments on the control signal transmission line 106 is formed longer than the interval between the data packets of the data signal transmission line 107 by the bit length of the footer information and the header information. In this invention, the first time slot is exploited to send interrupt signals such as the read interrupt command and the write interrupt response. Thus, a separate period that must be secured in order to transmit the read interrupt command or the write interrupt response, for example, is either not necessary or that separate period can be shortened. The first time slot thus can be used to inhibit a drop in the data transmission efficiency due to the transmission of an interrupt signal. Further, because the first time slot is a period during which data fragments are not transmitted, it is also possible to prevent loss of data fragments.

(6) Modified Examples (6-1)

In the above description, neither header information or footer information are added to the first data fragments that are transmitted over the control signal transmission line 106. However, it is also possible to add either one of header information or footer information to the first data fragments. For example, when header information is added before the first data fragments, the first time slot is defined by the spacing between a first data fragment that is transmitted first and the header information of the first data fragment that is transmitted next. Alternatively, when footer information is added after the first data fragment, the first time slot is defined by the spacing between the footer information of a first data fragment that is transmitted first and the first data fragment that is transmitted next. Using such a first time slot allows a time slot to be sufficiently secured with only the header length or the footer length, and allows a drop in the transmission efficiency to be inhibited.

(6-2)

The SD memory card 102 processes the data in 8-bit units. Thus, the above first time slot length that is calculated by the sum of the footer length, the basic time slot length, and the header length preferably is a multiple of eight.

(6-3)

A switch time t1 of several clocks length, for example, is necessary between the end of the transmission of data from the transmission side until the reception side can properly output a command to the transmission side. A switch time t2 of several clocks length, for example, is necessary between the end of the transmission of an interrupt signal from the reception side until the transmission side can again resume the transmission of data. Thus, the first time slot length preferably is a bit length that includes the switch times t1 and t2. In other words, the first time slot length, which is the interval between the first data fragments, is calculated by the sum of the footer length of the data packet, the bit number of the switch time t1, the bit number of the command, the switch time t2, and the header length of the data packet. Further, as mentioned above, it is also preferable for the first time slot length that is expressed to be a multiple of eight.

(6-4)

The above description is of a case in which the reception side transmits a read interrupt command or a write interrupt response to the transmission side at a time when data are being received from the transmission side. This embodiment can also be adopted for a case in which, when data are being received from the transmission side, various signals for delaying transmission for a fixed period of time or for instructing data to be resent are transmitted to the transmission side.

(6-5)

In the above description, the data packets are formed so as to include header information, the data packet, and footer information, in that order, but the order of these is not limited to that described above.

(6-6)

The above describes the present embodiment with regard to a communications system that has a control signal transmission line and a data signal transmission line. However, the embodiment can also be adopted for a communications system that has only data signal transmission lines and does not have a control signal transmission line. For example, the first data fragments, to which header information and footer information have not been added, are transmitted over any one of the data signal transmission lines. Then, the interval between first data fragments that are sent in series over that data signal transmission line is used to transmit the read interrupt command and the write interrupt response.

(6-7)

In the above description, the header length, the footer length, and the basic time slot length are determined according to the communications standard. However, it is also possible for the header length, the footer length, and the basic time slot length to be different for each SD memory card, and for this information to be obtained when initiating communication between the host terminal 101 and the SD memory card 102.

(6-8)

The control signal transmission line 106 and the data signal transmission line 107 can also each be a pair of two differential transmission lines.

(6-9)

The above describes a configuration in which the bit length of each data fragment is listed in the header information. However, it is also possible for the bit length of the data fragment to be fixed according to the communications standard. In this case, the bit length of the data fragment can be stored in the parameter memory portion, and it is not necessary to continually obtain the bit length of the data fragment from the header length of the second data packet.

(6-10)

Because it is preferable for the transmission of data to be immediately stopped by the transmission of an interrupt signal, it is preferable for the interrupt signal to be transmitted using a single first time slot. However, for example in a case where the bit length of the interrupt signal is greater than the first time slot length, it is also possible for the interrupt signal to be partitioned into a plurality of units and for these to be transmitted using a plurality of first time slots.

(6-11)

The above description was made using an SD memory card, which is a removable memory device, as an example, but as long as the removable memory device is portable and transmits read data to a host terminal at a clock that is supplied from the host terminal, the invention can be adopted over a range that is not limited to an SD memory card. Other examples include Compact Flash (registered trademark), smart media, multimedia cards, and memory sticks. The memory that can be mounted in the removable memory device is not limited to a flash memory, and other examples include nonvolatile memories such as MRAM and FeRAM.

(6-12)

A computer program that executes the foregoing method on a computer, and a computer-readable recording medium to which this program is recorded, also are within the scope of the invention. Here, examples of computer-readable recording media include flexible discs, hard discs, CD-ROMs, MOs, DVDs, DVD-ROMs, DVD-RAMs, BDs (Blue-ray Discs), and semiconductor memories.

The computer program is not limited to a computer program that is recorded to a recording medium, and the program can also be transmitted over an electric communications line, a wireless or a land communications line, or a network such as the Internet.

Second Embodiment

Figure 6:
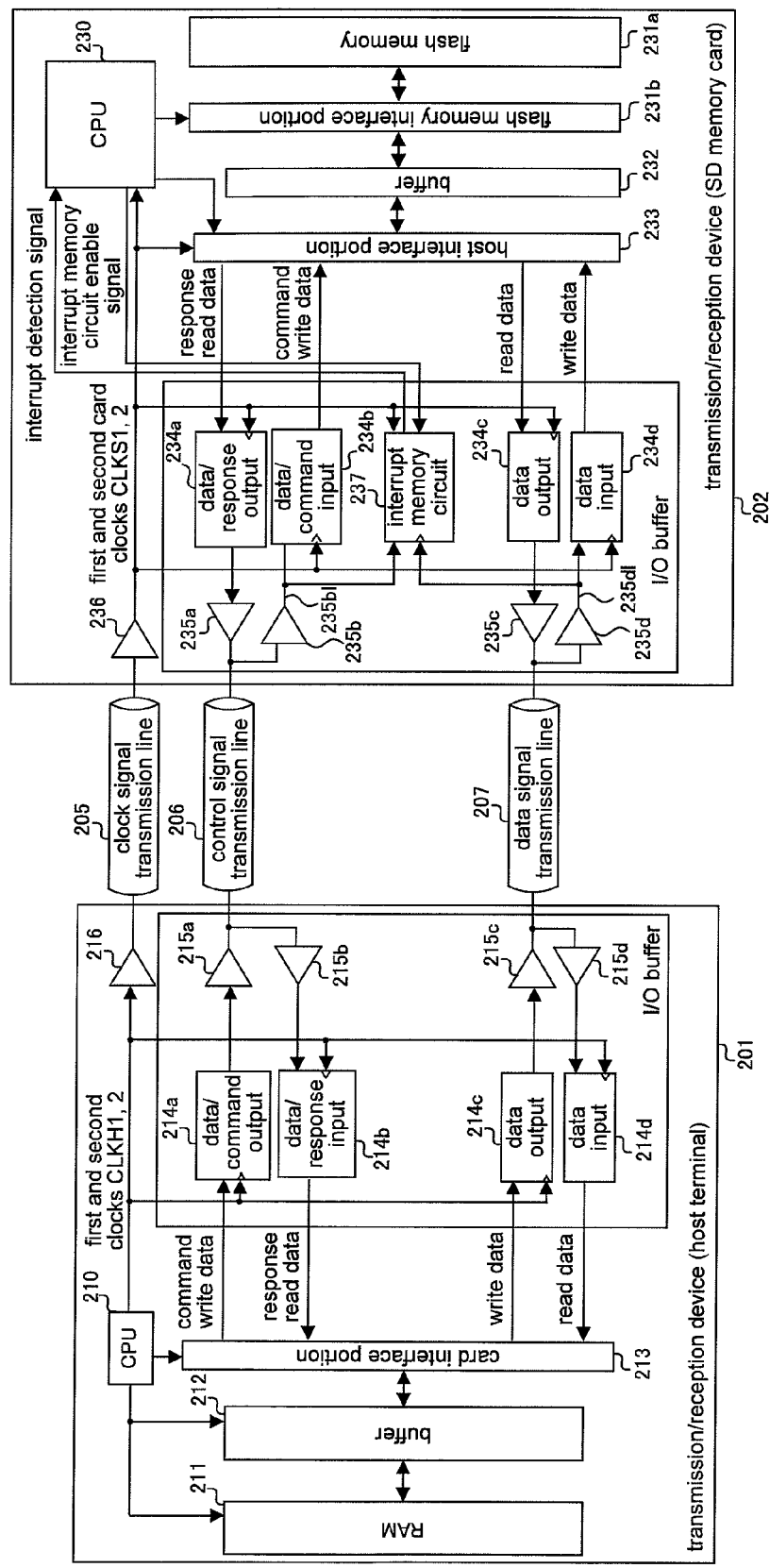
FIG. 6 is an overall view of the communications system according to a first working example of the second embodiment of the invention.
Figure 7:
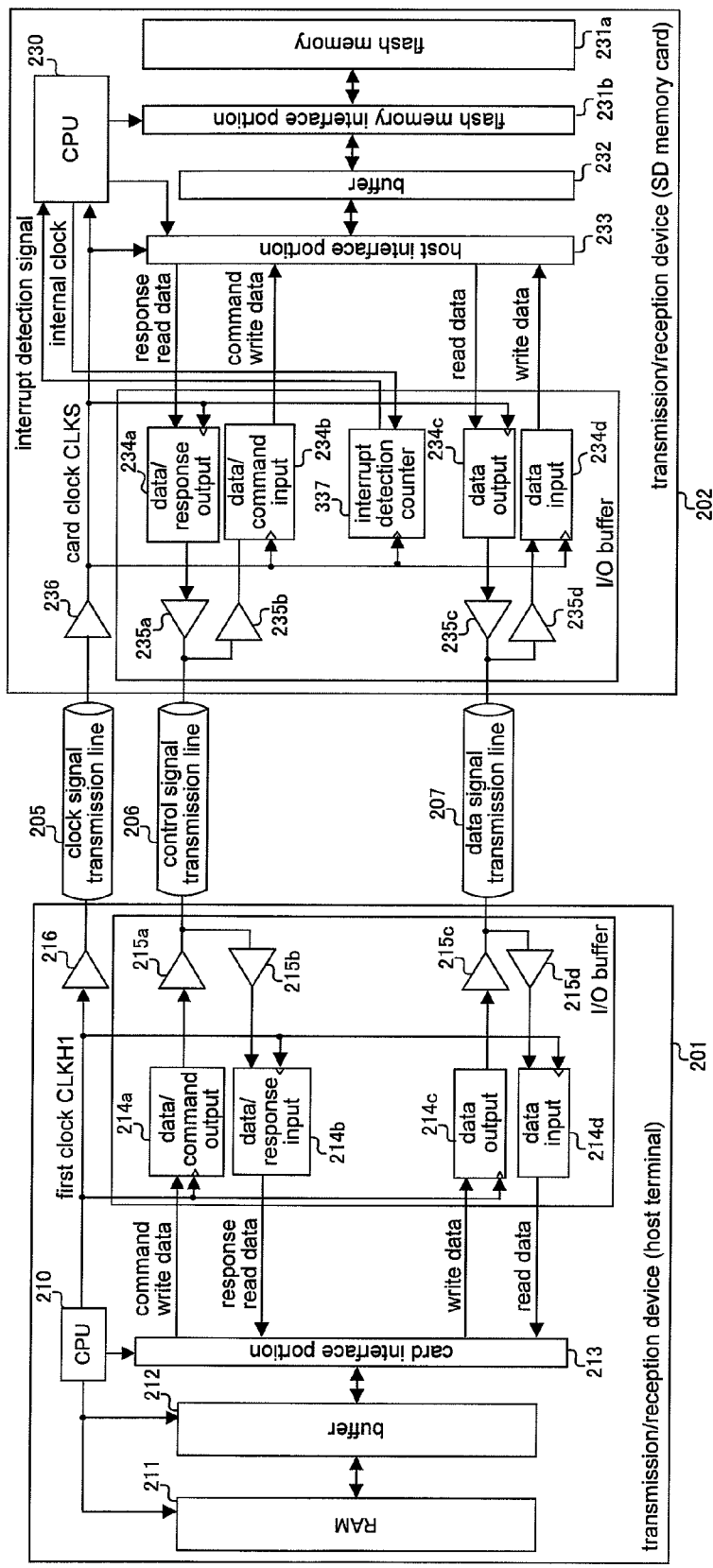
FIG. 7 is an overall view of the communications system according to a second working example of the second embodiment of the invention.

FIGS. 6 and 7 are diagrams of the overall configuration of the communications systems according to the first working example and the second working example of the second embodiment of the invention. In the communications systems, a transmission/reception device that is a host terminal 201 and a transmission/reception device that is an SD (Secure Digital) memory card 202 are connected to one another over transmission lines. The transmission lines include a clock signal transmission line 205, a control signal transmission line 206, and a data signal transmission line 207. The clock signal transmission line 205 is used for transmitting a first clock CLKH1, for example, which is described later and is used for communication between the host terminal 201 and the SD memory card 202, from the host terminal 201 to the SD memory card 202. The control signal transmission line 206 is used for sending and receiving commands for reading and writing data, for example, and responses to those commands, between the host terminal 201 and the SD memory card 202. The data signal transmission line 207 is used for sending and receiving data between the host terminal 201 and the SD memory card 202.

Figure 8:
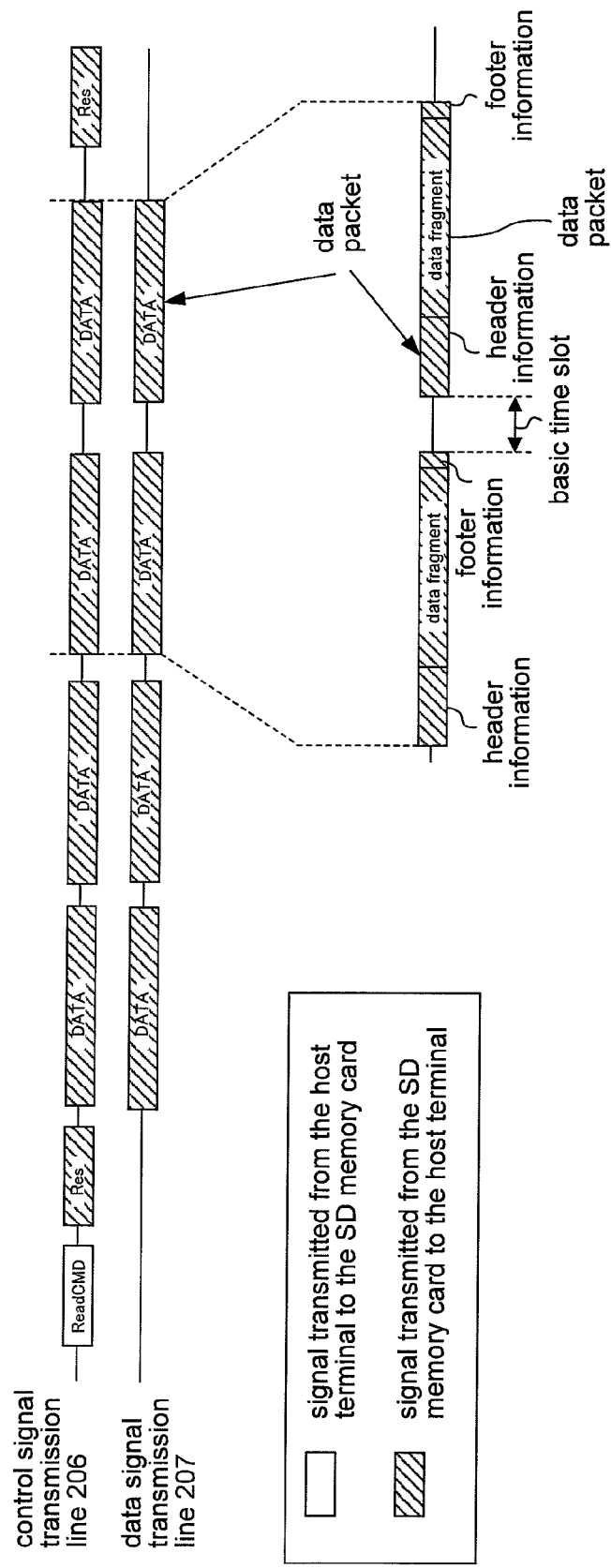
FIG. 8 is a time chart that shows how data are transmitted when reading.

FIG. 8 is a time chart that shows how data are transmitted when reading. The communications system of this embodiment is a hand-shake type communications system, in which when transmitting data, first various commands such as a read command (Read CMD in FIG. 8) and a write command, interrupt commands, and responses to those commands (Res in FIG. 8), are sent and received between the host terminal 201 and the SD memory card 202, and then the transmission of data (DATA in FIG. 8) takes place.

The communications system of this embodiment uses the control signal transmission line 206 in addition to the data signal transmission line 207 to transmit data, as shown in FIG. 8, so as to increase the transmission efficiency of data access. The data are transmitted partitioned into a plurality of data fragments, and there is header information and footer information added to the data fragments that are transmitted over the control signal transmission line 206 and the data signal transmission line 207. In other words, a data packet that includes header information, a data fragment, and footer information is transmitted over the control signal transmission line 206 and the data signal transmission line 207. All of the data packets are structured to have the same bit length.

Here, the header information and the footer information are information that is different from the data fragment. The header information includes information for adjusting the timing at which the data packet is received, such as a synchronization bit sequence and a start bit, and the footer information includes information that indicates the end of the data packet, such as an end bit. It should be noted that the information that is included in the header information and the footer information is not limited to this, and other information can also be included as well. The data fragments can also include information for detecting transmission errors of the data fragments, such as a CRC (Cyclic Redundancy Check) bit.

In this embodiment, the reception side transmits the first clock CLKH1 to the transmission side over the clock signal transmission line. The transmission side transmits data packets to the reception side based on the first clock CLKH1. At this time, the reception side stops transmission of the first clock CLKH1 to the transmission side in order to stop the transmission of data packets from the transmission side. Thus, it is not possible for the transmission side to transmit data packets to the reception side. In this manner the reception side can control the stopping of data packet transmission from the transmission side.

It should be noted that the data signal transmission line 207 is not limited to a single line, and it is also possible for a plurality of data signal transmission lines 207 to be provided.

A first working example and a second working example are described below as examples of this embodiment.

First Working Example (1) Overview

Figure 9:
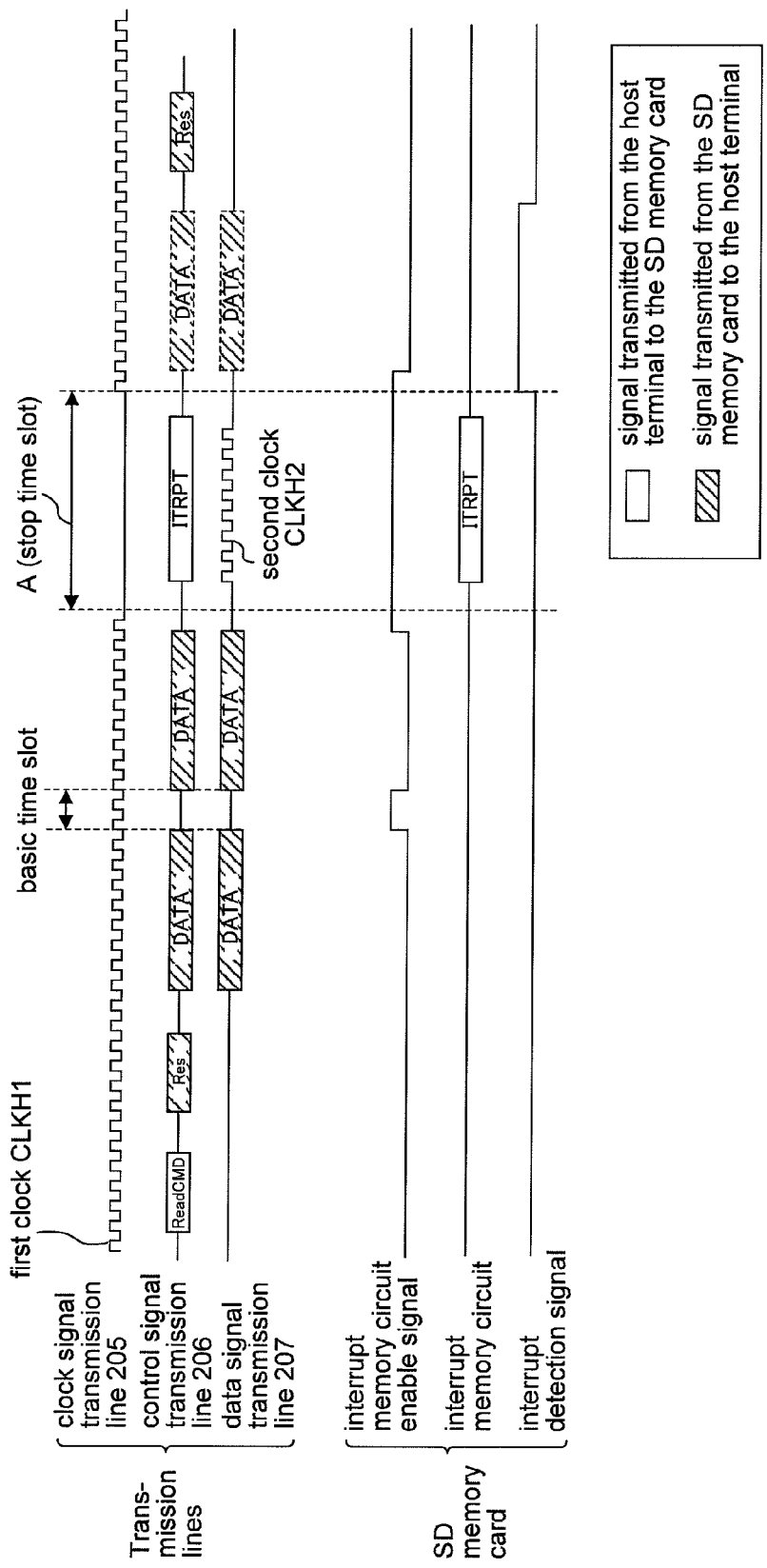
FIG. 9 is a time chart that shows how data are transmitted when reading in the first working example.

FIG. 9 is a time chart that shows how data are transmitted when reading in the first working example. In the first working example, the host terminal 201 stops transmission of the first clock CLKH1 (see period A (stop time slot) in FIG. 9). Thus, the transmission of data packets from the SD memory card 202 is stopped. Next, an interrupt signal (in FIG. 9, ITRPT (for example, the read interrupt command, which is described later)) is sent from the host terminal 201 to the SD memory card 202 over the control signal transmission line 206. A second clock CLKH2 that is different from the first clock CLKH1 is transmitted to the SD memory card 202 over the data signal transmission line 207. The SD memory card 202 receives the interrupt command based on the second clock CLKH2.

(2) Hardware Configuration

Figure 10:
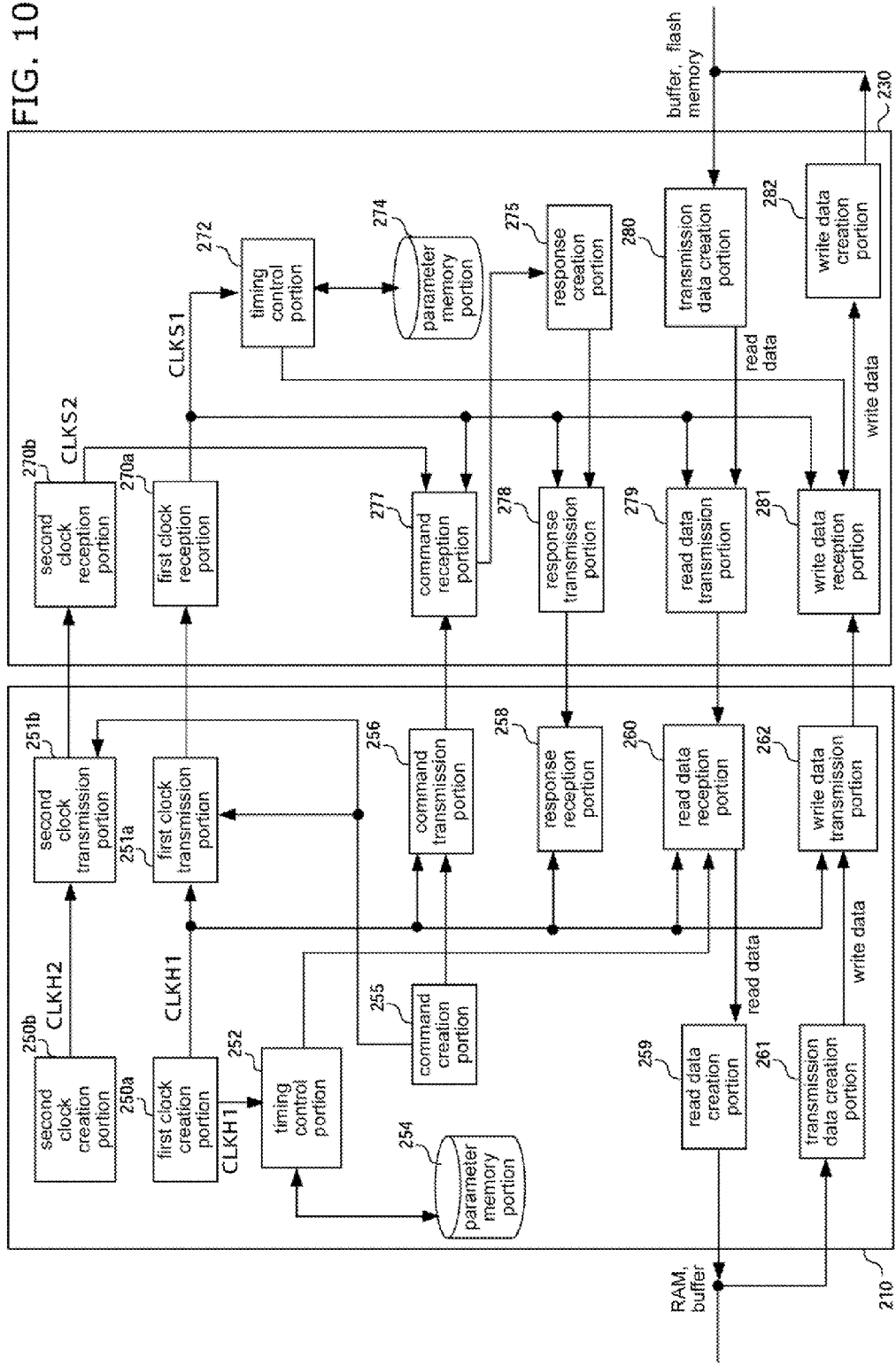
FIG. 10 is a diagram of the functional configuration of the CPU 210 of the host terminal 201 and the CPU 230 of the SD memory card 202.

The follow is a description of the hardware configuration of the host terminal 201 and the SD memory card 202 again using FIG. 6. The host terminal 201 and the SD memory card 202 achieve the various functions that are described later through cooperative action between the hardware configurations shown in FIG. 6 and the functional configuration of the CPU 210 that is shown in FIG. 10, which is described later.

(2-1) Host Terminal (a) CPU 210: The CPU 210 controls a RAM 211, a buffer 212, a card interface portion 213, and an I/O buffer, for example, of the host terminal 201. It also achieves various functions that are described later, such as reading and writing data with the host terminal 201, based on various programs.

(b) RAM 211: The RAM 211 stores the various data that are sent and received between the host terminal 201 and the SD memory card 202.

(c) Buffer 212, Card Interface Portion 213: The buffer 212 and the card interface portion 213 are for the writing of data that have been read from the SD memory card 202 to the RAM 211, and the reading of data to be written to the SD memory card 202 from the RAM 211.

(d) I/O Buffer: The I/O buffer inputs and outputs data such as commands, responses, and data. The I/O buffer includes a data/command output 214a, a data/response input 214b, a data output 214c, a data input 214d, a driver 215a, a receiver 215b, a driver 215c, and a receiver 215d, and these are connected as shown in FIG. 6. It should be noted that the driver 215c sends the second clock CLKH2 to the SD memory card 202 over the data signal transmission line 207.

(e) Driver 216: The driver 216 sends the clock CLKH1 to the SD memory card 202 over the clock signal transmission line 205.

(2-2) SD Memory Card (a) CPU 230: The CPU 230 achieves various functions that are described later, such as the reading and writing of data with the SD memory card 202, based on various programs.

(b) Flash Memory 231a: The flash memory 231a stores the various data that are communicated between the host terminal 201 and the SD memory card 202.

(c) Flash Memory Interface Portion 231b, Buffer 232, Host Interface Portion 233: The flash memory interface portion 231b, the buffer 232, and the host interface portion 233 are involved in the writing of data that have been read from the host terminal 201 to the flash memory 231a, and the reading of data to be written to the host terminal 201 from the flash memory 231a.

(d) I/O Buffer: The I/O buffer inputs and outputs data such as commands, responses, and data. The I/O buffer includes a data/response output 234a, a data/command input 234b, a data output 234c, a data input 234d, a driver 235a, a receiver 235b, a driver 235c, and a receiver 235d, and these are connected as shown in FIG. 6. It should be noted that the receiver 235d receives the second clock CLKH2 from the host terminal 201 over the data signal transmission line 207.

(e) Receiver 236: Receives the first clock CLKH1 from the host terminal 201.

(f) Interrupt Memory Circuit 237: The interrupt memory circuit 237 of the SD memory card 202 is connected to an output line 235b1 of the receiver 235b for receiving input from the control signal transmission line 206, and to an output line 235d1 of the receiver 235d for receiving input from the data signal transmission line 207. The interrupt memory circuit 237 also inputs an interrupt memory circuit enable signal from the CPU 230, and outputs an interrupt detection signal to the CPU 230. Here, with respect to the data packets that are sent in series over the control signal transmission line 206 and the data signal transmission line 207, a interval between the data packet that is sent first and the data packet that is sent next is referred to as the basic time slot (see FIG. 9). The period during which supply of the first clock CLKH1 is stopped is referred as the stop time slot (see FIG. 9). Since there is no supply of the first clock CLKH1 during the stop time slot, the transmission of data packets from the SD memory card 202 to the host terminal 201 is stopped. The interrupt memory circuit enable signal is activated only during the basic time slot and the stop time slot. Thus, the interrupt memory circuit 237 receives the input of the interrupt memory circuit enable signal and can operate only during the basic time slot and the stop time slot.

By stopping the supply of the first clock CLKH1, the transmission of data packets to the host terminal 201 is stopped. Then, as shown in FIG. 9, in the stop time slot (period A in FIG. 9) the interrupt memory circuit 237 receives input of the second clock CLKH2 from the host terminal 201 over the data signal transmission line 207, and also receives input of an interrupt command (ITRPT in FIG. 9) over the control signal transmission line 206. The interrupt memory circuit 237 latches the interrupt command with the second clock CLKH2 as the trigger, and outputs an interrupt detection signal to the CPU 230. It should be noted that due to delay at the time of transmission from the host terminal 201 to the SD memory card 202, the second clock CLKH2 changes to a second card clock CLKS2. Thus, in practice, the interrupt memory circuit 237 receives the interrupt command based on the second card clock CLKS2.

(3) Functional Configuration

FIG. 10 is a diagram of the functional configuration of the CPU 210 of the host terminal 201 and the CPU 230 of the SD memory card 202.

(3-1) Functional Configuration of the Host Terminal CPU (a) First Clock Creation Portion, First Clock Transmission Portion A first clock creation portion 250a creates a basic first clock CLKH1 for sending and receiving data between the host terminal 201 and the SD memory card 202. The first clock creation portion 250a sends the first clock CLKH1 to a first clock transmission portion 251a, a timing control portion 252, a command transmission portion 256, a response reception portion 258, a read data reception portion 260, and a write data transmission portion 262, in order to control the various functional portions of the CPU 210 based on the first clock CLKH1. The first clock transmission portion 251a transmits the first clock CLKH1 to the SD memory card 202 over the clock signal transmission line 205. The first clock transmission portion 251a stops transmission of the first clock CLKH1 to the SD memory card 202 according to control by the command creation portion 255.

(b) Second Clock Creation Portion, Second Clock Transmission Portion

A second clock creation portion 250b creates a second clock CLKH2 that is different from the first clock CLKH1. A second clock transmission portion 251b transmits the second clock CLKH2 to the SD memory card 202 over the data signal transmission line 207, based on control by the command creation portion 255.

(c) Timing Control Portion, Parameter Memory Portion

A parameter memory portion 254 stores information on the header length, the footer length, and the basic time slot length that have been determined as the communications standard. Here, the header length and the footer length are the length of the header and the footer defined by the bit number. The basic time slot length is the length of the basic time slot, which is the interval between data packets that are defined by the bit number. The timing control portion 252 receives data packets from the read data reception portion 260, which is described later, and obtains the bit lengths of the data fragments that are included in the header information of the data packets. The timing control portion 252 counts the header length, the bit length of the data fragment, the footer length, and the basic time slot length in that order based on the first clock CLKH1, and sends the counted valued to the read data reception portion 260.

(d) Command Creation Portion, Command Transmission Portion

The command creation portion 255 creates various commands, such as a read command for reading read data such as video and audio stored on the SD memory card 202, a write command for writing data to the SD memory card 202, and a read interrupt command for stopping the reading of read data from the SD memory card 202. The command transmission portion 256 sends various commands, such as the read command and the write command, to the SD memory card 202 over the control signal transmission line 206 based on the first clock CLKH1.

Here, when reading, the host terminal 201 receives read data from the SD memory card 202, continuously receiving data fragments over the control signal transmission line 206 and the data signal transmission line 207. The read interrupt command is a command (interrupt signal) that, in this case, is sent to the SD memory card 202, and stops the transmission of read data. The command creation portion 255 determines that state of the host terminal 201, such as a delay in the writing to the RAM 211 of the read data that are transmitted from the SD memory card 202, and determines whether or not to send a read interrupt command. Then, when the command creation portion 255 determines that it is necessary to transmit a read interrupt command, it controls the first clock transmission portion 251a such that transmission of the first clock CLKH1 to the SD memory card 202 is stopped, and controls the second clock transmission portion 251b so that it starts transmitting the second clock CLKH2 to the SD memory card 202. After transmission of the first clock CLKH1 has been stopped, the command transmission portion 256 sends the read interrupt command to the SD memory card 202 over the control signal transmission line 206.

(e) Response Reception Portion

The response reception portion 258 receives, from the SD memory card 202, responses to the commands that have been sent by the host terminal 201.

(f) Read Data Reception Portion, Read Data Creation Portion

The read data reception portion 260 receives data packets from the SD memory card 202 based on the first clock CLKH1, over the control signal transmission line 206 and the data signal transmission line 207. The read data reception portion 260 receives a count value that is obtained by counting the header length, the bit length of the data fragment, the footer length, and the basic time slot length, in that order, from the timing control portion 252. Based on this count value, the read data reception portion 260 can accurately receive the data fragment within the data packet without loss.

A read data creation portion 259 creates read data from the data fragments within the data packets, and stores this on the RAM 211.

(g) Transmission Data Creation Portion, Write Data Transmission Portion

A transmission data creation portion 261 reads, from the RAM 211, the write data for writing to the SD memory card 202 when a write command is created, and creates a plurality of data packets to include header information, a data fragment, and footer information.

The write data transmission portion 262 transmits the data packets to the SD memory card 202 over the control signal transmission line 206 and the data signal transmission line 207 based on the first clock CLKH1.

(3-2) Functional Configuration of SD Memory Card CPU (a) First Clock Reception Portion, Second Clock Reception Portion A first clock reception portion 270a receives the first clock CLKH1 from the host terminal 201 via the clock signal transmission line 205. A second clock reception portion 270b receives the second clock CLKH2 from the host terminal 201 via the data signal transmission line 207. It should be noted that due to delay when transmitting from the host terminal 201 to the SD memory card 202, the first clock CLKH1 is changed to a first card clock CLKS1 and the second clock CLKH2 is changed to a second card clock CLKS2. The first clock reception portion 270a sends the first card clock CLKS1 to a timing control portion 270, a command reception portion 277, a response transmission portion 278, a read data transmission portion 279, and a write data reception portion 281. The second clock reception portion 270b sends the second card clock CLKS2 to the command reception portion 277.

(b) Timing Control Portion, Parameter Memory Portion

A parameter memory portion 274 stores information on the header length, the footer length, and the basic time slot length that have been determined as the communications standard.

The timing control portion 272 receives data packets from a write data reception portion 281, which is described later, and obtain the bit length of the data fragments that are included in the header information of the data packets. The timing control portion 272 counts the header length, the bit length of the data fragment, the footer length, and the basic time slot length in that order based on the first card clock CLKS1, and sends the count value to the write data reception portion 281.

(c) Command Reception Portion

The command reception portion 277 receives various commands over the control signal transmission line 206 from the host terminal 201, based on the first card clock CLKS1. The command reception portion 277 also receives the read interrupt command based on the second card clock CLKS2.

(d) Response Creation Portion, Response Transmission Portion

The response creation portion 275 creates responses to the various commands from the host terminal 201.

When the command reception portion 277 receives various commands from the host terminal 201, the response transmission portion 278 transmits the responses to the host terminal 201 over the control signal transmission line 206.

(e) Write Data Reception Portion, Write Data Creation Portion

The write data reception portion 281 receives the data packets from the host terminal 201 over the control signal transmission line 206 and the data signal transmission line 207 in accordance with the first card clock CLKS1. The write data reception portion 281 receives a count value that is obtained by counting the header length, the bit length of the data fragment, the footer length, and the basic time slot length, in that order, from the timing control portion 272. Based on this count value, the write data reception portion 281 can accurately receive the data fragment within the data packet without loss.

The write data creation portion 282 creates write data from a plurality of data fragments, and stores them on the flash memory 231a.

(f) Transmission Data Creation Portion, Read Data Transmission Portion

A transmission data creation portion 280 reads the read data for transmission to the host terminal 201 from the flash memory 231a when the command reception portion 277 receives a read command from the host terminal 201, and creates a plurality of data packets. The data packets are created so as to include header information, a data fragment, and footer information.

Based on the first card clock CLKS1, the read data transmission portion 279 sends the data packets to the host terminal 201 over the control signal transmission line 206 and the data signal transmission line 207.

(4) Flow of Processing

At the start of the processing described below, the first clock CLKH1 is transmitted from the host terminal 201 to the SD memory card 202.

(4-1) When Reading

Figure 11:
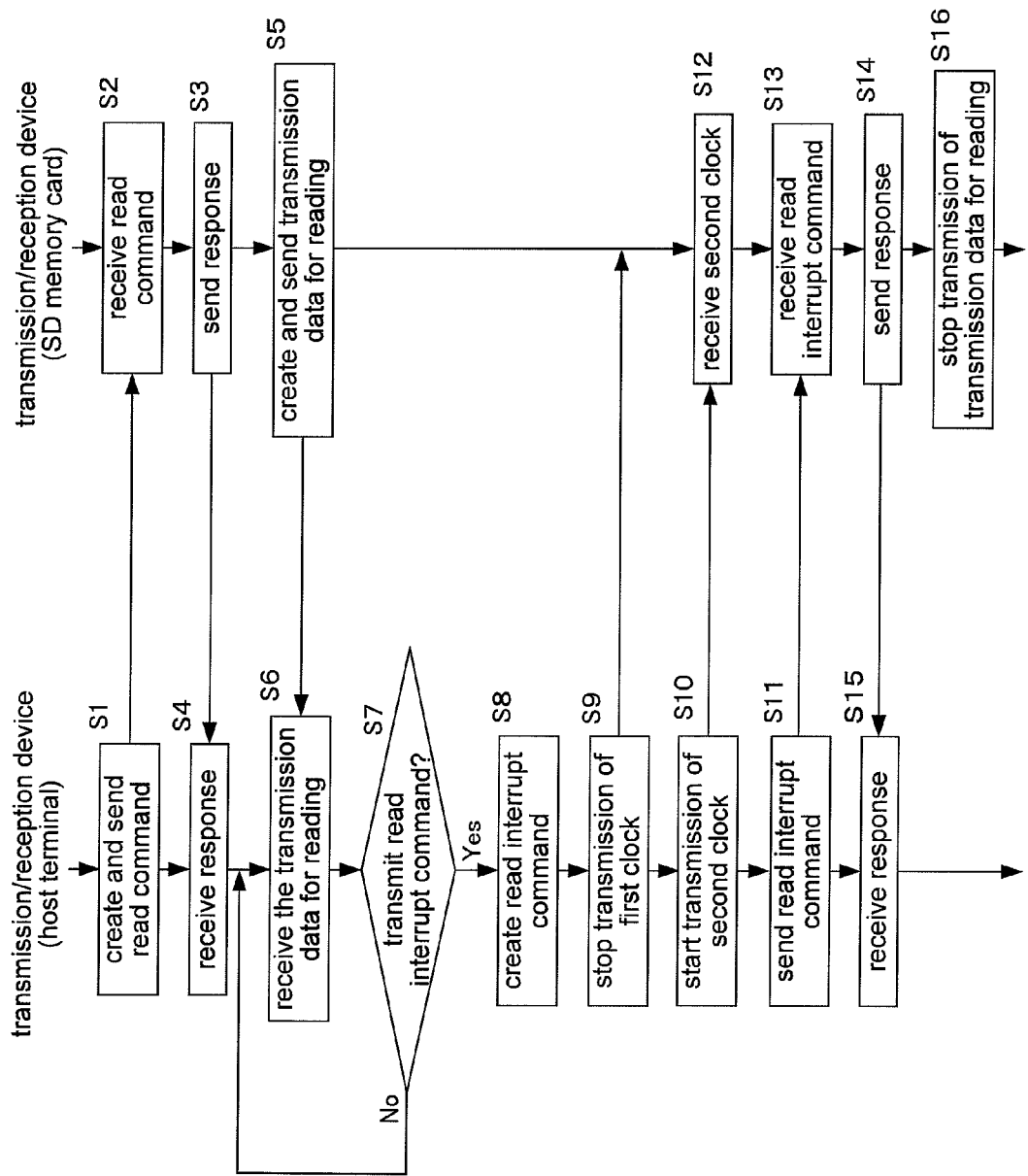
FIG. 11 is a flowchart that shows an example of the flow of the processing when reading, by the communications system of the first working example.

FIG. 11 is a flowchart that shows an example of the flow of the processing when reading, by the communications system of the first working example.

Steps S1, S2: The command creation portion 255 of the host terminal 201 creates a read command for reading the read data from the SD memory card 202. The command transmission portion 256 of the host terminal 201 transmits the read command to the SD memory car d 202 over the control signal transmission line 206 (step S1). The command reception portion 277 of the SD memory card 202 receives the read command (step S2).

Steps S3, S4: The response transmission portion 278 of the SD memory card 202 sends a response to the read command to the host terminal 201 over the control signal transmission line 206 (step S3). The response reception portion 258 of the host terminal 201 receives the response (step S4).

Step S5, S6: In accordance with the read command that is received, the transmission data creation portion 280 of the SD memory card 202 reads the read data from the flash memory 231a and creates data packets. The read data transmission portion 279 of the SD memory card 202 sends the data packets to the host terminal 201 over the control signal transmission line 206 and the data signal transmission line 207 (step S5). The read data reception portion 260 of the host terminal 201 receives the data packets from the SD memory card 202 (step S6). At this time, the timing control portion 252 of the host terminal 201 counts the header length, the bit length of the data fragment, the footer length, and the basic time slot length, in that order, and sends the count value to the read data reception portion 260.

Then, the read data creation portion 259 creates read data from the data fragments, and stores the data on the RAM 211.

Steps S7, S8: The command creation portion 255 of the host terminal 201 determines whether or not to perform transmission of a read interrupt command, and if one is to be transmitted (Yes), it creates a read interrupt command. If transmission of a read interrupt command is not to be performed (No), then the read data reception portion 260 of the host terminal 201 receives more data packets.

Steps S9 through S11: The command creation portion 255 of the host terminal 201 stops the transmission of the first clock CLKH1 to the SD memory card 202 (step S9), and transmits the second clock CLKH2 and the read interrupt command to the SD memory card 202 (steps S10, S11).

Steps S12, S13: The command reception portion 277 of the SD memory card 202 receives the read interrupt command based on the second card clock CLKS2.

Steps S14, S15: The response transmission portion 278 of the SD memory card 202 transmits a response to the read interrupt command to the host terminal 201 over the control signal transmission line 206 (step S14). The response reception portion 258 of the host terminal 201 receives the response from the SD memory card 202 (step S15).

Step S16: The read data transmission portion 279 of the SD memory card 202 stops the transmission of data packets (step S16).

Subsequently, when a read command is again transmitted from the host terminal 201 to the SD memory card 202, the SD memory card 202 resumes the transmission of data packets over the control signal transmission line 206 and the data signal transmission line 207.

(5) Action Effect

According to the first working example, when the host terminal 201 stops supplying the first clock CLKH1 to the SD memory card 202, the transmission of data packets from the SD memory card 202 is stopped. In this way, the host terminal 201 stops the transmission of data packets, and sends a read interrupt command and the second clock CLKH2 to the SD memory card 202. In other words, the host terminal 201 can transmit the read interrupt command and the second clock CLKH2 at any time, and it is not necessary to provide, in advance, a period for transmitting the read interrupt command and the second clock CLKH2 between the data packets. Thus, the interval between data packets can be shortened and a drop in the efficiency of data transmission can be inhibited. Further, after the transmission of data packets from the SD memory card 202 has been stopped, the read interrupt command and the second clock CLKH2 are transmitted over the transmission line that was used for transmitting the data packets. Consequently, loss of the data fragment within a data packet can be prevented.

Second Working Example

(1) Overview

Figure 12:
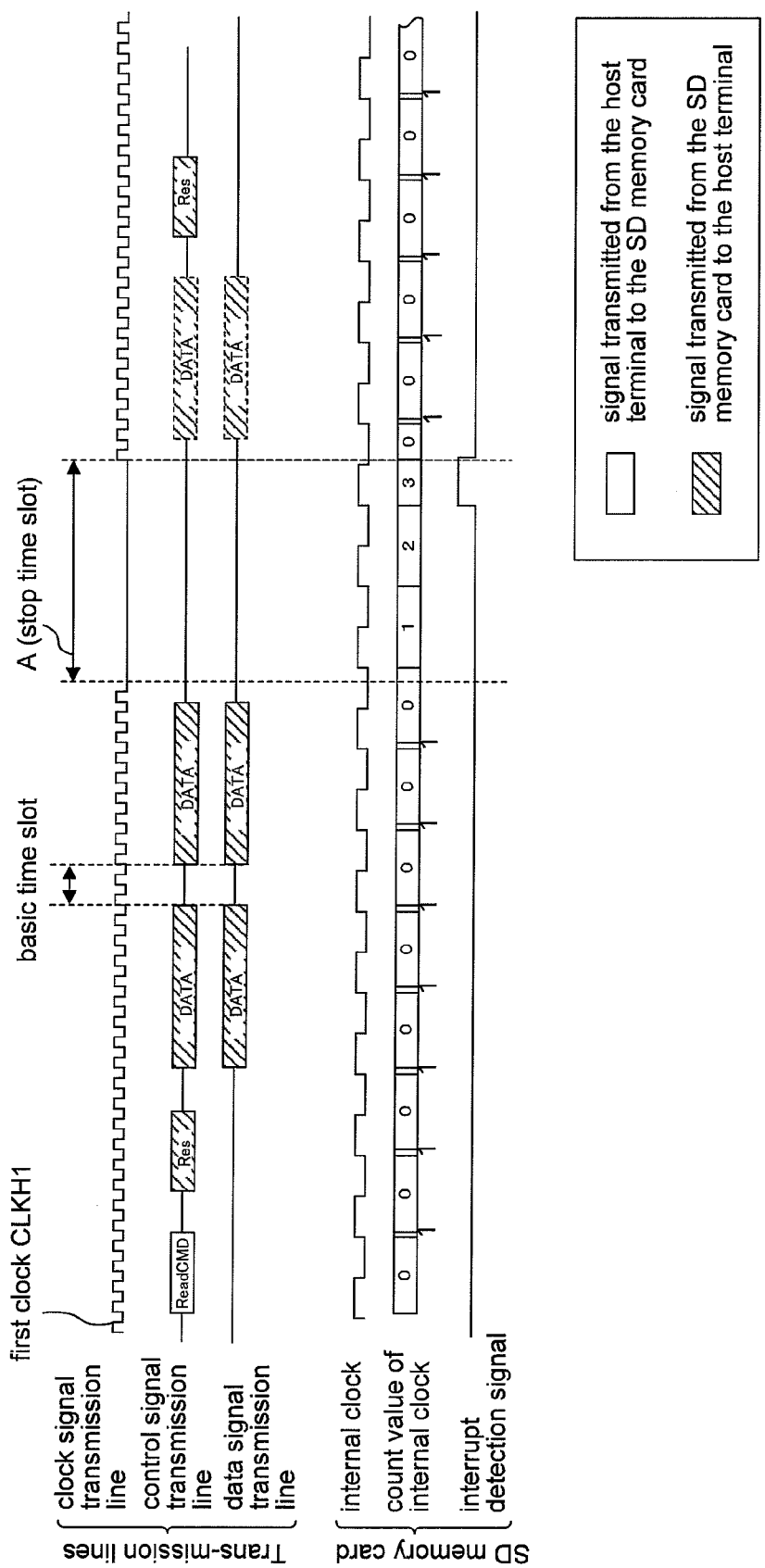
FIG. 12 is a time chart that shows how data transmission occurs when reading in the second working example.

FIG. 12 is a time chart that shows how data transmission occurs when reading in the second working example. In the second working example, the host terminal 201 stops transmission of the first clock CLKH1 (see period A (stop time slot) in FIG. 12). By doing this, an interrupt request (for example, a read interrupt request, which is described later) is made from the host terminal 201 to the SD memory card 202. At this time, by stopping transmission of the first clock CLKH1, the transmission of data packets from the SD memory card 202 is stopped.

(2) Hardware Configuration

Figure 13:
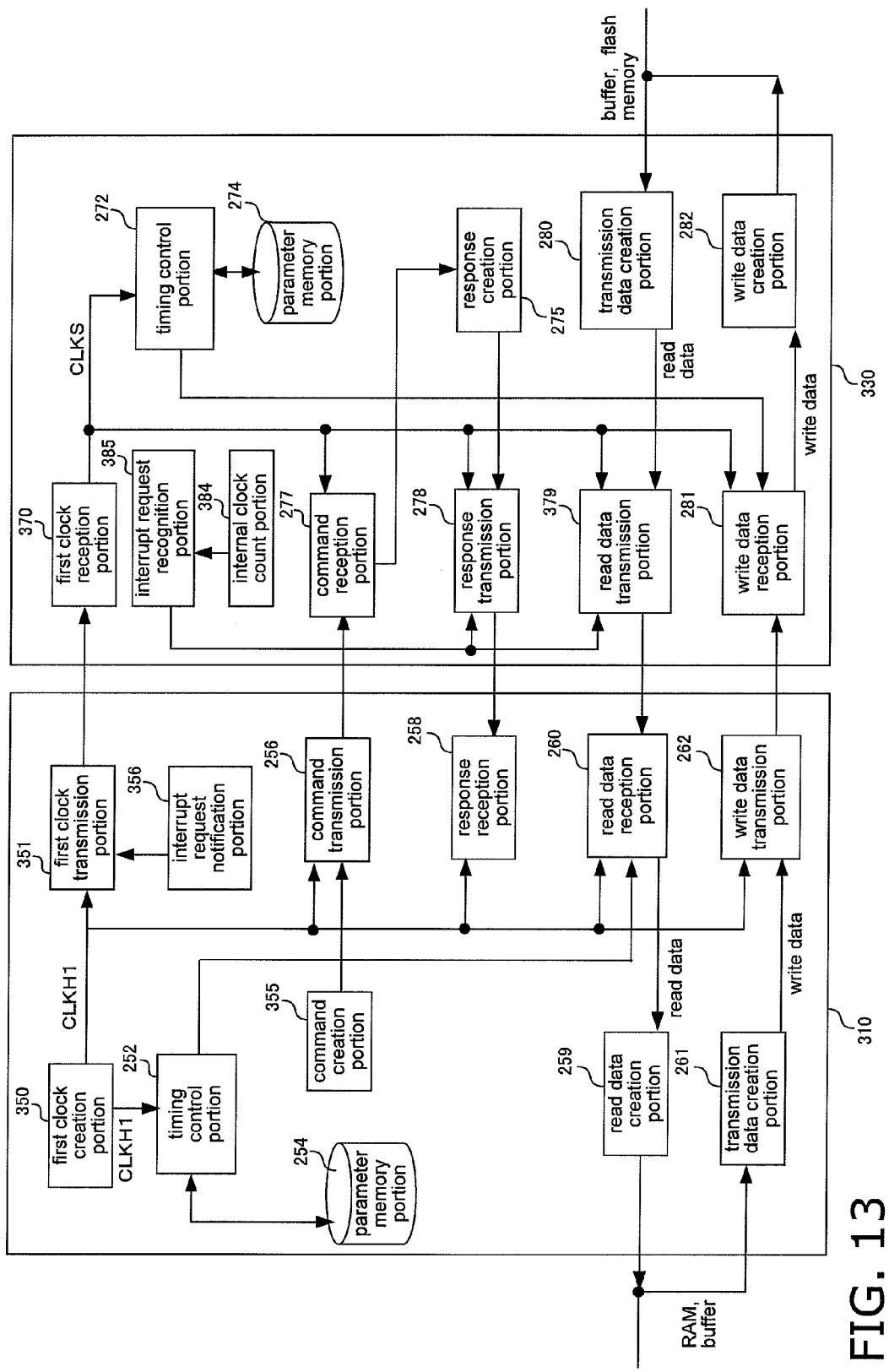
FIG. 13 is a diagram of the functional configuration of the CPU 210 of the host terminal 201 and the CPU 230 of the SD memory card 202.

The following is a description of the hardware configuration of the host terminal 201 and the SD memory card 202 again using FIG. 7. The host terminal 201 and the SD memory card 202 achieve the various functions that are described later through cooperative action between the hardware configuration shown in FIG. 7 and the functional configuration of the CPU 210 that is shown in FIG. 13, which is described later.

(2-1) Host Terminal

The hardware configuration of the host terminal 201 of the second working example is the same as that of the host terminal 201 of the first working example, except that the CPU 210 transmits only the first clock CLKH1 to the SD memory card 202, and thus will not be described.

(2-2) SD Memory Card

The hardware configuration of the SD memory card 202 of the second working example is the same as that of the SD memory card 202 of the first working example, except for an interrupt detection counter 337, and thus only the interrupt detection counter 337 is described.

The interrupt detection counter 337 inputs an internal clock from the CPU 230, or inputs the card clock CLKS, and outputs an interrupt detection signal. The internal clock is the clock of the SD memory card 202, and is different from the first clock CLKH1, the card clock CLKS, and the clock based on the first clock CLKH1, and it is not a clock that is created by dividing the first clock CLKH1, for example. Thus, the internal clock does not stop even when supply of the first clock CLKH1 is stopped. Further, the internal clock is a clock with a lower frequency than the first clock CLKH1.

The interrupt detection counter 337 counts the internal clock, and the count value is reset depending on the supply of the first clock CLKH1. That is, a card clock CLKS that is based on the first clock CLKH1 is input to the interrupt detection counter 337, and the count value of the internal clock is reset based on the card clock CLKS. However, when the supply of the first clock CLKH1 is stopped, the count value of the internal clock is not reset and the count value increases.

Here, the period during which supply of the first clock CLKH1 is stopped is referred to as the stop time slot (period A in FIG. 12). During the stop time slot the first clock CLKH1 is not supplied, and thus transmission of data packets from the SD memory card 202 to the host terminal 201 is stopped. The length of the stop time slot is determined in advance based on the communications standards, and for example the host terminal 201 notifies the SD memory card 202 of this length when communication is started. It should be noted that with respect to the data packets that are sent in series over the control signal transmission line 206 and the data signal transmission line 207, the interval between a data packet that is sent first and the data packet that is sent next is referred to as the basic time slot.

In FIG. 12, the host terminal 201 supplies the first clock CLKH1 to the SD memory card 202 in all periods other than the stop time slot. Thus, the count value of the internal clock from the interrupt detection counter 337 is reset to 0 when the first clock CLKH1 is supplied. On the other hand, in the stop time slot the host terminal 201 has stopped supplying the first clock CLKH1. Thus, the count value of the internal clock increases in value and is greater than 0. This count value is transmitted to the CPU 230 as the interrupt detection signal, and the CPU 230 recognizes that the host terminal 201 has output an interrupt request based on the fact that the count value has exceeded a predetermined value.

(3) Functional Configuration

FIG. 13 is a diagram of the functional configuration of the CPU 210 of the host terminal 201 and the CPU 230 of the SD memory card 202. In the second working example, the second clock creation portion 250b, the second clock transmission portion 251b, and the second clock reception portion 270b are not provided as in the first working example. Reference numerals that are the same as those in the first working example have the same functional configuration, and other than the functional configurations that are described below, their functional configurations are the same as in the first working example and thus are not described.

(3-1) Functional Configuration of Host Terminal CPU (a) First Clock Creation Portion, First Clock Transmission Portion A first clock creation portion 350 and a first clock transmission portion 351 of the second working example have the same configurations as the first clock creation portion 250a and the first clock transmission portion 251a of the first working example, and thus will not be described. It should be noted that the first clock transmission portion 351 stops the transmission of the first clock CLKH1 to the SD memory card 202 based on control by an interrupt request notification portion 356.

(b) Command Creation Portion

A command creation portion 355 of the second working example has substantially the same configuration as the command creation portion 255 of the first working example, and thus it is described briefly below. The command creation portion 355 creates various commands, such as the read command and the write command. It should be noted that the command creation portion 355 does not create an interrupt command such as a read interrupt command.

(c) Interrupt Request Notification Portion

The interrupt request notification portion 356 determines whether or not it is necessary to interrupt data transmission from the SD memory card 202 in accordance with the state of the host terminal 201, and decides whether or not to stop transmission of the first clock CLKH1.

Here, when reading, the host terminal 201 continuously receives data packets from the SD memory card 202, receiving the read data. Here, the interrupt request notification portion 356 determines the state of the host terminal 201, such as a delay in the writing, to the RAM 211, of the read data that have been transmitted from the SD memory card 202, and determines whether it is necessary to stop the transmission of read data from the SD memory card 202, that is, it determines whether it is necessary for the host terminal 201 to perform a read interrupt request. Then, when the interrupt request notification portion 356 determines that it is necessary to stop the transmission of read data, it controls the first clock transmission portion 351 so as to stop the transmission of the first clock CLKH1 to the SD memory card 202 by only the length of the stop time slot (period A in FIG. 9). When the period A, which is the stop time slot, is over, the interrupt request notification portion 356 controls the first clock transmission portion 351 so as to resume transmission of the first clock CLKH1.

(3-2) Functional Configuration of SD Memory Card CPU (a) First Clock Reception Portion A first clock reception portion 370 of the second working example has the same configuration as the first clock reception portion 270a of the first working example, and thus is not described here.

(b) Internal Clock Count Portion, Interrupt Request Recognition Portion

An internal clock count portion 384 creates an internal clock and sends it to the interrupt detection counter 337. It should be noted that the internal clock is different from the first clock CLKH1, the card clock CLKS, and the clock based on the first clock CLKH1, and it is not a clock that is created by dividing the first clock CLKH1, for example. The internal clock count portion 384 receives the length of the stop time slot (period A in FIG. 9) from the host terminal 201 at the start of the communication, and determines a predetermined value based on the period A of the stop time slot and the internal clock. The predetermined value is a determination reference value for determining whether or not the supply of the first clock CLKH1 from the host terminal 201 to the SD memory card 202 has been stopped.

The internal clock count portion 384 receives an interrupt detection signal from the interrupt detection counter 337, and detects whether or not the host terminal 201 has stopped transmitting the first clock CLKH1. Here, the interrupt detection signal includes the count value of the internal clock. This count value is reset each time that the interrupt detection counter 337 receives an input of the first clock CLKH1. Thus, the internal clock count portion 384 determines whether or not the count value is greater than the predetermined value, and if it is greater, determines that the first clock CLKH1 has stopped being supplied.

An interrupt request recognition portion 385 receives the results of this determination by the internal clock count portion 384. Here, if the determination result that is received is that supply of the first clock CLKH1 has stopped, then the interrupt request recognition portion 385 recognizes that the host terminal 201 is outputting a read interrupt request. The interrupt request recognition portion 385 sends the result of this recognition to a read data transmission portion 379 and the response transmission portion 278.

(c) Read Data Transmission Portion

The read data transmission portion 379 sends data packets to the host terminal 201 over the control signal transmission line 206 and the data signal transmission line 207 based on the card clock CLKS. When it receives a recognition result from the interrupt request recognition portion 385 that the host terminal 201 is outputting a read interrupt request, the read data transmission portion 379 stops transmitting read data to the host terminal 201.

(4) Flow of Processing

At the start of the processing described below, the first clock CLKH1 is transmitted from the host terminal 201 to the SD memory card 202.

(4-1) When Reading

Figure 14:
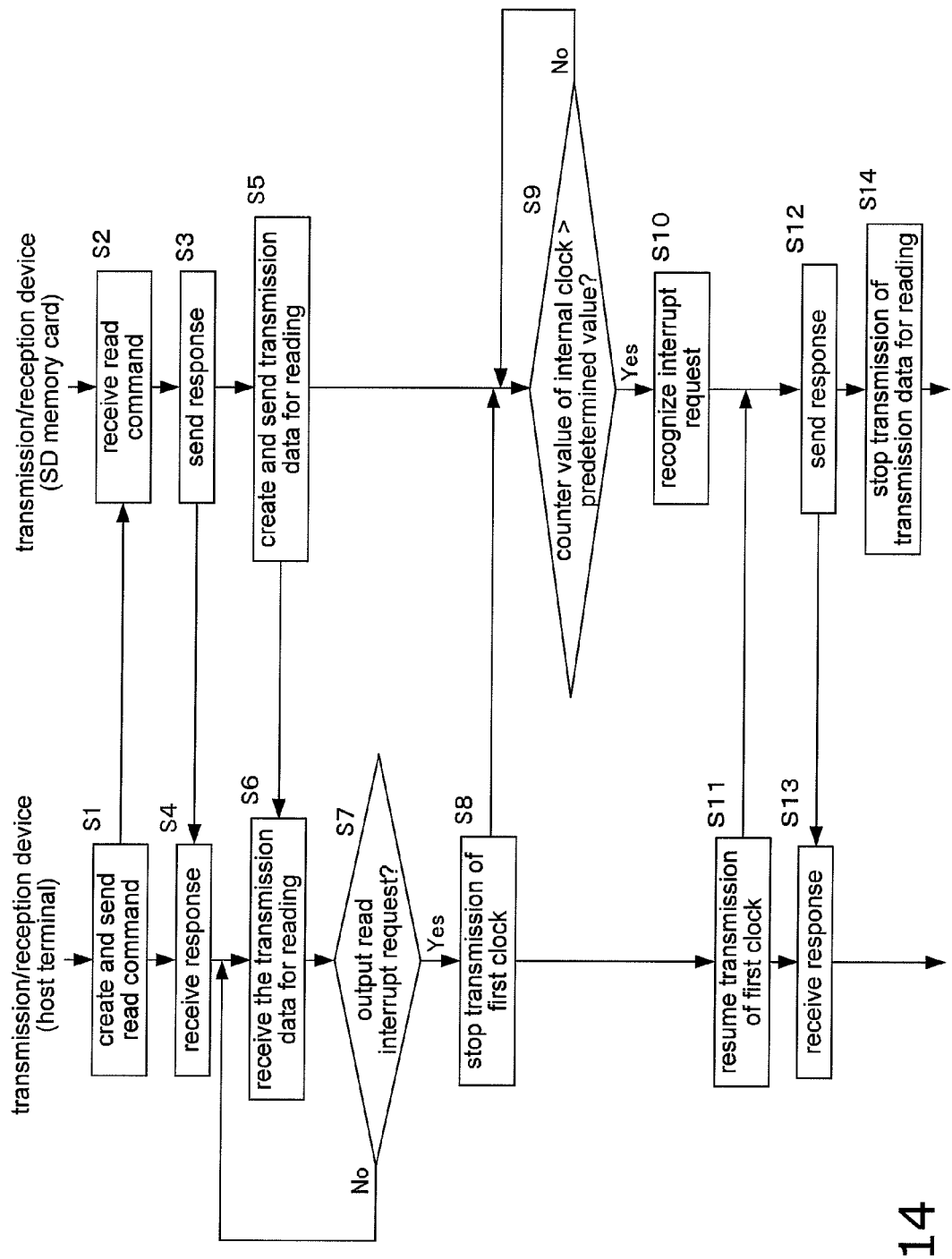
FIG. 14 is a flowchart that shows an example of the flow of the processing when reading, by the communications system of the second working example.

FIG. 14 is a flowchart that shows an example of the flow of the processing when reading, by the communications system of the second working example.

Steps S1, S2: The command creation portion 355 of the host terminal 201 creates a read command for reading read data from the SD memory card 202. The command transmission portion 256 of the host terminal 201 transmits the read command to the SD memory card 202 over the control signal transmission line 206 (step S1). The command reception portion 277 of the SD memory card 202 receives the read command (step S2).

Steps S3, S4: The response transmission portion 278 of the SD memory card 202 sends a response to the read command to the host terminal 201 over the control signal transmission line 206 (step S3). The response reception portion 258 of the host terminal 201 receives the response (step S4).

Step S5, S6: In accordance with the read command that is received, the transmission data creation portion 280 of the SD memory card 202 reads the read data from the flash memory 231a and creates data packets. The read data transmission portion 379 of the SD memory card 202 sends the data packets to the host terminal 201 over the control signal transmission line 206 and the data signal transmission line 207 (step S5). The read data reception portion 260 of the host terminal 201 receives the data packets from the SD memory card 202 (step S6). At this time, the timing control portion 252 of the host terminal 201 counts the header length, the bit length of the data fragment, the footer length, and the basic time slot length, in that order, and sends the count value to the read data reception portion 260.

Then, the read data creation portion 259 creates read data from the data fragments, and stores the data on the RAM 211.

Steps S7, S8: The interrupt request notification portion 356 of the host terminal 201 determines whether or not it is necessary for the host terminal 201 to perform a read interrupt request, that is, whether or not it is necessary for the transmission of read data from the SD memory card 202 to be stopped. If a read interrupt request is to be performed (Yes), then the interrupt request notification portion 356 controls the first clock transmission portion 351 so as to stop transmission of the first clock to the SD memory card 202. If a read interrupt request is not to be performed (No), then the read data reception portion 260 of the host terminal 201 continues to receive data packets.

Here, the length of the stop time slot (period A in FIG. 9) during which the host terminal 201 stops transmitting the first clock CLKH1 is determined in advance based on the communications standard, and for example the host terminal 201 notifies the SD memory card 202 of this length when communication is started. The internal clock count portion 384 of the SD memory card 202 determines the predetermined value based on the period A of the stop time slot and the internal clock.

Steps S9, S10: The internal clock count portion 384 is receiving an interrupt detection signal from the interrupt detection counter 337. The internal clock count portion 384 determines whether or not the count value of the internal clock, which is included in the interrupt detection signal, is equal to or greater than the predetermined value, and sends the result of this determination to the interrupt request recognition portion 385. If the count value is equal to or greater than the predetermined value, then the interrupt request recognition portion 385 recognizes that the host terminal 201 is outputting a read interrupt request.

Steps S11 through S13: When the period A of the stop time slot is over, the interrupt request notification portion 356 controls the first clock transmission portion 351 so that it resumes transmission of the first clock CLKH1. The first clock transmission portion 351 resumes transmission of the first clock CLKH1 (step S11). When the response transmission portion 278 of the SD memory card 202 receives the recognition result that the host terminal 201 is outputting a read interrupt request, it sends a response to the host terminal 201 over the control signal transmission line 206 (step S12). The response reception portion 258 of the host terminal 201 receives the response from the SD memory card 202 (step S13).

Step S14: The read data transmission portion 379 of the SD memory card 202 stops transmitting data packets.

Then, when a read command is again transmitted from the host terminal 201 to the SD memory card 202, the SD memory card 202 resumes the transmission of data packets over the control signal transmission line 206 and the data signal transmission line 207.

(5) Action Effect

According to the second working example, when the host terminal 201 stops supplying the first clock CLKH1 to the SD memory card 202, the SD memory card 202 stops transmitting data packets. Thus the host terminal 201 controls the stopping of the data packet transmission, and based on this the SD memory card 202 recognizes an interrupt request. That is, the host terminal 201 can cause the SD memory card 202 to recognize an interrupt request at any time, and it is not necessary to provide, in advance, a period for recognition of an interrupt request between the data packets. Thus, the spacing between data packets can be shortened, and a drop in the efficiency of data transmission can be inhibited.

Modified Examples (1)

In the first working example and the second working example of this embodiment, it is not necessary to add header information or footer information to all of the data packets that are transmitted over the control signal transmission line 206 and the data signal transmission line 207. It is also possible to add header information and footer information to the data fragments that are transmitted over one of the transmission lines, and for only data fragments to be transmitted over the other transmission line. At this time, it is possible for only the data fragments to be transmitted based on the header information and the footer information being transmitted over either one of the transmission lines.

For example, first data fragments are transmitted over the control signal transmission line 206 but header information and footer information are not added before and after the first data fragments. On the other hand, data packets each including header information, a second data fragment, and footer information are transmitted by the data signal transmission line 207. The bit length of the first data fragments and the bit length of the second data fragments of the data packets are the same. The first data fragments are transmitted using the header information and the footer information of the data packets. At this time, the first data fragments are transmitted in synchronization with the second data fragments.

(2)

The first and second working examples both described a case in which the transmission of data packets from the transmission side is stopped while data are being received from the transmission side. The first working example and the second working example can also be adopted for a case in which various signals for delaying transmission for a fixed period of time or for instructing data to be resent are transmitted to the transmission side during the time that data are being received from the transmission side.

(3)

In the above description, the data packets are formed so as to include header information, the data packet, and footer information in that order, but the order of these is not limited to that described above.

(4)

In the above description, the present embodiment is described with regard to a communications system that has a control signal transmission line and a data signal transmission line. However, the present embodiment can also be adopted for a communications system that has only data signal transmission lines and does not have a control signal transmission line. The present embodiment is not limited to applications in which data are transmitted over a plurality of transmission lines, and it can also be adopted for the transmission of data over a single transmission line.

(5)

In the above description, the data packets that are transmitted over the control signal transmission line and the data signal transmission line are transmitted synchronized, but there is no limitation to a configuration in which these are transmitted in synchronization. It is sufficient that they are transmitted to the transmission lines based on the header information and the footer information of the data packets.

(6)

In the above description, the header length, the footer length, and the basic time slot length are determined based on the communications standard. However, it is also possible for the header length, the footer length, and the basic time slot length to be different for each SD memory card, and for this information to be obtained when initiating communication between the host terminal 201 and the SD memory card 202.

(7)

The control signal transmission line 206 and the data signal transmission line 207 can also each be a pair of two differential transmission lines.

(8)

The above describes a configuration in which the bit length of each data fragment is listed in the header information. However, it is also possible for the bit length of the data fragment to be set based on the communications standard. In this case, the bit length of the data fragment can be stored in the parameter memory portion, and it is not necessary to continually obtain the data fragment bit length from the header length of the data packets.

(9)

In the first working example of the present embodiment, it is preferable for the transmission of data to be immediately stopped by the transmission of an interrupt command, and thus preferably the interrupt command is transmitted using a single first time slot. However, for example in a case where the bit length of the interrupt command exceeds the first time slot length, it is also possible for the interrupt command to be partitioned into a plurality of units and for these to be transmitted using a plurality of first time slots.

(10)

The above description was made with an SD memory card as an example of the removable memory device, but as long as the removable memory device is portable and can transmit read data to a host terminal at a clock that is supplied by the host terminal, the invention can be adopted over a range that is not limited to an SD memory card. Other examples include Compact Flash (registered trademark), smart media, multimedia cards, and memory sticks. There is no limitation to a flash memory for the memory that can be mounted in removable memory device, and other examples include nonvolatile memories such as MRAM and FeRAM.

(11)

A computer program for executing the above method on a computer, and a computer-readable recording medium to which this program is recorded, also fall within in the scope of the invention. Here, examples of computer-readable recording media include flexible discs, hard discs, CD-ROMs, MOs, DVDs, DVD-ROMs, DVD-RAMs, and BDs (Blue-ray Discs), and semiconductor memories.

The computer program is not limited to a computer program that is recorded to a recording medium, and it may also be transmitted over an electric communications line, a wireless or land communications line, or a network such as the Internet.

Third Embodiment (1) Overview

Figure 15:
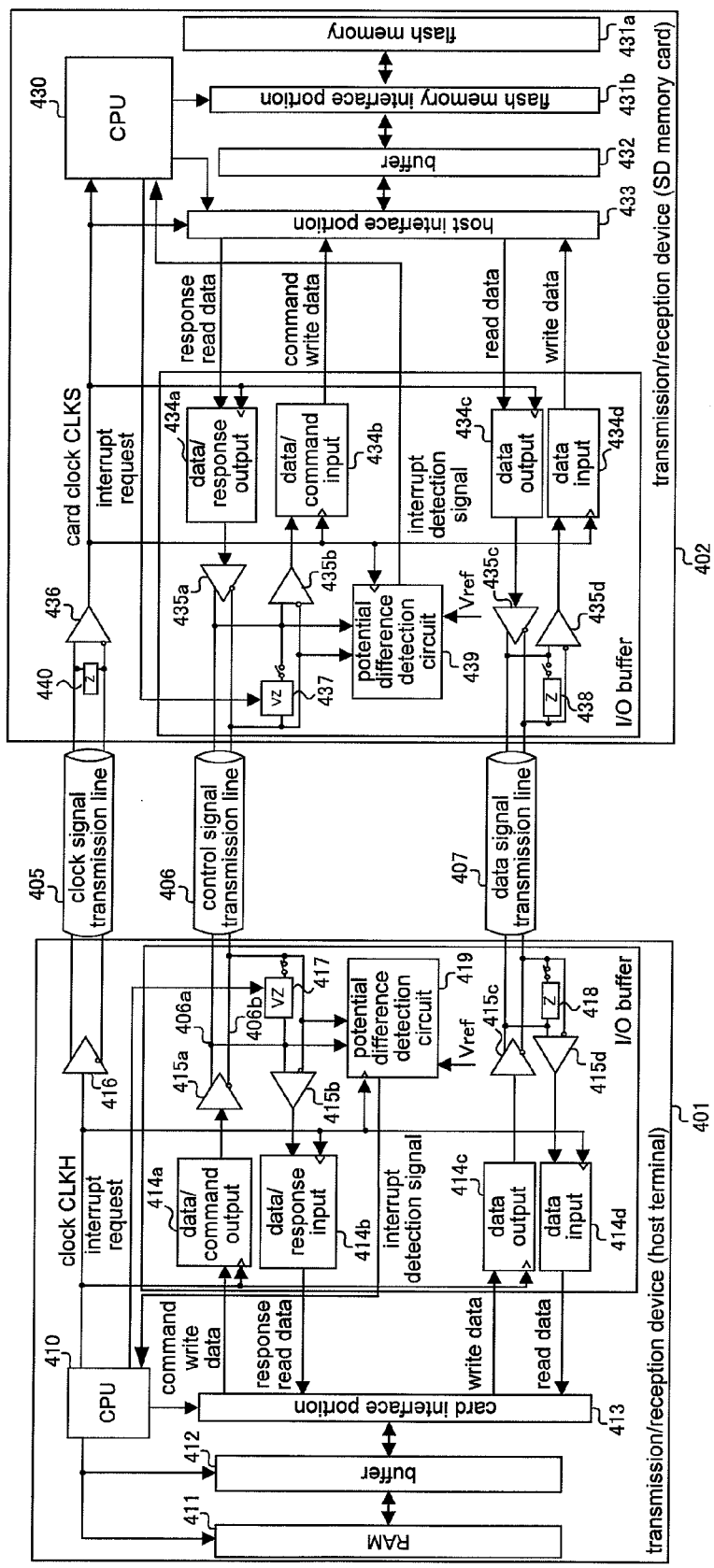
FIG. 15 is a diagram of the overall configuration of the communication system according to a third embodiment of the invention.

FIG. 15 is a diagram of the overall configuration of the communications system according to a third embodiment of the invention. In the communications system, a transmission/reception device that is a host terminal 401 and a transmission/reception device that is an SD (Secure Digital) memory card 402 are connected to one another over differential transmission lines in pairs. The communications system of this embodiment employs a general current drive-type differential transmission method to transmit signals by generating a predetermined potential difference in a pair of differential transmission lines by a dynamic impedance circuit and an impedance circuit, which are described later. The dynamic transmission lines include a clock signal transmission line 405, a control signal transmission line 406, and a data signal transmission line 407. The clock signal transmission line 405 is used for transmitting a clock CLKH, for example, which is described later and is used for communication between the host terminal 401 and the SD memory card 402, from the host terminal 401 to the SD memory card 402. The control signal transmission line 406 is used for sending and receiving commands for reading and writing data, for example, and responses to those commands, between the host terminal 401 and the SD memory card 402. The data signal transmission line 407 is used for sending and receiving data between the host terminal 401 and the SD memory card 402.

Figure 16:
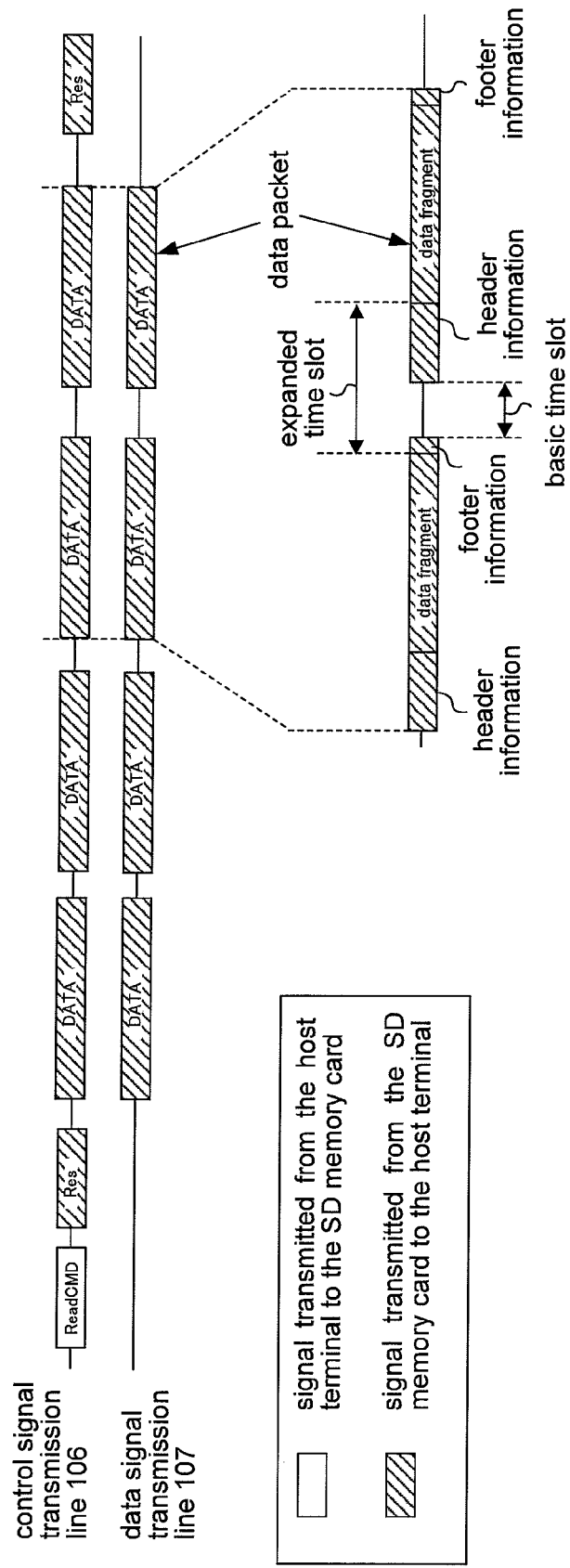
FIG. 16 is a time chart that shows how data are transmitted when reading.

FIG. 16 is a time chart that shows how data are transmitted when reading. The communications system of this embodiment is a hand-shake type communications system, in which when transmitting data, first various commands such as a read command (Read CMD in FIG. 16) and a write command, and responses to those commands (Res in FIG. 16), are sent and received between the host terminal 401 and the SD memory card 402, and then the transmission of data (DATA in FIG. 16) takes place.

The communications system of this embodiment uses the control signal transmission line 406 in addition to the data signal transmission line 407 to transmit data, as shown in FIG. 16, so as to increase the transmission efficiency of data access. The data are transmitted partitioned into a plurality of data fragments, and header information and footer information are added to the data fragments that are transmitted over the control signal transmission line 406 and the data signal transmission line 407. In other words, a data packet that includes header information, a data fragment, and footer information is transmitted over the control signal transmission line 406 and the data signal transmission line 407. All of the data packets are structured to have the same bit length.

Here, the header information and the footer information are information that is different from the data fragment. The header information includes information for adjusting the timing at which the data packet is received, such as a synchronization bit sequence and a start bit, and the footer information includes information that indicates the end of the data packet, such as an end bit. It should be noted that the information that is included in the header information and the footer information is not limited to this, and they may also include other information as well. The data fragments may also include information for detecting transmission errors of the data fragments, such as a CRC (Cyclic Redundancy Check) bit.

In this embodiment, the reception side changes the amplitude of the signal of the control signal transmission line 406 between the data fragments that are within adjacent data packets that are transmitted over the control signal transmission line 406. By doing this, the reception side sends an interrupt request (including the read interrupt request and the write interrupt request, which are described later) to the transmission side. Here, the interval between the data fragments is defined as the spacing between the data fragment of a data packet that is transmitted first and the data fragment of the data packet that is transmitted next, and in the following embodiment, it is referred to as the expanded time slot (see FIG. 16). The basic time slot, which is described later, is defined as the interval between a data packet that is transmitted first and the data packet that is transmitted next.

It should be noted that the data signal transmission line 407 is not limited to a single line, and it is also possible to provide a plurality of data signal transmission lines 407.

(2) Hardware Configuration

Figure 21:
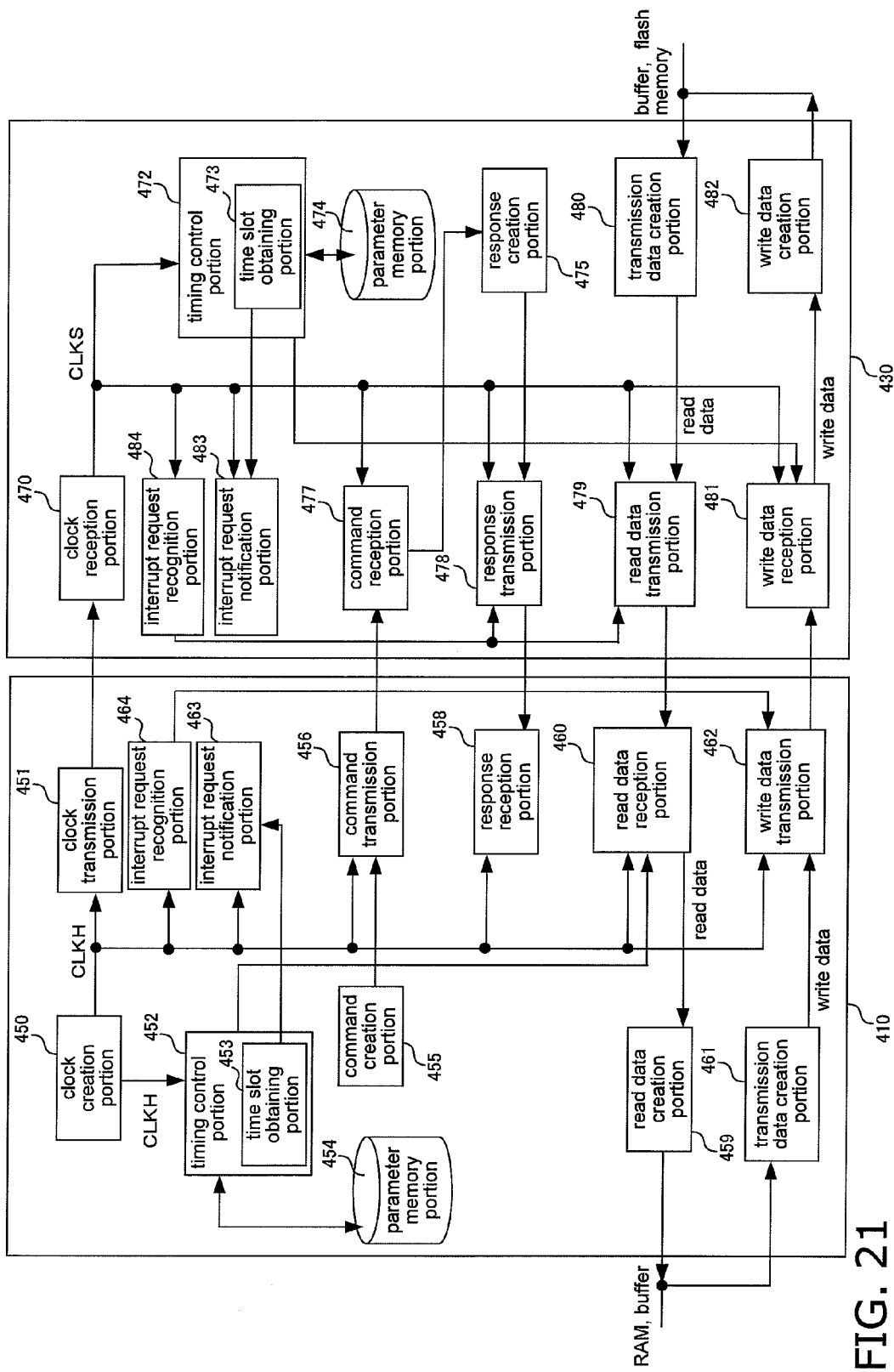
FIG. 21 is diagram of the functional configuration of the CPU 410 of the host terminal 401 and the CPU 430 of the SD memory card 402.

The follow is a description of the hardware configuration of the host terminal 401 and the SD memory card 402 again using FIG. 15. The host terminal 401 and the SD memory card 402 achieve the various functions that are described later through cooperative action between the hardware configurations shown in FIG. 15 and the functional configuration of the CPU 410 that is shown in FIG. 21 and described later.

(2-1) Host Terminal (a) CPU 410: The CPU 410 controls a RAM 411, a buffer 412, a card interface portion 413, and an I/O buffer, for example, of the host terminal 401. It also achieves various functions that are described later, such as reading and writing data with the host terminal 401 through various programs.

(b) RAM 411: The RAM 411 stores the various data that are sent and received between the host terminal 401 and the SD memory card 402.

(c) Buffer 412, Card Interface Portion 413: The buffer 412 and the card interface portion 413 are for the writing to the RAM 411 of data that have been read from the SD memory card 402, and the reading of data to be written to the SD memory card 402 from the RAM 411.

(d) I/O Buffer: The I/O buffer inputs and outputs data such as commands, responses, and data. The I/O buffer includes a data/command output 414a, a data/response input 414b, a data output 414c, a data input 414d, a driver 415a, a receiver 415b, a driver 415c, a receiver 415d, a dynamic impedance circuit 417, an impedance circuit 418, and a potential difference detection circuit 419, and these are connected as shown in FIG. 15. The driver 415a, the receiver 415b, the driver 415c, and the receiver 415d are connected to the control signal transmission line 406 or the data signal transmission line 407, which are differential transmission lines.

Figure 17:
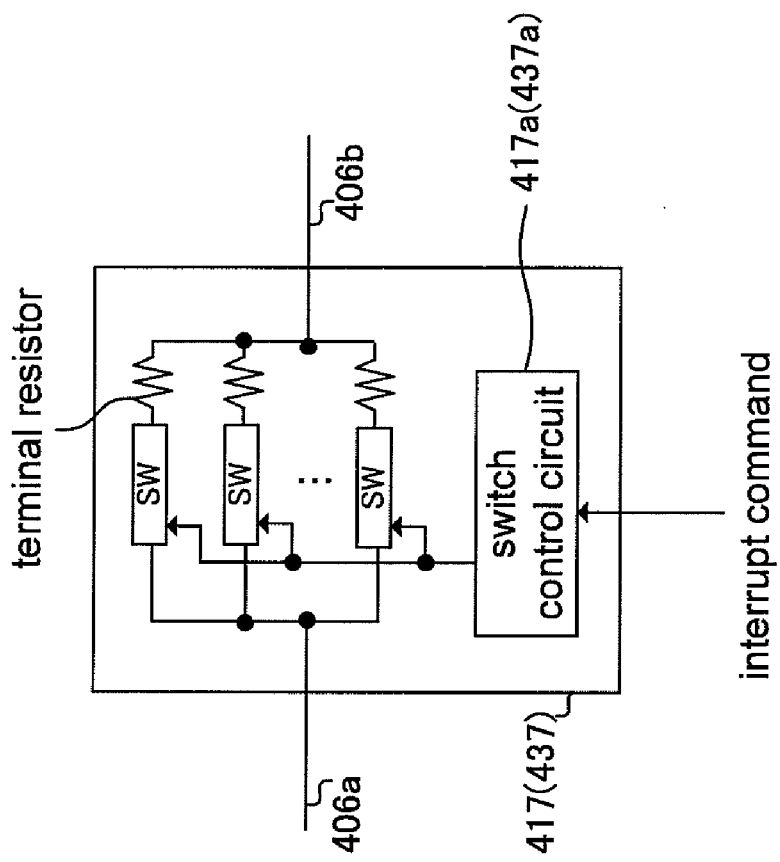
FIG. 17 shows the configuration of the dynamic impedance circuit 417.

The dynamic impedance circuit 417 is connected to both of the differential transmission routes 406a and 406b of the control signal transmission line 406. The dynamic impedance circuit 417 changes the signal amplitude of the control signal transmission line 406 based on the interrupt request from the CPU 410. FIG. 17 shows the configuration of the dynamic impedance circuit 417. As shown in FIG. 17, the dynamic impedance circuit 417 has a plurality of sets of a switch circuit SW and a terminal resistor, and a switch control circuit 417a. The switch control circuit 417a is controlled by an interrupt request that is described later, and is connected to a predetermined set of a switch circuit SW and a terminal resistor. Thus, the signal amplitude value of the control signal transmission line 406, which is made of differential transmission routes 406a and 406b, is changed. For example, the dynamic impedance circuit 417 keeps the impedance at 100Ω when an interrupt request is not being received, and keeps the impedance at 10Ω when an interrupt request is being received. Here, a 1-mA fixed current is driven by the driver 415a, which is connected to the control signal transmission line 406. When the impedance changes from 100Ω to 10Ω due to reception of an interrupt request, the signal amplitude of the control signal transmission line 406 changes from a swing of ±100 mV to a swing of ±10 mV with respect to the common mode potential Vcom.

Figure 18:
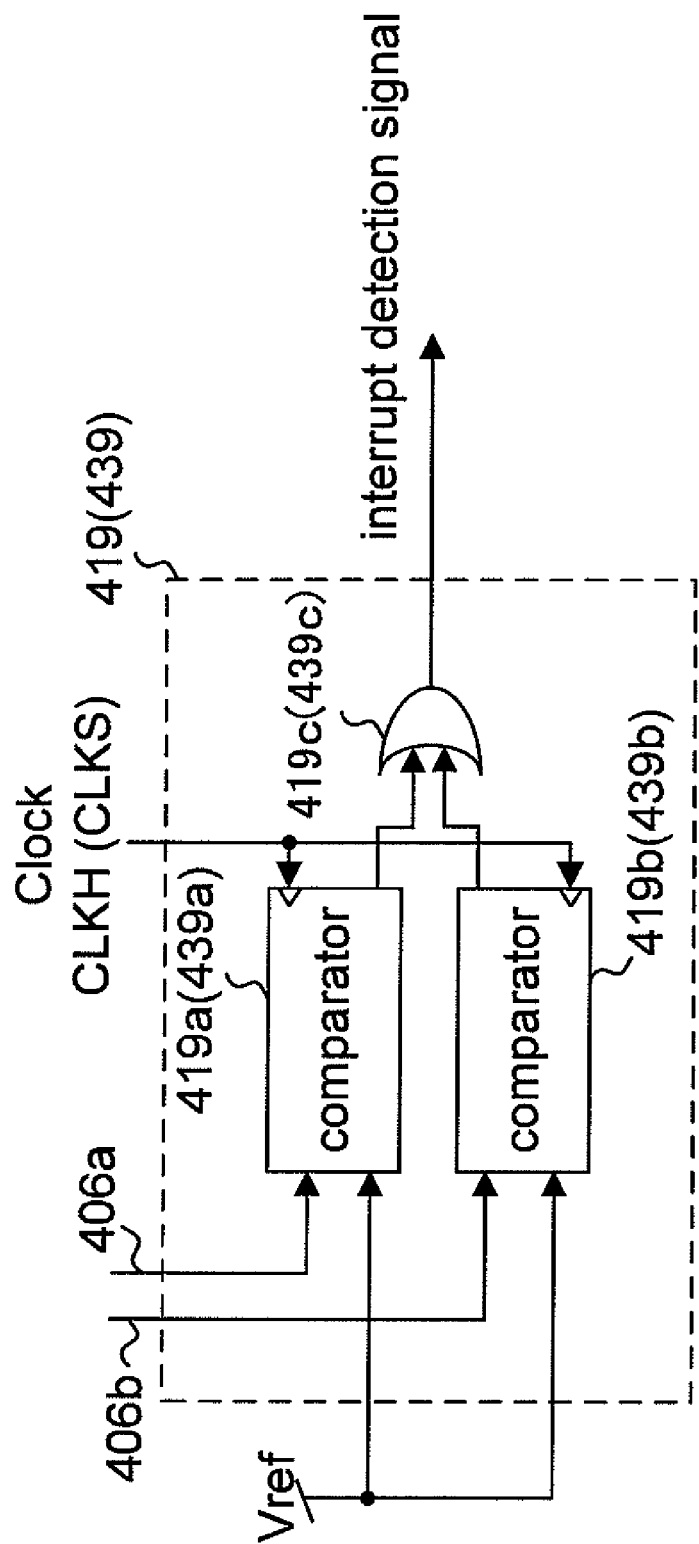
FIG. 18 is a diagram of the configuration of the potential difference detection circuit.

The potential difference detection circuit 419 receives the input of a predetermined reference voltage Vref and detects whether there has been a change in the signal amplitude of the control signal transmission line 406, and outputs an interrupt detection signal as the result of this detection to the CPU 410. FIG. 18 is a diagram of the configuration of the potential difference detection circuit. The potential difference detection circuit 419 has comparators 419a and 419b, and an OR circuit 419c. The comparators 419a and 419b are connected to the two differential transmission routes 406a and 406b, respectively, of the control signal transmission line 406, and receive the reference voltage Vref and the clock CLKH, respectively. The clock CLKH triggers the comparators 419a and 419b to detect whether or not the potential of the differential transmission routes 406a and 406b is higher than the reference voltage Vref. The comparators 419a and 419b hold a High level if the potential of the differential transmission routes 406a and 406b is higher than the reference voltage Vref, and hold a Low level if it is lower. The comparators 419a and 419b are connected to the OR circuit 419c, and each inputs the value that it holds to the OR circuit 419c. The output of the OR circuit 419c is input to the CPU 410 as an interrupt detection signal. Here, the reference voltage Vref is for example set to 50 mV higher than the common mode potential Vcom. In a case where the SD memory card 402 does not output an interrupt request and the signal amplitude of the control signal transmission line 406 swings over ±100 mV, then the potential of one of the differential transmission routes 406a and 406b is higher than the reference voltage Vref, and thus the output of the OR circuit 419c is High. On the other hand, in a case where the SD memory card 402 is outputting an interrupt request and the signal amplitude of the control signal transmission line 406 swings over +10 mV, then the potential of both of the differential transmission routes 406a and 406b is lower than the reference voltage Vref, and thus the output of the OR circuit 419c is Low. Ultimately, when the SD memory card 402 outputs an interrupt request and the signal amplitude of the control signal transmission line 406 drops from ±100 mV to ±10 mV, the output of the OR circuit 419c changes from High to Low and this is input to the CPU 410 as the interrupt detection signal. The CPU 410 determines whether or not the SD memory card 402 has output an interrupt request based on this change in the interrupt detection signal.

The impedance circuit 418 adjusts the impedance of the data signal transmission line 407.

(e) Driver 416: The driver 416 sends the clock CLKH to the SD memory card 402 over the clock signal transmission line 405, which is a differential transmission route.

(2-2) SD Memory Card (a) CPU 430: The CPU 430 achieves various functions that are described later, such as the reading and writing of data with the SD memory card 402, through various programs.

(b) Flash Memory 431a: The flash memory 431a stores the various data that are communicated between the host terminal 401 and the SD memory card 402.

(c) Flash Memory Interface Portion 431b, Buffer 432, Host Interface Portion 433: The flash memory interface portion 431b, the buffer 432, and the host interface portion 433 are involved in the writing of data that have been read from the host terminal 401 to the flash memory 431a, and the reading of data to be written to the host terminal 401 from the flash memory 431a.

(d) I/O Buffer: The I/O buffer inputs and outputs data such as commands, responses, and data. The I/O buffer includes a data/response output 434a, a data/command input 434b, a data output 434c, a data input 434d, a driver 435a, a receiver 435b, a driver 435c, and a receiver 435d, a dynamic impedance circuit 437, an impedance circuit 438, and a potential difference detection circuit 439, and these are connected as shown in FIG. 15. The driver 435a, the receiver 435b, the driver 435c, and the receiver 435d are connected to the control signal transmission line 406 or the data signal transmission line 407, which are differential transmission lines.

The dynamic impedance circuit 437 is connected to both of the differential transmission routes 406a and 406b of the control signal transmission line 406. The dynamic impedance circuit 437 changes the signal amplitude of the control signal transmission line 406 based on the interrupt request from the CPU 430. The configuration of the dynamic impedance circuit 437 is the same as that of FIG. 17 described earlier, and thus will not be described here (the reference numerals are within brackets in FIG. 17).

The potential difference detection circuit 439 receives input of the predetermined reference voltage Vref, detects whether there has been a change in the signal amplitude of the control signal transmission line 406, and outputs the result of this detection to the CPU 430. The configuration of the potential difference detection circuit 439 is the same as that described earlier in FIG. 18, except that a clock CLKS is input (the reference numerals are within brackets in FIG. 18). When the host terminal 401 outputs an interrupt request and the signal amplitude of the control signal transmission line 406 drops from ±100 mV to ±10 mV, the output of the OR circuit 439c of the potential difference detection circuit 439 changes from High to Low and this is input to the CPU 430 as an interrupt detection signal. The CPU 430 determines whether the host terminal 401 has output an interrupt request based on this change in the interrupt detection signal.

The impedance circuit 438 adjusts the impedance of the data signal transmission line 407.

(e) Receiver 436, Impedance Circuit 440: The impedance circuit 440 controls the impedance of the clock signal transmission line 405, which is a differential transmission line, and the receiver 436 receives the clock CLKH from the host terminal 401 over the clock signal transmission line 405.

(2-3) Operation when Interrupt Request is Output

Figure 19:
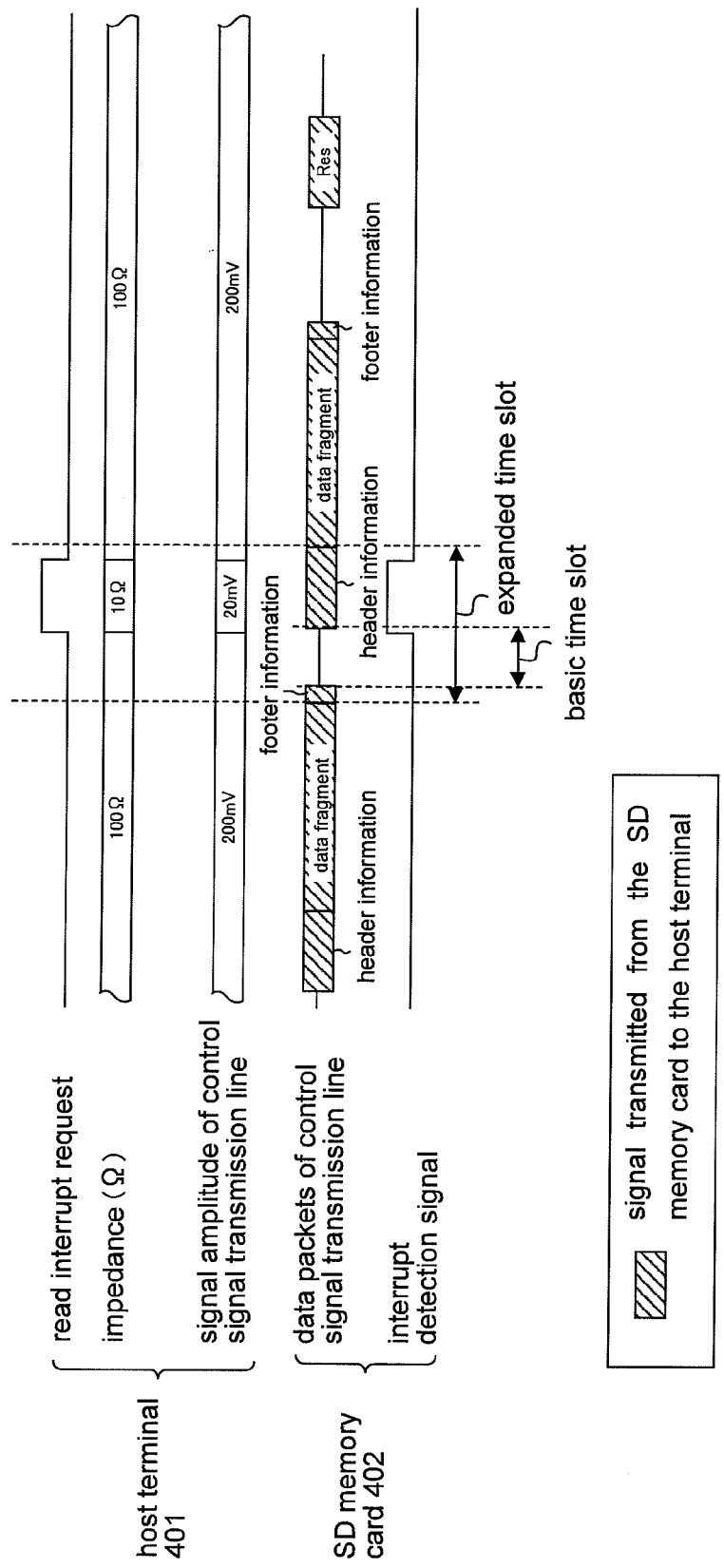
FIG. 19 is a flowchart that shows the status of the control signal transmission line 406 and the status of the interrupt detection signal when a read interrupt signal has been output.
Figure 20:
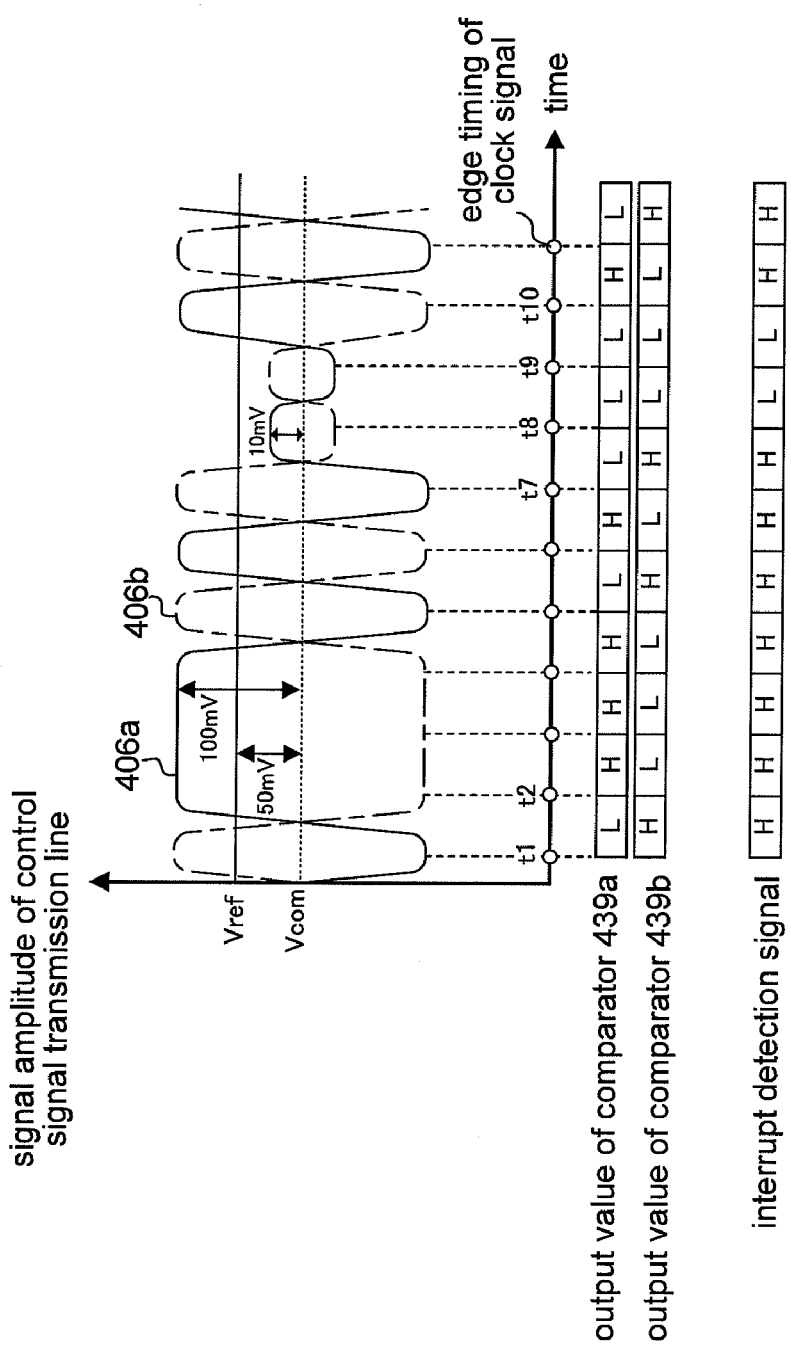
FIG. 20 is an explanatory diagram for describing the control signal transmission line 406, the dynamic impedance circuit 417, the potential difference detection circuit 439, and the output of the interrupt detection signal, for example.

In this embodiment, if the data packets are continuously transmitted from the transmission side to the reception side, then the reception side outputs an interrupt request during the expanded time slot, which is the period between data fragments. Using a case where the host terminal 401 outputs a read interrupt request when receiving read data from the SD memory card 402 as an example, the operation of the dynamic impedance circuit 417 and the potential difference detection circuit 439 is described. FIG. 19 is a flowchart that shows the status of the control signal transmission line 406 and the status of the interrupt detection signal when a read interrupt signal has been output, and FIG. 20 is an explanatory diagram for describing the control signal transmission line 406, the dynamic impedance circuit 417, the potential difference detection circuit 439, and the output status of the interrupt detection signal, for example.

(a) Reception of Data Packets

In FIG. 19, the host terminal 401 is receiving data packets of read data from the SD memory card 402 over the control signal transmission line 406. At this time, the host terminal 401 is not outputting a read interrupt request, and the state of the control signal transmission line 406 is the state of the time periods t1 to t7 in FIG. 20. In time periods t1 to t7, the dynamic impedance circuit 417 keeps the impedance at 100Ω as discussed above, and the signal amplitude of the control signal transmission line 406 is ±100 mV with respect to the common mode potential Vcom. Thus, in the potential difference detection circuit 439 of the SD memory card 402, the output of one of the comparators 439a and 439b is High (H) and the interrupt detection signal, that is, the output of the OR circuit 439c, also is High (H). It should be noted that although FIG. 19 shows only the control signal transmission line 406, the host terminal 401 similarly receives data packets over the data signal transmission line 407 as well.

(b) Transmission of Read Interrupt Request

Next, the CPU 410 of the host terminal 401 outputs a read interrupt request in order to stop the transmission of data packets from the SD memory card 402. The state of the control signal transmission line 406 at this time corresponds to time periods t8 and t9 in FIG. 20.

It should be noted that the CPU 410 of the host terminal 401 outputs the read interrupt request during the expanded time slot of the control signal transmission line 406. As illustrated in FIG. 19, the expanded time slot is defined as the interval between the data fragment of a data packet that is transmitted first and the data fragment of the data packet that is transmitted next. Since this embodiment employs a current drive-type differential transmission method, the control signal transmission line 406 is either High or Low during the basic time slot (see FIG. 19), which is defined as the spacing between the footer information of the data packet that is transmitted first and the header information of the data packet that is transmitted next.

The read interrupt request is input from the CPU 410 of the host terminal 401 to the dynamic impedance circuit 417 of the host terminal 401. The dynamic impedance circuit 417 changes the impedance from 100Ω to 10Ω in accordance with reception of the read interrupt request, as discussed earlier. At this time, the signal amplitude of the control signal transmission line 406 changes from a ±100 mV swing (200 mV signal amplitude) to a ±10 mV swing (20 mV signal amplitude) with respect to the common mode potential Vcom, as shown in FIGS. 19 and 20. Thus, in the potential difference detection circuit 439 of the SD memory card 402, the output of both of the comparators 439a and 439b is Low (L) and the output of the OR circuit 439c, that is, the interrupt detection signal, becomes Low (L) also. The interrupt detection signal changes from High to Low and is input to the CPU 430 of the SD memory card 402. The CPU 430 of the SD memory card 402 recognizes that the host terminal 401 has output a read interrupt request based on this interrupt detection signal, and transmits a response (Res in FIG. 19) to the host terminal 401.

(3) Functional Configuration

FIG. 21 is diagram of the functional configuration of the CPU 410 of the host terminal 401 and the CPU 430 of the SD memory card 402.

(3-1) Functional Configuration of the Host Terminal CPU (a) Clock Creation Portion, Clock Transmission Portion A clock creation portion 450 creates a basic clock CLKH for sending and receiving data between the host terminal 401 and the SD memory card 402. The clock creation portion 450 sends the clock CLKH to a clock transmission portion 451, a timing control portion 452, a command transmission portion 456, a response reception portion 458, a read data reception portion 460, a write data transmission portion 462, an interrupt request notification portion 463, and an interrupt request recognition portion 464, for example, in order to control the various functional portions of the CPU 410 based on the clock CLKH. The clock transmission portion 451 transmits the clock CLKH to the SD memory card 402 over the clock signal transmission line 405.

(b) Timing Control Portion, Time Slot Obtaining Portion, Parameter Memory Portion A parameter memory portion 454 stores information on the header length, the footer length, and the basic time slot length that have been determined as the communications standard. Here, the header length and the footer length are the length of the header and the footer defined by the bit number. The basic time slot length is the length of the basic time slot, which is the interval between data packets that are defined by the bit number.

The time slot obtaining portion 453 calculates and obtains the expanded time slot length based on the header length, the footer length, and the basic time slot length that are obtained from the parameter memory portion 454. The expanded time slot length is calculated as the sum of the footer length, the basic time slot length, and the header length. The time slot obtaining portion 453 sends the expanded time slot length to the interrupt request notification portion 463, which is described later.

The timing control portion 452 and the time slot obtaining portion 453 receive data packets from the read data reception portion 460, which is described later, and obtain the data fragment bit length that is included in the header information of the data packet. The time slot obtaining portion 453 counts the header length, the bit length of the data fragment, and the expanded time slot length in that order using the clock CLKH, and by doing so obtains the starting position of the expanded time slot. The time slot obtaining portion 453 sends the time slot starting position to the interrupt request notification portion 463. The timing control portion 452 counts the header length, the bit length of the data fragment, the footer length, and the basic time slot length in that order according to the clock CLKH, and sends the count value to the read data reception portion 460.

It should be noted that it is also possible to obtain the time slot starting position based on the count value from the timing control portion 452 instead of that from the time slot obtaining portion 453.

(c) Command Creation Portion, Command Transmission Portion

The command creation portion 455 creates various commands, such as a read command for reading the read data such as video and audio stored in the SD memory card 402, and a write command for writing data to the SD memory card 402. The command transmission portion 456 sends the various commands to the SD memory card 402 over the control signal transmission line 406 in accordance with the clock CLKH.

(d) Response Reception Portion

The response reception portion 458 receives, from the SD memory card 402, a response to a command that has been sent by the host terminal 401.

(e) Read Data Reception Portion, Read Data Creation Portion

The read data reception portion 460 receives data packets from the SD memory card 402 over the control signal transmission line 406 and the data signal transmission line 407, based on the clock CLKH. The read data reception portion 460 also receives a count value that is obtained by counting the header length, the bit length of the data fragment, the footer length, and the basic time slot length, in that order, from the timing control portion 452. Based on this count value, the read data reception portion 460 can accurately receive the data fragment within the data packet without loss.

It should be noted that the data packets that make up the read data have the same bit length regardless of the transmission line and are transmitted in synchronization with one another. Here, as shown in FIG. 19, the period during which the header information and the footer information of the data packet is transmitted is included in the period of the expanded time slot. When the interrupt request notification portion 463 outputs a read interrupt request during the period that the header information and the footer information are being transmitted, the signal amplitude of the control signal transmission line 406 becomes smaller and there is a risk that the header information and the footer information cannot be received correctly. However, since the data packets are transmitted in synchronization over both transmission lines, as mentioned above, it is sufficient for the header information and the footer information to be received from data packets that are transmitted over the data signal transmission line 407 rather than the control signal transmission line 406.

A read data creation portion 459 creates read data from a plurality of data packets, and stores this on the RAM 411.

(f) Transmission Data Creation Portion, Write Data Transmission Portion

A transmission data creation portion 461 reads, from the RAM 411, write data to be written to the SD memory card 402 when a write command is created, and creates a plurality of data packets each including header information, a data fragment, and footer information.

The write data transmission portion 462 transmits the data packets to the SD memory card 402 based on the clock CLKH in such a manner that they are synchronized in the control signal transmission line 406 and the data signal transmission line 407. When the write data transmission portion 462 receives a notice from the interrupt request recognition portion 464 that there is a write interrupt request, it stops transmitting data packets to the SD memory card 402.

(g) Interrupt Request Notification Portion, Interrupt Request Recognition Portion The interrupt request notification portion 463 creates various interrupt requests, such as the read interrupt request for stopping the reading of data from the SD memory card 402. Here, when reading, the host terminal 401 receives read data by continuously receiving data packets from the SD memory card 402 over the control signal transmission line 406 and the data signal transmission line 407. In this case, the read interrupt request is an interrupt request that is output using the expanded time slot and stops the transmission of read data. The interrupt request notification portion 463 determines the state of the host terminal 401, such as a delay in the writing to the RAM 411 of the read data that are transmitted from the SD memory card 402, determining whether or not to output a read interrupt request. The interrupt request notification portion 463 determines the signal amplitude value to be changed and determines the change period for changing the signal amplitude value based on the expanded time slot length. Then, the interrupt request notification portion 463 creates a read interrupt request based on the signal amplitude value and change period that have been determined, such that the bit length of the read interrupt request does not exceed the expanded time slot length. The interrupt request notification portion 463 then outputs the read interrupt request to the dynamic impedance circuit 417 based on the starting position of the expanded time slot, so that the read interrupt request can be output within the expanded time slot.

The interrupt request recognition portion 464 receives the interrupt detection signal from the potential difference detection circuit 419 and determines whether or not the SD memory card 402 has output a write interrupt requests The interrupt request recognition portion 464 transmits whether or not there has been a write interrupt request to the write data transmission portion 462.

(3-2) Functional Configuration of the SD Memory Card CPU (a) Clock Reception Portion A clock reception portion 470 receives the clock CLKH from the host terminal 401. It should be noted that the clock CLKH changes to a card clock CLKS due to delay when transmitting from the host terminal 401 to the SD memory card 402. The clock reception portion 470 sends the card clock CLKS to a timing control portion 472, a command reception portion 477, a response transmission portion 478, a read data transmission portion 479, a write data reception portion 481, an interrupt request notification portion 483, and an interrupt request recognition portion 484, for example.

(b) Timing Control Portion, Time Slot Obtaining Portion, Parameter Memory Portion A parameter memory portion 474 stores information on the header length, the footer length, and the basic time slot length that have been chosen as the communications standard.

The time slot obtaining portion 473 calculates and obtains the expanded time slot length based on the header length, the footer length, and the basic time slot length that are obtained from the parameter memory portion 474. The time slot obtaining portion 473 sends the expanded time slot length to the interrupt request notification portion 483.

The timing control portion 472 and the time slot obtaining portion 473 receive data packets from the write data reception portion 481, which is described later, and obtain the bit length of the data fragment that is included in the header information of the data packet. The time slot obtaining portion 473 counts the header length, the bit length of the data fragment, and the expanded time slot length in that order using the card clock CLKS, and by doing so obtains the starting position of the expanded time slot. The time slot obtaining portion 473 then sends the time slot stating position to the interrupt request notification portion 483. The timing control portion 472 counts the header length, the bit length of the data fragment, the footer length, and the basic time slot length in that order according to the card clock CLKS, and sends the count value to the write data reception portion 481.

It should be noted that it is also possible to obtain the time slot starting position based on the count value from the timing control portion 452 instead of from the time slot obtaining portion 453.

(c) Command Reception Portion

The command reception portion 477 receives various commands over the control signal transmission line 406 from the host terminal 401, based on the card clock CLKS.

(d) Response Creation Portion, Response Transmission Portion

The response creation portion 475 creates responses to the various commands from the host terminal 401. The response transmission portion 478 transmits the responses to the host terminal 401 over the control signal transmission line 406.

(e) Write Data Reception Portion, Write Data Creation Portion

The write data reception portion 481 receives the data packets from the host terminal 401 in accordance with the card clock CLKS. The write data reception portion 481 receives a count value that is obtained by counting the header length, the bit length of the data fragment, the footer length, and the basic time slot length, in that order, from the timing control portion 472. Based on this count value, the write data reception portion 481 can accurately receive the data fragment within the data packet without loss.

It should be noted that the data packets that make up the write data have the same bit length regardless of the transmission line and are transmitted in synchronization. Thus, even if the write data reception portion 481 cannot receive the header information and the footer information over the control signal transmission line 406, it is sufficient for it to receive the header information and the footer information from the data signal transmission line 407.

The write data creation portion 482 creates write data from a plurality of data packets, and stores them on the flash memory 431*a*.

(f) Transmission Data Creation Portion, Read Data Transmission Portion

The transmission data creation portion 480 reads the read data for transmission to the host terminal 401 from the flash memory 431*a* when the command reception portion 477 receives a read command from the host terminal 401, and creates a plurality of data packets.

Based on the card clock CLKS, the read data transmission portion 479 sends the data packets to the host terminal 401 such that they are synchronized over the control signal transmission line 406 and the data signal transmission line 407. The read data transmission portion 479 also stops the transmission of data packets to the host terminal 401 when it receives a notification from the interrupt request recognition portion 484 that there is a read interrupt requests (g) Interrupt Request Notification Portion, Interrupt Request Recognition Portion The interrupt request notification portion 483 creates various interrupt requests, such as a write interrupt request for stopping the writing of write data to the host terminal 401. Here, when writing, the SD memory card 402 receives write data by continuously receiving data packets from the host terminal 401 over the control signal transmission line 406 and the data signal transmission line 407. In this case, the write interrupt request is an interrupt request that is output using the expanded time slot and stops the transmission of write data. The interrupt request notification portion 483 determines the state of the SD memory card 402, such as whether the writing of the write data that have been transmitted from the host terminal 401 to the flash memory 431*a* is delayed, and determines whether or not to output a write interrupt request. The interrupt request notification portion 483 determines the signal amplitude value to be changed and determines the change period during which the signal amplitude is changed, based on the expanded time slot. The interrupt request notification portion 483 then creates a write interrupt request based on the signal amplitude value and change period that have been determined, such that the bit length of the write interrupt request does not exceed the expanded time slot length. The interrupt request notification portion 483 then outputs a write interrupt request to the dynamic impedance circuit 437 in accordance with the starting position of the expanded time slot, such that the write interrupt request can be output within the expanded time slot.

The interrupt request recognition portion 484 receives the interrupt detection signal from the potential difference detection circuit 439 and determines whether or not the host terminal 401 has output a read interrupt requests The interrupt request recognition portion 484 transmits whether or not there has been a read interrupt request to the read data transmission portion 479. It should be noted that the write interrupt request is created and transmit to the host terminal 401 until it becomes possible to write the write data to the flash memory 431*a*.

(4) Flow of Processing

In the processing that is described below, the clock CLKH is transmit from the host terminal 401 to the SD memory card 402.

(4-1) When Reading

Figure 22:
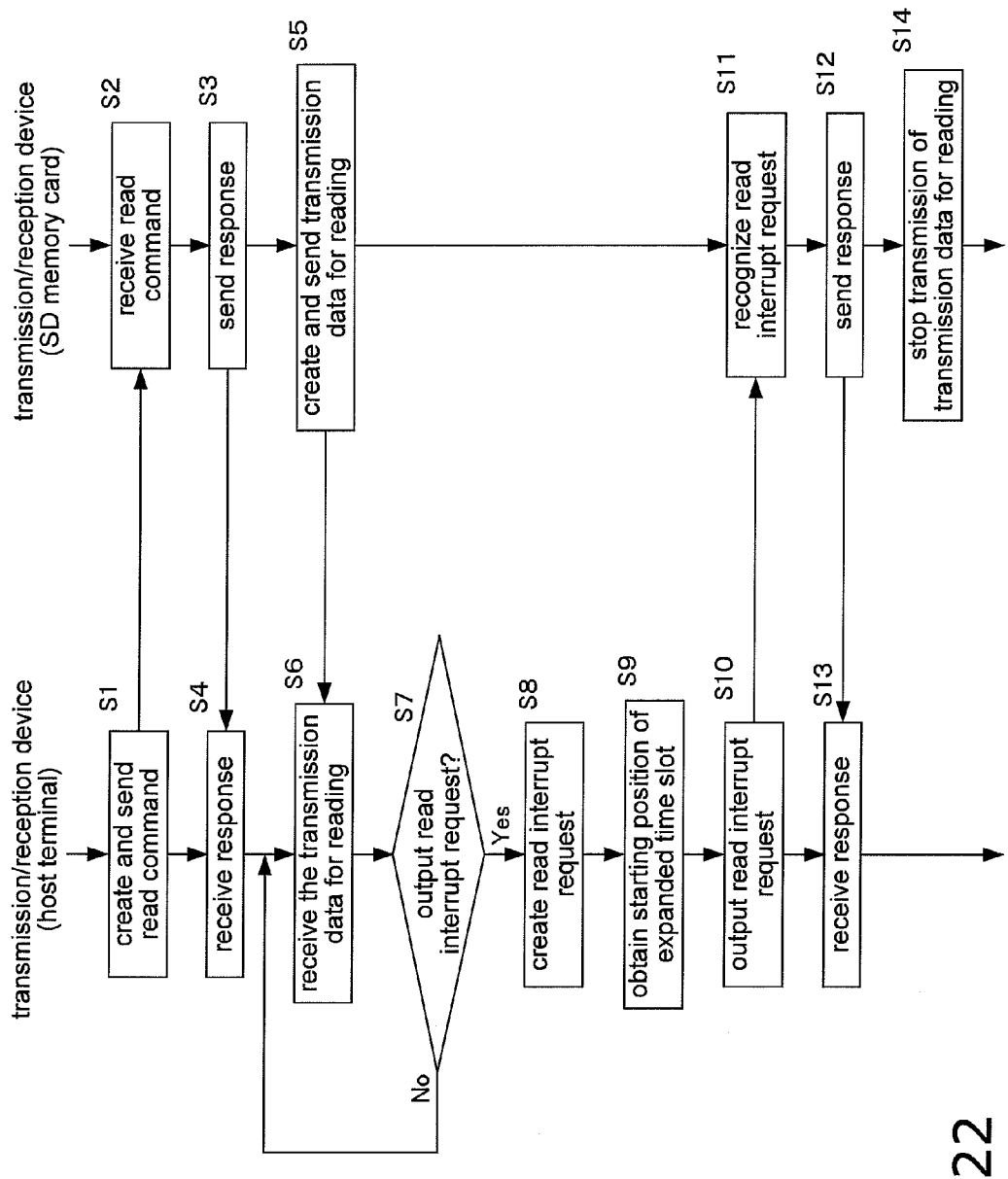
FIG. 22 is a flowchart that shows an example of the flow of processing when reading, of the communications system of the embodiment.

FIG. 22 is a flowchart that shows an example of the flow of processing when reading, of the communications system of this embodiment.

Steps S1, S2: The command creation portion 455 of the host terminal 401 creates a read command for reading the read data from the SD memory card 402. The command transmission portion 456 of the host terminal 401 transmits the read command to the SD memory card 402 over the control signal transmission line 406 (step S1). The command reception portion 477 of the SD memory card 402 receives the read command (step S2).

Steps S3, S4: The response transmission portion 478 of the SD memory card 402 sends a response to the read command to the host terminal 401 over the control signal transmission line 406 (step S3). The response reception portion 458 of the host terminal 401 receives the response (step S4).

Step S5, S6: In accordance with reception of the read command, the transmission data creation portion 480 of the SD memory card 402 reads the read data from the flash memory 431*a* and creates data packets. The read data transmission portion 479 of the SD memory card 402 sends the data packets to the host terminal 401 over the control signal transmission line 406 and the data signal transmission line 407 (step S5). The read data reception portion 460 of the host terminal 401 receives the data packets from the SD memory card 402 (step S6). At this time, the timing control portion 452 of the host terminal 401 counts the header length, the bit length of the data fragment, the footer length, and the basic time slot length, in that order, and sends the count value to the read data reception portion 460.

Then, the read data creation portion 459 creates read data from the data packets, and stores this on the RAM 411.

Steps S7, S8: The interrupt request notification portion 463 of the host terminal 401 determines whether or not to output a read interrupt request, and if one is to be output (Yes), then the interrupt request notification portion 463 creates a read interrupt request (step S7). At this time, the time slot obtaining portion 453 of the host terminal 401 calculates the expanded time slot length based on the header length, the footer length, and the basic time slot length. The interrupt request notification portion 463 of the host terminal 401 creates a read interrupt request that does not exceed the expanded time slot length (step S8). If a read interrupt request is not to be output (No), then the read data reception portion 460 of the host terminal 401 continues to receive data packets.

Step S9: The time slot obtaining portion 453 of the host terminal 401 counts the header length, the bit length of the data fragment, and the expanded time slot length in that order based on the clock CLKH, obtaining the starting position of the expanded time slot.

Steps S10, S11: The interrupt request notification portion 463 of the host terminal 401 outputs a read interrupt request to the dynamic impedance circuit 417, based on the starting position of the expanded time slot (step S10). The interrupt request recognition portion 484 of the SD memory card 402 recognizes that the host terminal 401 has output a read interrupt request, based on the interrupt detection signal, which changes depending on whether a read interrupt request has been output (step S11).

Steps S12, S13: When the response transmission portion 478 of the SD memory card 402 receives a result of recognition that the host terminal 401 is outputting a read interrupt request, it transmits a response to the host terminal 401 over the control signal transmission line 406 (step S12). The response reception portion 458 of the host terminal 401 receives the response from the SD memory card 402 (step S13).

Step S14: The read data transmission portion 479 of the SD memory card 402 stops the transmission of data packets.

Then, when a read command is again transmitted from the host terminal 401 to the SD memory card 402, the SD memory card 402 resumes the transmission of data packets over the control signal transmission line 406 and the data signal transmission line 407.

(4-2) When Writing

Figure 23:
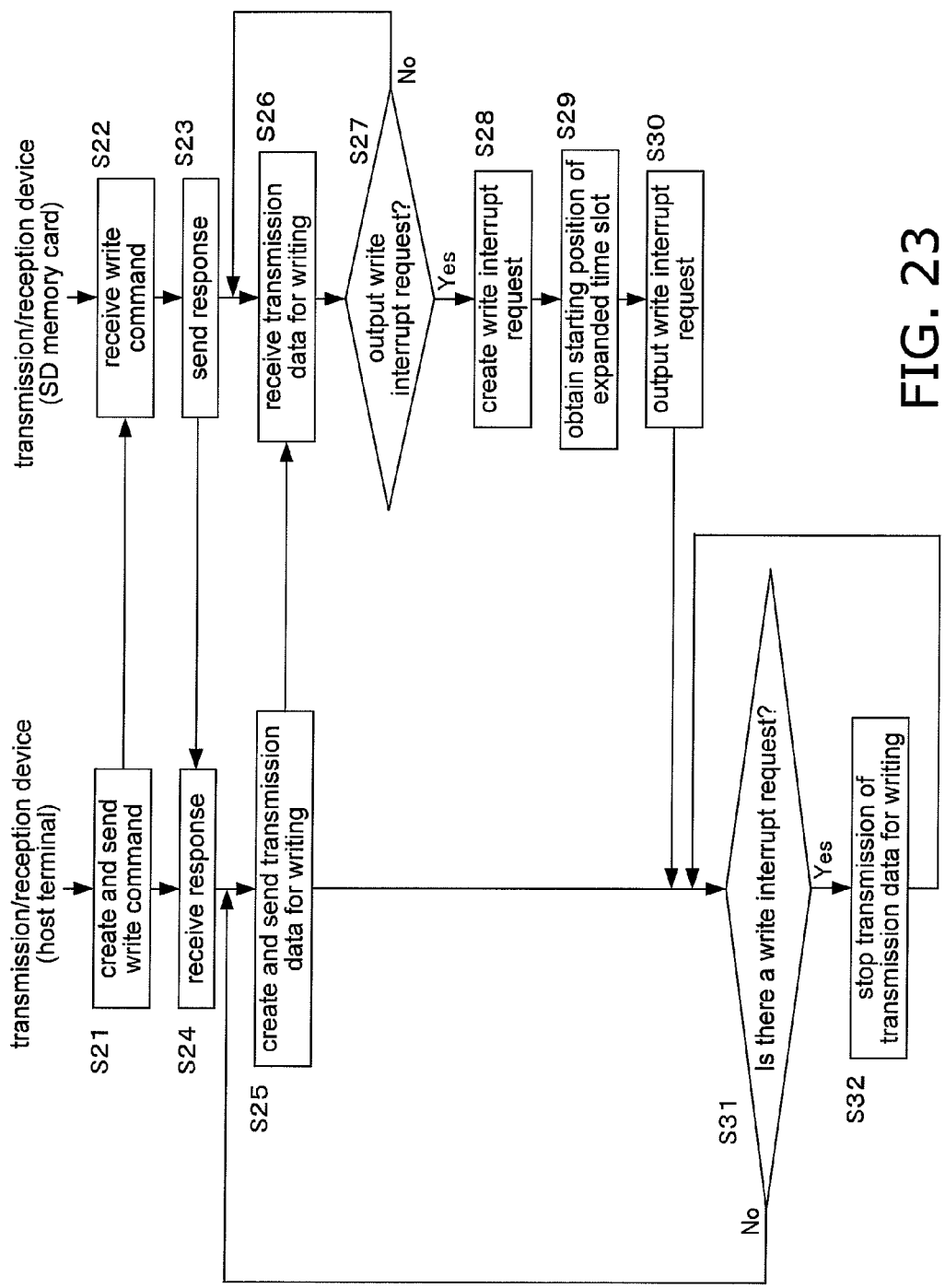
FIG. 23 is a flowchart that shows an example of the flow of processing when writing, of the communications system of the embodiment.

FIG. 23 is a flowchart that shows an example of the flow of processing when writing, of the communications system of this embodiment.

Steps S21, S22: The command creation portion 455 and the command transmission portion 456 of the host terminal 401 create and transmit a write command for writing write data to the SD memory card 402 (step S21). The command reception portion 477 of the SD memory card 402 receives the write command (step S22).

Step S23: The response transmission portion 478 of the SD memory card 402 and the response reception portion 458 of the host terminal 401 send and receive a response to the write command.

Steps S25, S26: In accordance with creation of the write command, the transmission data creation portion 461 and the write data transmission portion 462 of the host terminal 401 read the write data from the RAM 411 and create data packets, and send these to the SD memory card 402 (step S25). The write data reception portion 481 of the SD memory card 402 receives the data packets from the host terminal 401 (step S26). At this time, the timing control portion 472 of the SD memory card 402 counts the header length, the data fragment bit length, the footer length, and the basic time slot length, in that order, and sends the count value to the write data reception portion 481.

Then, the write data creation portion 482 creates write data from the data packets, and stores them on the flash memory 431a.

Steps S27, S28: The interrupt request notification portion 483 of the SD memory card 402 determines whether or not to output a write interrupt request, and if one is to be output (Yes), then the interrupt request notification portion 483 creates a write interrupt request (step S27). At this time, the time slot obtaining portion 473 of the SD memory card 402 calculates the expanded time slot length based on the header length, the footer length, and the basic time slot length. The interrupt request notification portion 483 of the SD memory card 402 creates a write interrupt request that does not exceed the expanded time slot length (step S28). If a write interrupt request is not to be output (No), then the write data reception portion 481 of the SD memory card 402 continues to receive data packets.

Step S29: The time slot obtaining portion 473 of the SD memory card 402 counts the header length, the bit length of the data fragment, and the expanded time slot length in that order based on the card clock CLKS, and obtains the starting position of the expanded time slot.

Step S30: The interrupt request notification portion 483 of the SD memory card 402 outputs the write interrupt request to the dynamic impedance circuit 437, based on the starting position of the expanded time slot.

Steps S31, S32: The interrupt request recognition portion 464 of the host terminal 401 determines whether or not the SD memory card 402 is outputting a write interrupt request, based on the interrupt detection signal, which changes depending on whether a write interrupt request has been output (step S31). If a write interrupt request is not being output (No), then in step S25 the write data transmission portion 462 creates and transmits data packets.

On the other hand, if a write interrupt request is being output (Yes), then the write data transmission portion 462 of the host terminal 401 stops the transmission of data packets (step S32). Then, when a write interrupt request is no longer output, the write data transmission portion 462 resumes the creation and transmission of data packets in step S25.

(5) Action Effect

According to this embodiment, the data transmission side monitors for a change in the signal amplitude of the transmission line, and by doing so can recognize an interrupt request, such as a read interrupt request or a write interrupt request, from the reception side. Here, the reception side changes the signal amplitude in order to produce an interrupt request during the expanded time slot, which is the period between adjacent data fragments. In order to send an interrupt signal for controlling the transmission side from the reception side to the transmission side, it is necessary for there to be a period between the data fragments that is as large as the bit length of the interrupt command, but with the interrupt request notification method of the invention, it is not necessary to provide a period that is as least as long as the bit length of the interrupt command between the data fragments. Thus, the data transmission efficiency can be kept from dropping due to the sending of an interrupt request. Further, since the expanded time slot is a period during which data fragments are not transmitted, the loss of data fragments can be prevented.

(6) Modified Examples

(6-1)

Figure 24:
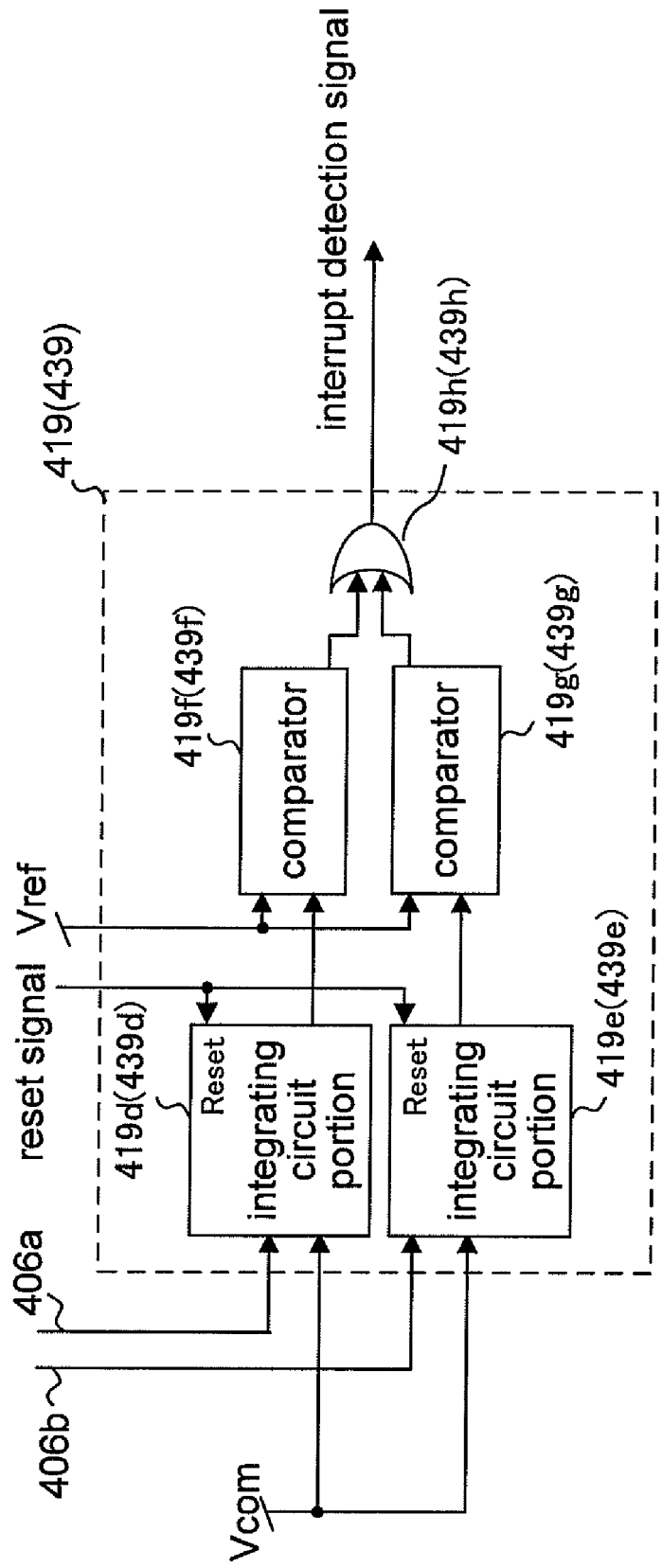
FIG. 24 is a diagram of a separate configuration of the potential difference detection circuit.
Figure 25:
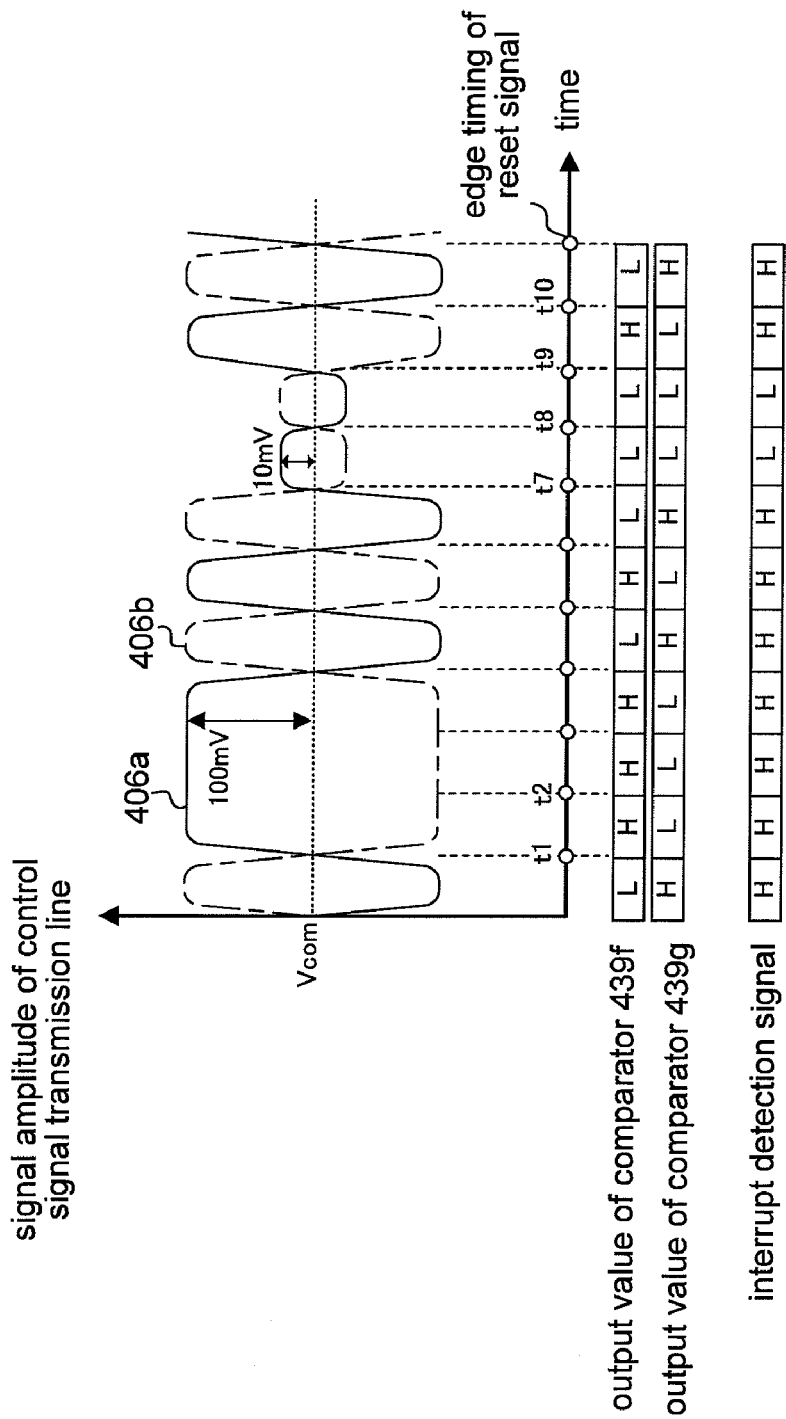
FIG. 25 is a separate explanatory diagram for describing the control signal transmission line 406, the dynamic impedance circuit 417, the potential difference detection circuit 439 with the structure of FIG. 24, and the state of the output of the interrupt detection signal.

The potential difference detection circuits 419 and 439 shown in FIG. 15 are not limited to the circuit shown in FIG. 18. A separate configuration for the potential difference detection circuits is described using FIGS. 24 and 25. FIG. 24 is a diagram of a separate configuration of the potential difference detection circuits, and FIG. 25 is a separate explanatory diagram for describing the control signal transmission line 406, the dynamic impedance circuit 417, the potential difference detection circuit 439 with the structure of FIG. 24, and the state of the output of the interrupt detection signal. The configuration of the potential difference detection circuit 439 of the SD memory card 402 is the same as that of the potential difference detection circuit 419, and thus will not be described.

The potential difference detection circuit 419 has integrating circuit portions 419d and 419e, comparators 419f and 419g, and an OR circuit 419h. The integrating circuit portions 419d and 419e are connected to the two differential transmission routes 406a and 406b, respectively, of the control signal transmission line 406, and receive the common mode potential Vcom of the differential signal and a reset signal. The integrating circuit portions 419d and 419e receive an input of the potential of the differential transmission routes 406a and 406b, and calculate an integrated value each time a predetermined time passes, using the common mode potential Vcom of the differential signal as a reference. It should be noted that the integrating circuit portions 419d and 419e reset the integrated values at the edge timing of the reset signal that is shown in FIG. 25. The comparators 419f and 419g compare the integrated values that are input thereto and a certain predetermined reference potential Vref, and if the integrated value is greater than Vref, their output is High (H), whereas if it is smaller, their output is Low (L). Here, as discussed earlier, there is a ±100 mV swing in the signal amplitude of the control signal transmission line 406 when an interrupt request is not output, whereas this becomes a ±10 mV swing in the signal amplitude of the control signal transmission line 406 when an interrupt request is being output. At this time, if an interrupt request is not being output, then the integrated value of either one of the integrating circuit portions 419d and 419e is greater than the reference potential Vref, and the output of either one of the comparators 419f and 419g is High (H). On the other hand, if an interrupt request is being output, then the integrated value of both of the integrating circuit portions 419d and 419e is lower than the reference potential Vref, and the output of both of the comparators 419f and 419g is Low (L). Ultimately, when the signal amplitude of the control signal transmission line 406 drops from ±100 mV to ±10 mV due to the reception of an interrupt request, the output of the OR circuit 419h changes from High (H) to Low (L) and is input to the CPU 410 as an interrupt detection signal. The CPU 410 determines whether or not an interrupt request has been output based on this change in the interrupt detection signal.

(6-2)

Figure 26:
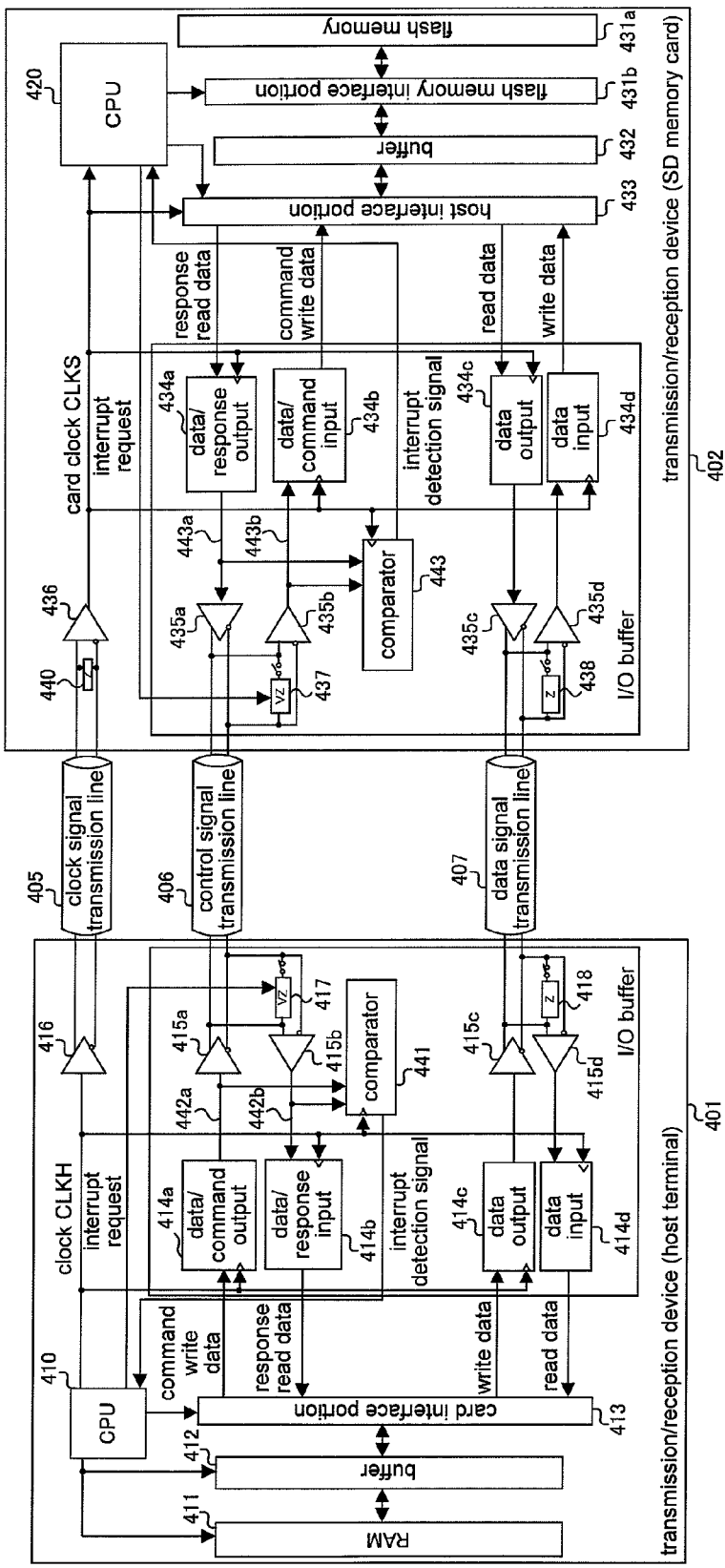
FIG. 26 is a diagram of the overall configuration of a communications system according to a modified example of the embodiment.
Figure 27:
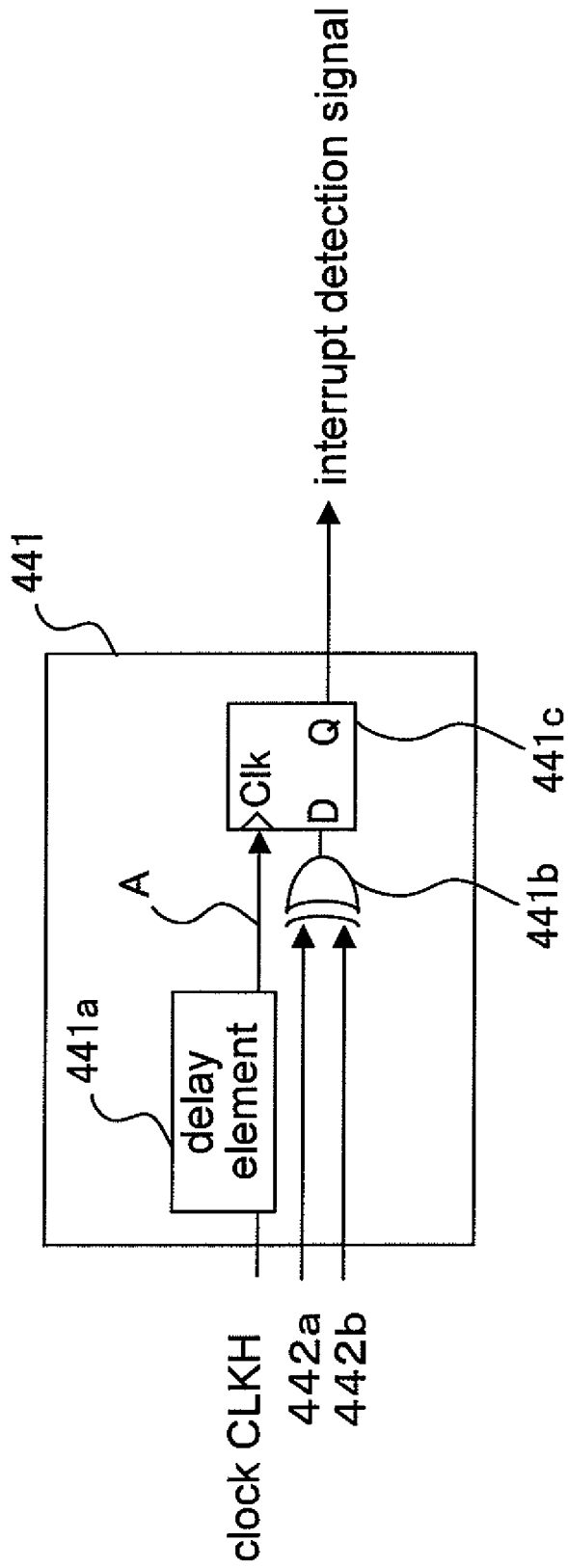
FIG. 27 is a structural diagram that shows the structure of the comparator.
Figure 28:
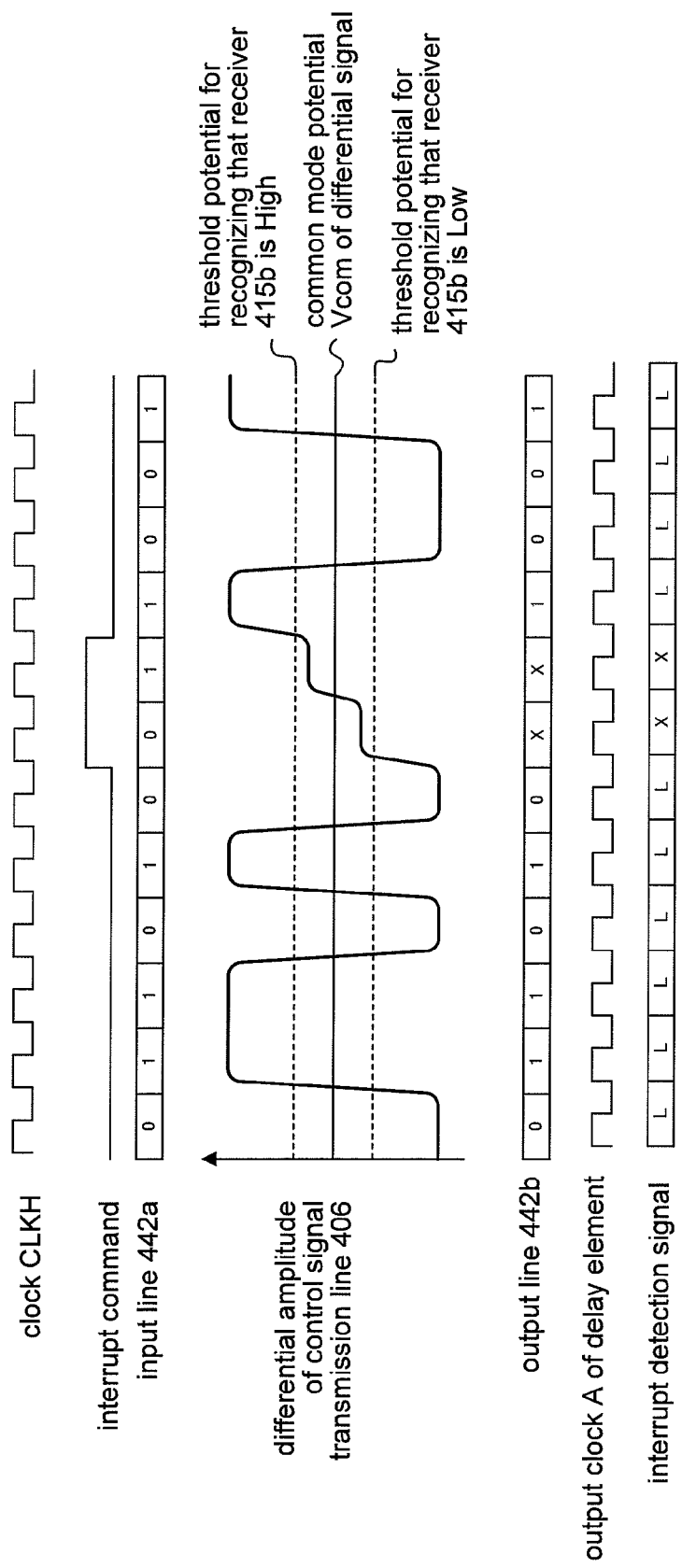
FIG. 28 is an explanatory diagram for describing the control signal transmission line 406, the comparator 441, and the state of the output of the interrupt detection signal.

In this embodiment, it is also possible to use the configuration shown in FIGS. 26 to 28 as the method for the data packet reception side to notify the transmission side of an interrupt request. FIG. 26 is a diagram of the overall configuration of a communications system according to a modified example of this embodiment, FIG. 27 is a structural diagram that shows the structure of the comparator, and FIG. 28 is for describing the control signal transmission line 406, a comparator 441, and the state of the output of the interrupt detection signal. Because the configuration is the same as that of FIG. 15 other than the comparator 441, further description is omitted. The structure of a comparator 443 of the SD memory card 402 is identical to that of the comparator 441 and thus is not described.

The comparator 441 is connected to an input line 442a of the driver 415a and to an output line 442b of the receiver 415b, and includes a delay element 441a to which the clock CLKH is input, an Ex-OR circuit 441b, and a D flip-flop 441c. Here, the driver 415a holds the signal that the host terminal 401 outputs to the control signal transmission line 406, and the receiver 415b holds the signal that is transmit over the control signal transmission line 406 from the SD memory card.

An example of the operation of the comparator 441 is described with regard to a case where the SD memory card 402 outputs a write interrupt request at a time when the host terminal 401 is transmitting write data to the SD memory card 402. The host terminal 401 is continuously transmitting data packets to the SD memory card 402 over the control signal transmission line 406 and the data signal transmission line 407. Here, the CPU 430 of the SD memory card 402 lowers the differential amplitude of the control signal transmission line 406 as discussed earlier when a write interrupt request is output to the dynamic impedance circuit 437. At this time, the impedance of the control signal transmission line 406 falls below the amplitude level that can be distinguished by the receiver 415b of the host terminal 401, which is connected to the control signal transmission line 406. The receiver 415b of the host terminal 401 cannot recognize the differential signal of the control signal transmission line 406 and thus cannot output a correct logic level. Thus, the output line 442b of the receiver 415b becomes an irregular value that is neither High or Low (see the X mark in FIG. 28). Therefore, as illustrated by FIG. 28, the value of the interrupt detection signal, which is the output of the comparator 441 that is diagrammed in FIG. 27, is not always Low (L) and at times may be High (H) (see the X mark in FIG. 28). It should be noted that the logic levels of the input line 442a of the driver 415a and the output line 442b of the receiver 415b are always equivalent when the SD memory card 402 is not outputting a write interrupt request. The value of the interrupt detection signal, which is the output of the comparator 441, is therefore always Low. The CPU 410 of the host terminal 401 detects this change in the interrupt detection signal, and by doing so can recognize that the SD memory card 402 has output a write interrupt request.

It should be noted that the comparator is not limited to the configuration of FIG. 27 as long as it performs the foregoing operation. The comparator 441 that is shown in FIG. 27 preferably is realized with a smaller section area than the potential difference detection circuit 419 that is shown in FIG. 15.

(6-3)

In the above description, the signal amplitude of the control signal transmission line 406 is changed during the expanded time slot, which is defined as the interval between the data fragment of a data packet that is transmitted first and the data fragment of the data packet that is transmitted next. However, it is also possible to change the signal amplitude during the basic time slot, which is the period between a data packet that is transmitted first and the data packet that is transmitted next, that is, the period between the footer information of the data packet that is transmitted first and the header information of the data packet that is transmitted next. Because the signal amplitude does not change during the period that the header information and the footer information are transmitted, it is possible to prevent the footer information and the header information from no longer being able to be received accurately. It should be noted that this embodiment uses a current drive-type differential transmission method, and thus the transmission lines, including the control signal transmission line 406, are either High or Low during the period of the basic time slot as well.

(6-4)

It is not necessary to add header information or footer information to all of the data packets that are transmitted over the control signal transmission line 406 and the data signal transmission line 407. It is also possible to add header information and footer information to the data fragments that are transmitted over one of the transmission lines, and for only data fragments to be transmitted over the other transmission lines. At this time, it is possible for the data fragments only to be transmitted based on the header information and the footer information that are being transmitted over one of the transmission lines.

For example, the first data fragments are transmitted over the control signal transmission line 406 but header information and footer information are not added before and after the first data fragments. On the other hand, data packets each including header information, a second data fragment, and footer information are transmitted by the data signal transmission line 407. The bit length of the first data fragments and the bit length of the second data fragments of the data packets are the same, and the first data fragments are transmitted in synchronization with the second data fragments. Here, the signal amplitude of the control signal transmission line 406 is changed in the first time slot between two adjacent first data fragments of the control signal transmission line 406. In this way, even if an interrupt request is output during the aforementioned period, it is possible to keep the data transmission efficiency from falling and to prevent the loss of data fragment information.

Specifically, the time slot obtaining portion 453 calculates and obtains the first time slot length, which is the period between first data fragments, based on the header length, the footer length, and the basic time slot length that are obtained from the parameter memory portion 454. Here, the first time slot length is calculated as the sum of the footer length, the basic time slot length, and the header length. The time slot obtaining portion 453 sends the first time slot length to the interrupt request notification portion 463. The interrupt request notification portion 463 determines the signal amplitude value to be changed, and determines the change period in which the signal amplitude is to be changed based on the first time slot length. The interrupt request notification portion 463 then creates a read interrupt request based on the signal amplitude value and the change period that have been determined. The timing control portion 452 receives data packets from the read data reception portion 460 over the data signal transmission line 407 and obtains the bit length of the second data fragment that is included in the header information. The time slot obtaining portion 453 counts the header length, the bit length of the second data fragment, and the first time slot length in that order using the clock CLKH, obtaining the starting position of the first time slot. The time slot obtaining portion 453 sends the starting position of the first time slot to the interrupt request notification portion 463. The interrupt request notification portion 463 inputs the read interrupt request to the dynamic impedance circuit 417 based on the starting position of the first time slot and changes the signal amplitude of the control signal transmission line 406. The potential difference detection circuit 439 of the SD memory card 402 detects this change in the signal amplitude, and the CPU 430 of the SD memory card 402 recognizes that the host terminal 401 has output a read interrupt request.

(6-5)

In the foregoing description, the data packets that are transmitted over the control signal transmission line 406 and the data signal transmission line 407 are transmitted in synchronization, but there is no limitation to the configuration of synchronized transmission. It is sufficient for the data packets to be transmitted to the transmission lines based on the header information and the footer information of the data packets.

(6-6)

In the foregoing description, data transmission occurs over a control signal transmission line and a data signal transmission line. However, the present embodiment is not limited to applications where data are transferred over a plurality of transmission lines, and it can also be adopted for applications in which data are transferred over a single transmission line.

(6-7)

In the above description, the signal amplitude of the transmission line is large when an interrupt request is not being output, whereas the signal amplitude of the transmission lines becomes smaller when an interrupt request is output. However, it is only necessary that an interrupt request can be recognized based on a change in the signal amplitude, and it is also possible for the signal amplitude of the transmission line to be small when an interrupt request is not being output and for the signal amplitude of the transmission line to become larger when an interrupt request is output.

(6-8)

The SD memory card processes the data in 8-bit units. Thus, the above expanded time slot length that is calculated by the sum of the footer length, the basic time slot length, and the header length preferably is a multiple of eight.

(6-9)

A switch time t1 of several clocks length, for example, is necessary between the end of the transmission of data from the transmission side until the state where the reception side can output an interrupt request. A switch time t2 of several clocks length, for example, is necessary between the end of output of an interrupt request from the reception side until entering a state where the transmission side can again start the transmission of data. Thus, the expanded time slot length preferably is a bit length that includes the switch times t1 and t2. In other words, the expanded time slot length is calculated by the sum of the footer length, the bit number of the switch time t1 the bit number of the command, the switch time t2, and the header length of the data packet. It is also preferable for the expanded time slot length to be a multiple of eight.

(6-10)

The interrupt request is not limited to a read interrupt request and a write interrupt request, and it may also be a request for delaying transmission of data from the transmission side for a fixed period of time or for instructing data to be resent.

(6-11)

In the above description, the data packets are formed so as to include header information, the data packet, and footer information in that order, but the order of these is not limited to that described above.

(6-12)

In the above description, the present embodiment is described with regard to a communications system that has a control signal transmission line and a data signal transmission line. However, the present embodiment can also be adopted for a communications system that has only data signal transmission lines and does not have a control signal transmission line.

(6-13)

In the above description, the header length, the footer length, and the basic time slot length are determined based on the communications standard. However, it is also possible for the header length, the footer length, and the basic time slot length to be different for each SD memory card, and for this information to be obtained when communication between the host terminal and the SD memory card is initiated.

(6-14)

The above describes a configuration in which the bit length of each data fragment is listed in the header information. However, it is also possible for the bit length of the data fragment to be set based on the communications standard. In this case, the bit length of the data fragment can be stored in the parameter memory portion, and it is not necessary to continually obtain the bit length of the data fragment from the header length of the second data packets.

(6-15)

The above description was made using an SD memory card, which is a removable memory device, as an example, but as long as the removable memory device is portable and transmits read data to a host terminal at a clock that is supplied by the host terminal, the range over which the invention can be adopted is not limited to an SD memory card. Other examples include Compact Flash (registered trademark), smart media, multimedia cards, and memory sticks. The memory that can be mounted in the removable memory device is not limited to a flash memory, and other examples include nonvolatile memories such as MRAM and FeRAM.

(6-16)

A computer program that executes the foregoing method on a computer, and a computer-readable recording medium to which this program is recorded, also are within the scope of the invention. Here, examples of computer-readable recording media include flexible discs, hard discs, CD-ROMs, MOs, DVDs, DVD-ROMs, DVD-RAMs, BDs (Blue-ray Discs), and semiconductor memories.

The computer program is not limited to a computer program that is recorded to a recording medium, and the program can also be transmitted over an electric communications line, a wireless or a land communications line, or a network such as the Internet.

INDUSTRIAL APPLICABILITY

The invention can be adopted for a case in which transmission of an interrupt signal while inhibiting a drop in the data transmission efficiency is to be achieved in the course of data transmission between transmission/reception devices.

The invention claimed is:

1. A signal transmission method for communicating between a transmission side and a reception side, the transmission side and the reception side being connected by at least a first transmission line, a second transmission line, and a clock signal transmission line, the signal transmission method comprising:
partitioning data into a plurality of data fragments, sending the plurality of data fragments from the transmission side over the first transmission line and the second transmission line, and receiving the plurality of data fragments at the reception side;
sending a first clock signal from the reception side to the transmission side over the clock signal transmission line;
sending the data fragments from the transmission side to the reception side over the first transmission line and the second transmission line in accordance with the first clock signal; and
stopping transmission of the first clock signal from the reception side to the transmission side in order to stop transmission of the data fragments from the transmission side,
wherein, after stopping transmission of the first clock signal from the reception side to the transmission side, the reception side (i) transmits to the transmission side an interrupt signal for controlling the transmission side over the first transmission line, and (ii) sends a second clock signal to the transmission side over the second transmission line,
wherein the transmission side receives the interrupt signal based on the second clock signal, and
wherein each line of the first transmission line, the second transmission line, and the clock signal transmission line is a different line from the other two lines.

2. The signal transmission method according to claim 1, wherein the interrupt signal is a signal for stopping the transmission of the data fragments.

3. A signal transmission method comprising:
partitioning data into a plurality of data fragments, sending the plurality of data fragments from a transmission side over a transmission line, and receiving the plurality of data fragments at a reception side;
sending a first clock from the reception side to the transmission side over a clock signal transmission line;
sending the data fragments from the transmission side to the reception side over the transmission line in accordance with the first clock; and
stopping transmission of the first clock from the reception side to the transmission side in order to stop transmission of the data fragments from the transmission side,
wherein the reception side, after stopping transmission of the first clock from the reception side to the transmission side, outputs an interrupt request for controlling the transmission side, and
wherein the transmission side has an internal clock whose count value is reset by reception of the first clock, and recognizes the interrupt request based on the count value of the internal clock exceeding a predetermined value due to stopping transmission of the first clock.

4. The signal transmission method according to claim 3, wherein the interrupt request is a request for stopping transmission of the data fragments.

5. A slave transmission/reception device for communicating with a master transmission/reception device, the slave transmission/reception device and the master transmission/reception device being connected by at least a first transmission line, a second transmission line, and a clock signal transmission line, the slave transmission/reception device comprising:
a data creation portion that partitions data into a plurality of data fragments, creating data fragments;
a first clock reception portion that receives a first clock signal for transmitting the data fragments to the master transmission/reception device, from the master transmission/reception device over the clock signal transmission line;
a data transmission portion that (i) transmits the data fragments to the master transmission/reception device, based on the first clock signal, over the first transmission line and the second transmission line, and (ii) stops transmission of the data fragments to the master transmission/reception device when the first clock signal from the master transmission/reception device is stopped;
a second clock reception portion that receives a second clock signal, from the master transmission/reception device, over the second transmission line; and
an interrupt signal reception portion that receives an interrupt signal for controlling the slave transmission/reception device, from the master transmission/reception device, over the first transmission line,
wherein, after transmission of the first clock signal from the master transmission/reception device is stopped, the second clock reception portion receives the second clock signal, and the interrupt signal reception portion receives the interrupt signal based on the second clock signal, and
wherein each line of the first transmission line, the second transmission line, and the clock signal transmission line is a different line from the other two lines.

6. The slave transmission/reception device according to claim 5, further comprising:
a response transmission portion that transmits a response to the master transmission/reception device in accordance with reception of the interrupt signal.

7. A transmission/reception device, comprising:
a data creation portion that partitions data into a plurality of data fragments, creating data fragments;
a first clock reception portion that receives a first clock for transmitting the data fragments to a reception side, from the reception side, over a clock signal transmission line;
a data transmission portion that transmits the data fragments to the reception side, based on the first clock, over a transmission line;
an internal clock count portion that counts a count value of an internal clock, which is reset by reception of the first clock; and
an interrupt request recognition portion that recognizes an interrupt request from the reception side based on the count value of the internal clock, and wherein, when transmission of the first clock from the reception side is stopped, the data transmission portion stops transmission of the data fragments to the reception side, and
wherein the interrupt request recognition portion recognizes the interrupt request based on the count value of the internal clock exceeding a predetermined value due to stopping transmission of the first clock.

8. The transmission/reception device according to claim 7, further comprising:
a response transmission portion that transmits a response to the reception side in accordance with recognition of the interrupt request.

9. A master transmission/reception device for (i) communicating with a slave transmission/reception device, the master transmission/reception device and the slave transmission/reception device being connected by at least a first transmission line, a second transmission line, and a clock signal transmission line, and (ii) receiving data from the slave transmission/reception device, the data being transmitted after being partitioned into a plurality of data fragments, the master transmission/reception device comprising:
a first clock transmission portion that (i) transmits a first clock signal, which the slave transmission/reception device uses for transmission of the data fragments, to the slave transmission/reception device over the clock signal transmission line, and (ii) stops transmission of the first clock signal to the slave transmission/reception device in order to stop transmission of the data fragments from the slave transmission/reception device;
a data reception portion that receives the data fragments from the slave transmission/reception device, based on the first clock signal, over the first transmission line and the second transmission line;
an interrupt signal creation portion that creates an interrupt signal for controlling the slave transmission/reception device;
an interrupt signal transmission portion that transmits the interrupt signal to the slave transmission/reception device over the first transmission line; and
a second clock transmission portion that transmits a second clock signal to the transmission/reception device over the second transmission line, and
wherein, after the first clock transmission portion has stopped transmission of the first clock to the slave transmission/reception device, (i) the interrupt signal transmission portion transmits the interrupt signal to the slave transmission/reception device over the first transmission line, and (ii) the second clock transmission portion transmits the second clock signal to the slave transmission/reception device over the second transmission line, and
wherein each line of the first transmission line, the second transmission line, and the clock signal transmission line is a different line from the other two lines.

10. The master transmission/reception device according to claim 9, further comprising:
an interrupt request notification portion that notifies the slave transmission/reception device of an interrupt request for controlling the transmission side by controlling of the first clock transmission portion so as stop transmission of the first clock signal.

11. A communication system comprising:
a slave transmission/reception device; and
a master transmission/reception device for communicating with the slave transmission/reception device, the master transmission/reception device and the slave transmission/reception device being connected by at least a first transmission line, a second transmission line, and a clock signal transmission line, wherein the master transmission/reception device receives data from the slave transmission/reception device, the data being transmitted after being partitioned into a plurality of data fragments, wherein the slave transmission/reception device includes:
- a data creation portion that partitions the data into the plurality of data fragments;
- a first clock reception portion that receives a first clock signal for transmitting the data fragments to the master transmission/reception device, from the master transmission/reception device, over the clock signal transmission line;
- a data transmission portion that (i) transmits the data fragments to the master transmission/reception device, based on the first clock signal, over the first transmission line and the second transmission line, and (ii) stops transmission of the data fragments to the master transmission/reception device when the first clock signal, from the master transmission/reception device, is stopped;
- a second clock reception portion that receives a second clock signal, from the master transmission/reception device, over the second transmission line; and
- an interrupt signal reception portion that receives an interrupt signal for controlling the slave transmission/reception device, from the master transmission/reception device, over the first transmission line, wherein the master transmission/reception device includes:
- a first clock transmission portion that (i) transmits the first clock signal, which the slave transmission/reception device uses for transmission of the data fragments, to the slave transmission/reception device over the clock signal transmission line, and (ii) stops transmission of the first clock signal to the slave transmission/reception device in order to stop transmission of the data fragments from the slave transmission/reception device;
- a data reception portion that receives the data fragments from the slave transmission/reception device, based on the first clock signal, over the first transmission line and the second transmission line;
- an interrupt signal creation portion that creates the interrupt signal for controlling the slave transmission/reception device;
- an interrupt signal transmission portion that transmits the interrupt signal to the slave transmission/reception device over the first transmission line; and
- a second clock transmission portion that transmits the second clock signal to the transmission/reception device over the second transmission line, wherein, after the first clock transmission portion has stopped transmission of the first clock to the slave transmission/reception device, (i) the interrupt signal transmission portion transmits the interrupt signal to the slave transmission/reception device over the first transmission line, and (ii) the second clock transmission portion transmits the second clock signal to the slave transmission/reception device over the second transmission line, and wherein each line of the first transmission line, the second transmission line, and the clock signal transmission line is a different line from the other two lines.

* * * * *